US012803705B2

(12) United States Patent
Li et al.

(10) Patent No.: US 12,803,705 B2
(45) Date of Patent: Nov. 17, 2026

(54) INTERLEAVING METHOD, DEINTERLEAVING METHOD AND DEVICE

(71) Applicant: GUANGDONG OPPO MOBILE TELECOMMUNICATIONS CORP., LTD., Dongguan (CN)

(72) Inventors: Yapu Li, Dongguan (CN); Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 253 days.

(21) Appl. No.: 18/761,183

(22) Filed: Jul. 1, 2024

(65) Prior Publication Data

US 2024/0356674 A1 Oct. 24, 2024

Related U.S. Application Data

(63) Continuation of application No. PCT/CN2022/070395, filed on Jan. 5, 2022.

(51) Int. Cl.
*H04L 1/00* (2006.01)

(52) U.S. Cl.
CPC .................................. *H04L 1/0071* (2013.01)

(58) Field of Classification Search
CPC .................................................... H04L 1/0071
See application file for complete search history.

(56) References Cited

U.S. PATENT DOCUMENTS

2009/0175230 A1* 7/2009 Callard ................. H04L 1/0071 370/329
2011/0289391 A1* 11/2011 Breiling ............ H03M 13/2707 714/E11.032
2013/0182782 A1 7/2013 Gazit et al.
2013/0346827 A1* 12/2013 Kim .................... H03M 13/271 714/762
2014/0255029 A1* 9/2014 Varanese ............. H04L 27/2626 398/66
2014/0365848 A1* 12/2014 Roh .................. H03M 13/1515 714/784
2016/0044635 A1* 2/2016 Seok ....................... H04L 69/22 370/312

(Continued)

FOREIGN PATENT DOCUMENTS

CN 101388751 A 3/2009
CN 110352573 A 10/2019

(Continued)

OTHER PUBLICATIONS

IEEE P802.11be™/D1.3; Draft Standard for Information technology—Telecommunications and information exchange between systems Local and metropolitan area networks—Specific requirements; IEEE P802.11be™/D1.3, Nov. 2021.

(Continued)

*Primary Examiner* — Jael M Ulysse
(74) *Attorney, Agent, or Firm* — Sheppard, Mullin, Richter & Hampton LLP

(57) ABSTRACT

A deinterleaving method includes: deinterleaving, by a second device, an RU according to first information, where the first information includes at least one of an interleaving granularity, punctured channel information or an interleaver type.

20 Claims, 9 Drawing Sheets

(56) References Cited

U.S. PATENT DOCUMENTS

| | | | | |
|---|---|---|---|---|
| 2017/0126378 | A1* | 5/2017 | Luo | H04L 1/0007 |
| 2018/0034587 | A1* | 2/2018 | Kim | H04L 1/0058 |
| 2018/0083736 | A1* | 3/2018 | Manolakos | H04L 5/0007 |
| 2018/0175981 | A1* | 6/2018 | Manolakos | H04L 5/0046 |
| 2019/0044544 | A1* | 2/2019 | Liao | H04L 1/0057 |
| 2019/0089486 | A1* | 3/2019 | Kim | H04L 1/0041 |
| 2019/0150118 | A1* | 5/2019 | Nam | H04L 1/0071<br>370/329 |
| 2019/0357185 | A1* | 11/2019 | Kwak | H04L 1/0071 |
| 2020/0383133 | A1* | 12/2020 | Hu | H04L 1/0067 |
| 2020/0389934 | A1* | 12/2020 | Liu | H04L 5/0044 |
| 2021/0044384 | A1* | 2/2021 | Sengupta | H04L 1/0045 |
| 2021/0083803 | A1* | 3/2021 | Sheng | H03M 13/2707 |
| 2021/0288752 | A1* | 9/2021 | Suh | H04L 1/0003 |
| 2023/0035113 | A1* | 2/2023 | Shellhammer | H04L 5/0044 |
| 2023/0388051 | A1* | 11/2023 | Park | H04L 1/0071 |
| 2024/0023099 | A1* | 1/2024 | Hu | H04L 5/0094 |
| 2024/0146456 | A1* | 5/2024 | Chun | H04L 1/0068 |
| 2024/0171310 | A1* | 5/2024 | Yu | H04L 1/0071 |
| 2024/0235735 | A9* | 7/2024 | Lim | H04L 1/0068 |
| 2024/0283587 | A1* | 8/2024 | Chun | H04W 8/22 |
| 2024/0314776 | A1* | 9/2024 | Noh | H04W 72/121 |
| 2025/0096935 | A1* | 3/2025 | Park | H04L 1/0071 |
| 2025/0141643 | A1* | 5/2025 | Lim | H04L 5/0096 |

FOREIGN PATENT DOCUMENTS

| | | | |
|---|---|---|---|
| CN | 110521150 | A | 11/2019 |
| CN | 110535556 | A | 12/2019 |
| CN | 113824532 | A | 12/2021 |

OTHER PUBLICATIONS

International Search Report and Written Opinion of the International Searching Authority regarding International Patent Application No. PCT/CN2022/070395, dated Sep. 26, 2022. Translation provided by WIPO Translate.

* cited by examiner

INTERLEAVING METHOD, DEINTERLEAVING METHOD AND DEVICE

CROSS-REFERENCE TO RELATED APPLICATION

This application is a Bypass Continuation Application of PCT/CN2022/070395 filed on Jan. 5, 2022, which is incorporated herein by reference in its entirety.

TECHNICAL FIELD

The present disclosure relates to the field of communication, and more specifically, to an interleaving method, a deinterleaving method and a device.

BACKGROUND

Communication standards include multiple types of RUs (Resource Units) and also include an MRU (Multiple Resource Unit) composed of multiple RUs. If one RU or MRU is directly allocated to one STA, benefits of large bandwidth cannot be enjoyed.

SUMMARY

The embodiments of the present disclosure provide an interleaving method, a deinterleaving method and a device.

The embodiments of the present disclosure provide an interleaving method, including: interleaving, by a first device, a resource unit (RU) according to first information, where the first information includes at least one of a bandwidth, an interleaving granularity, punctured channel information or an interleaver type.

The embodiments of the present disclosure provide a deinterleaving method, including: deinterleaving, by a second device, a resource unit (RU) according to first information, where the first information includes at least one of an interleaving granularity, punctured channel information, or an interleaver type.

The embodiments of the present disclosure provide a method for controlling an interleaver, including: writing indices of to-be-interleaved elements into units of a triangular interleaver one by one per row, according to a first order, starting from a right angle side of the triangular interleaver; reading out indices of elements in the units of the triangular interleaver one by one per column, starting from the right angle side.

The embodiments of the present disclosure provide a method for controlling an interleaver, including: writing indices of to-be-interleaved elements into units of a spiral interleaver one by one per column, according to a first order, according to at least one of a number of spiral matrix columns, a group size for writing into each group and a step length of a spiral matrix of the spiral interleaver; reading out indices of elements in the units of the spiral interleaver one by one per row.

The embodiments of the present disclosure provide a method for controlling an interleaver, including: writing indices of to-be-interleaved elements into a ladder interleaving unit one by one per column, according to a first order, according to at least one of a number of ladder matrix columns and a number of ladder matrix rows of the ladder interleaver; reading out indices of elements in the units of the ladder interleaver one by one per row.

The embodiments of the present disclosure provide a communication method, including: transmitting, by a first device, second information, where the second information is used to indicate an allocation mode and/or an interleaving granularity of an RU.

The embodiments of the present disclosure provide a communication method, including: receiving, by a second device, second information, where the second information is used to indicate an allocation mode and/or an interleaving granularity of an RU.

The embodiments of the present disclosure provide a first device, including: a processing unit, configured to interleave a resource unit (RU) according to first information, where the first information includes at least one of a bandwidth, an interleaving granularity, punctured channel information or an interleaver type.

The embodiments of the present disclosure provide a second device, including: a processing unit, configured to deinterleave a resource unit (RU) according to first information, where the first information includes at least one of an interleaving granularity, punctured channel information, or an interleaver type.

The embodiments of the present disclosure provide a communication device, including: a first writing unit, configured to write indices of to-be-interleaved elements into units of a triangular interleaver one by one per row, according to a first order, starting from a right angle side of the triangular interleaver; read out indices of elements in the units of the triangular interleaver one by one per column, starting from the right angle side.

The embodiments of the present disclosure provide a communication device, including: a second writing unit, configured to write indices of to-be-interleaved elements into units of a spiral interleaver one by one per column, according to a first order, according to at least one of a number of spiral matrix columns, a group size for writing into each group or a step length of a spiral matrix of the spiral interleaver; read out indices of elements in the units of the spiral interleaver one by one per row.

The embodiments of the present disclosure provide a communication device, including: a third writing unit, configured to write indices of to-be-interleaved elements into units of a ladder interleaver one by one per column, according to a first order, according to at least one of a number of ladder matrix columns or a number of ladder matrix rows of the ladder interleaver; read out indices of elements in the units of the ladder interleaver one by one per row.

The embodiments of the present disclosure provide a first device, including: a transmitting unit, configured to transmit second information, where the second information is used to indicate an allocation mode and/or an interleaving granularity of an RU.

The embodiments of the present disclosure provide a second device, including: a receiving unit, configured to receive second information, where the second information is used to indicate an allocation mode and/or an interleaving granularity of an RU.

The embodiments of the present disclosure provide a terminal device, including a processor and a memory. The memory is configured to store a computer program, the processor is configured to invoke and execute the computer program stored in the memory, to cause the first device to perform the interleaving method and the deinterleaving method of any embodiment of the present disclosure.

The embodiments of the present disclosure provide a network device, including a processor and a memory. The memory is configured to store a computer program, the processor is configured to invoke and execute the computer program stored in the memory, to cause the second device to perform the interleaving method and the deinterleaving method of any embodiment of the present disclosure.

The embodiments of the present disclosure provide a chip, configured to implement the above interleaving method and deinterleaving method. In some embodiments, the chip includes: a processor, configured to invoke and execute a computer program from a memory, to cause a device equipped with the chip to perform the interleaving method and the deinterleaving method of any embodiment of the present disclosure.

The embodiments of the present disclosure provide a non-transitory computer-readable storage medium for storing a computer program, where the computer program, when executed by a device, causes the device to perform the interleaving method and the deinterleaving method of any embodiment of the present disclosure.

The embodiments of the present disclosure provide a computer program product including computer program instructions, where the computer program instructions cause a computer to perform the interleaving method and the deinterleaving method of any embodiment of the present disclosure.

The embodiments of the present disclosure provide a computer program, where the computer program, when executed on a computer, causes the computer to perform the interleaving method and the deinterleaving method of any embodiment of the present disclosure.

DETAILED DESCRIPTION

Figure 1:
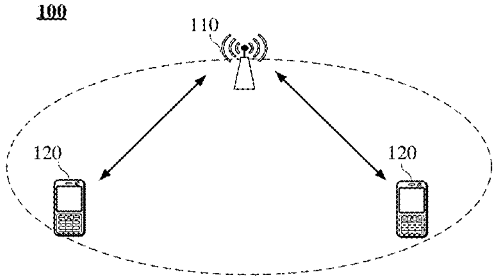
FIG. 1 is a schematic diagram of an application scenario according to the embodiments of the present disclosure.

Technical solutions in the embodiments of the present disclosure will be described below with reference to the accompanying drawings in the embodiments of the present disclosure.

In the embodiments, an interleaving method is provided, which includes:

- interleaving, by a first device, a resource unit (RU) according to first information, where the first information includes at least one of a bandwidth, an interleaving granularity, punctured channel information or an interleaver type.

In some embodiments, interleaving, by the first device, the RU according to the first information, includes:

- obtaining punctured RUs according to the interleaving granularity and the punctured channel information;
- dividing the bandwidth according to the interleaving granularity, to obtain a plurality of first physical RUs.

In some embodiments, interleaving, by the first device, the RU according to the first information, further includes:

- removing the punctured RUs from the plurality of first physical RUs, to obtain to-be-interleaved first physical RUs;
- interleaving the to-be-interleaved first physical RUs by using an interleaver.

In some embodiments, interleaving, by the first device, the RU according to the first information, further includes:

- using the plurality of first physical RUs obtained by dividing the bandwidth as to-be-interleaved first physical RUs, and interleaving the to-be-interleaved first physical RUs by using an interleaver;

- removing the punctured RUs from interleaved first physical RUs.

In some embodiments, a number of the punctured RUs is a first number, a number of the first physical RUs obtained by dividing the bandwidth is a second number, and a number of first physical RUs with the punctured RUs removed is a third number.

In some embodiments, dividing the bandwidth according to the interleaving granularity, to obtain the plurality of first physical RUs, includes:

in a case where the interleaving granularity is 26 tones, dividing the bandwidth according to the interleaving granularity, to obtain the second number of first physical RUs; where each the first physical includes 26 tones.

In some embodiments, in the case where the interleaving granularity is 26 tones, a relationship between the bandwidth and the second number includes at least one of:

the bandwidth being 80 MHz, and the second number being 36;

the bandwidth being 160 MHz, and the second number being 72; or the bandwidth being 320 MHz, and the second number being 144.

In some embodiments, dividing the bandwidth according to the interleaving granularity, to obtain the plurality of first physical RUs, includes:

in a case where the interleaving granularity is 52 tones, dividing the bandwidth according to the interleaving granularity, to obtain the second number of first physical RUs and a fourth number of second physical RUs; where each the first physical includes 52 tones, and each the second physical includes 26 tones.

In some embodiments, in the case where the interleaving granularity is 52 tones, a relationship between the bandwidth and the second number, and the fourth number includes at least one of:

the bandwidth being 80 MHz, the second number being 16, and the fourth number being 4;

the bandwidth being 160 MHz, the second number being 32, and the fourth number being 8; or the bandwidth being 320 MHz, the second number being 64, and the fourth number being 16.

In some embodiments, interleaving the to-be-interleaved first physical RUs by using the interleaver, includes:

interleaving the to-be-interleaved first physical RUs by using the interleaver, and changing an index arrangement order of the to-be-interleaved first physical RUs, to obtain an index arrangement order of interleaved first physical RUs;

mapping the interleaved first physical RUs to at least one of a virtual RU, a virtual MRU, a logical RU or a logical MRU according to the index arrangement order of the interleaved first physical RUs.

In some embodiments, an index of each physical RU has a corresponding physical tone index interval range, and an index of each virtual RU has a corresponding virtual tone index interval range.

In some embodiments, an interleaver is determined according to the interleaver type.

In some embodiments, the interleaver type includes at least one of: a block interleaver, a triangular interleaver, a spiral interleaver or a ladder interleaver.

In some embodiments, a parameter of an interleaver is determined according to the interleaver type and a number of to-be-interleaved first physical RUs.

In some embodiments, the interleaver type is a block interleaver, and parameters of the block interleaver include a number of columns and a number of rows.

In some embodiments, the interleaver type is a triangular interleaver, and a parameter of the triangular interleaver includes a length of a right angle side.

In some embodiments, the interleaver type is a spiral interleaver, and parameters of the spiral interleaver include a number of spiral matrix columns, a group size for writing into each group, and a step length of a spiral matrix.

In some embodiments, the number of spiral matrix columns of the spiral interleaver is 3, the group size for writing into each group is 2, and the step length of the spiral matrix is 1.

In some embodiments, the interleaver type is a ladder interleaver, and parameters of the ladder interleaver include a number of ladder matrix columns and a number of ladder matrix rows.

In some embodiments, a number of columns of the ladder interleaver is 4.

In some embodiments, in a case of no punctured channel and the interleaving granularity being 26 tones, a relationship between the bandwidth and parameters of different types of interleavers includes at least one of:

parameters of interleavers corresponding to the bandwidth of 80 MHz including at least one of: a number of columns of a block interleaver being 4 and a number of rows of the block interleaver being 9, or the number of columns being 6 and the number of rows being 6; a length of a right angle side of a triangular interleaver being 8; or a number of ladder matrix rows of a ladder interleaver being 11;

parameters of interleavers corresponding to the bandwidth of 160 MHz including at least one of: a number of columns of a block interleaver being 6 and a number of rows of the block interleaver being 12, or the number of columns being 8 and the number of rows being 9; a length of a right angle side of a triangular interleaver being 12; or a number of ladder matrix rows of a ladder interleaver being 20; or parameters of interleavers corresponding to the bandwidth of 320 MHz including at least one of: a number of columns of a block interleaver being 8 and a number of rows of the block interleaver being 18, or the number of columns being 9 and the number of rows being 16, or the number of columns being 12 and the number of rows being 12; a length of a right angle side of a triangular interleaver being 17; or a number of ladder matrix rows of a ladder interleaver being 38.

In some embodiments, in a case of no punctured channel and the interleaving granularity being 52 tones, a relationship between the bandwidth and parameters of different types of interleavers includes at least one of:

parameters of interleavers corresponding to the bandwidth of 80 MHz including at least one of: a number of columns of a block interleaver being 4 and a number of rows of the block interleaver being 4; a length of a right angle side of a triangular interleaver being 6; or a number of ladder matrix rows of a ladder interleaver being 6;

parameters of interleavers corresponding to the bandwidth of 160 MHz including at least one of: a number of columns of a block interleaver being 4 and a number of rows of the block interleaver being 8; a length of a right angle side of a triangular interleaver being 8; or a number of ladder matrix rows of a ladder interleaver being 10; or parameters of interleavers corresponding to the bandwidth of 320 MHz including at least one of: a number of columns of a block interleaver being 8 and a number of rows of the block interleaver being 8; a length of a right angle side of a triangular interleaver being 11; or a number of ladder matrix rows of a ladder interleaver being 18.

In some embodiments, in a case of one 20 MHz channel being punctured and the interleaving granularity being 26 tones, a relationship between the bandwidth and parameters of different types of interleavers includes at least one of:

parameters of interleavers corresponding to the bandwidth of 80 MHz including at least one of: a number of columns of a block interleaver being 3 and a number of rows of the block interleaver being 9; a length of a right angle side of a triangular interleaver being 7; or a number of ladder matrix rows of a ladder interleaver being 9;

parameters of interleavers corresponding to the bandwidth of 160 MHz including at least one of: a number of columns of a block interleaver being 3 and a number of rows of the block interleaver being 9; a length of a right angle side of a triangular interleaver being 7; or a number of ladder matrix rows of a ladder interleaver being 9; or parameters of interleavers corresponding to the bandwidth of 320 MHz including at least one of: a number of columns of a block interleaver being 5 and a number of rows of the block interleaver being 27; a length of a right angle side of a triangular interleaver being 16; or a number of ladder matrix rows of a ladder interleaver being 36.

In some embodiments, in a case of one 20 MHz channel being punctured and the interleaving granularity being 52 tones, a relationship between the bandwidth and parameters of different types of interleavers includes at least one of:

parameters of interleavers corresponding to the bandwidth of 80 MHz including at least one of: a number of columns of a block interleaver being 3 and a number of rows of the block interleaver being 4; a length of a right angle side of a triangular interleaver being 5; or a number of ladder matrix rows of a ladder interleaver being 5;

parameters of interleavers corresponding to the bandwidth of 160 MHz including at least one of: a number of columns of a block interleaver being 4 and a number of rows of the block interleaver being 7; a length of a right angle side of a triangular interleaver being 7; or a number of ladder matrix rows of a ladder interleaver being 9; or parameters of interleavers corresponding to the bandwidth of 320 MHz including at least one of: a number of columns of a block interleaver being 6 and a number of rows of the block interleaver being 10; a length of a right angle side of a triangular interleaver being 11; or a number of ladder matrix rows of a ladder interleaver being 17.

In some embodiments, in a case of two 20 MHz channels being punctured and the interleaving granularity being 26 tones, a relationship between the bandwidth and parameters of different types of interleavers includes at least one of:

parameters of interleavers corresponding to the bandwidth of 80 MHz including at least one of: a number of columns of a block interleaver being 3 and a number of rows of the block interleaver being 6; a length of a right angle side of a triangular interleaver being 6; or a number of ladder matrix rows of a ladder interleaver being 6;

parameters of interleavers corresponding to the bandwidth of 160 MHz including at least one of: a number of columns of a block interleaver being 6 and a number of rows of the block interleaver being 9; a length of a right angle side of a triangular interleaver being 10; or a number of ladder matrix rows of a ladder interleaver being 15; or parameters of interleavers corresponding to the bandwidth of 320 MHz including at least one of: a number of columns of a block interleaver being 9 and a number of rows of the block interleaver being 14; a length of a right angle side of a triangular interleaver being 16; or a number of ladder matrix rows of a ladder interleaver being 33.

In some embodiments, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of a block interleaver being 2 and a number of rows of the block interleaver being 4; a length of a right angle side of a triangular interleaver being 4; or a number of ladder matrix rows of a ladder interleaver being 4;

parameters of interleavers corresponding to the bandwidth of 160 MHz including at least one of: a number of columns of a block interleaver being 4 and a number of rows of the block interleaver being 6; a length of a right angle side of a triangular interleaver being 7; or a number of ladder matrix rows of a ladder interleaver being 8; or parameters of interleavers corresponding to the bandwidth of 320 MHz including at least one of: a number of columns of a block interleaver being 7 and a number of rows of the block interleaver being 8; a length of a right angle side of a triangular interleaver being 11; or a number of ladder matrix rows of a ladder interleaver being 16.

In some embodiments, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of a block interleaver being 5 and a number of rows of the block interleaver being 9; a length of a right angle side of a triangular interleaver being 9; or a number of ladder matrix rows of a ladder interleaver being 13; or parameters of interleavers corresponding to the bandwidth of 320 MHz including at least one of: a number of columns of a block interleaver being 9 and a number of rows of the block interleaver being 13; a length of a right angle side of a triangular interleaver being 15; or a number of ladder matrix rows of a ladder interleaver being 31.

In some embodiments, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 5; a length of a right angle side of a triangular interleaver being 6; or a number of ladder matrix rows of a ladder interleaver being 7; or parameters of interleavers corresponding to the bandwidth of 320 MHz including at least one of: a number of columns of a block interleaver being 4 and a number of rows of the block interleaver being 13; a length of a right angle side of a triangular interleaver being 10; or a number of ladder matrix rows of a ladder interleaver being 15.

In some embodiments, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 9; a length of a right angle side of a triangular interleaver being 8; or a number of ladder matrix rows of a ladder interleaver being 11; or parameters of interleavers corresponding to the bandwidth of 320 MHz including at least one of: a number of columns of a block interleaver being 9 and a number of rows of the block interleaver being 12; a length of a right angle side of a triangular interleaver being 15; or a number of ladder matrix rows of a ladder interleaver being 29.

In some embodiments, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 4; a length of a right angle side of a triangular interleaver being 6; or a number of ladder matrix rows of a ladder interleaver being 6; or parameters of interleavers corresponding to the bandwidth of 320 MHz including at least one of: a number of columns of a block interleaver being 6 and a number of rows of the block interleaver being 8; a length of a right angle side of a triangular interleaver being 10; or a number of ladder matrix rows of a ladder interleaver being 14.

In some embodiments, the method further includes:

in a case where the interleaver includes multiple groups of parameters, adopting one group of parameters among the multiple groups of parameters.

In some embodiments, the bandwidth is a PPDU bandwidth.

In some embodiments, the punctured channel information includes at least one of tones of a punctured channel, a bandwidth of a punctured channel, or a number of punctured channels.

In the embodiments, a deinterleaving method is provided, which includes:

deinterleaving, by a second device, a resource unit according to first information, where the first information includes at least one of an interleaving granularity, punctured channel information, or an interleaver type.

In some embodiments, deinterleaving, by the second device, the resource unit according to the first information, includes:

acquiring first physical RUs corresponding to at least one of a virtual RU, a virtual MRU, a logical RU, or a logical MRU.

In some embodiments, deinterleaving, by the second device, the resource unit according to the first information, further includes:

using acquired first physical RUs as to-be-deinterleaved first physical RUs, and deinterleaving the to-be-deinterleaved first physical RUs by using an interleaver, to obtain deinterleaved first physical RUs;

combining the deinterleaved first physical RUs and punctured RUs;

where a number of the punctured RUs is a first number, a number of the deinterleaved first physical RUs is a third number, and a number of first physical RUs obtained by the combining is a second number.

In some embodiments, deinterleaving, by the second device, the resource unit according to the first information, further includes:

combining acquired first physical RUs and punctured RUs to obtain to-be-deinterleaved first physical RUs;

deinterleaving the to-be-deinterleaved first physical RUs by using an interleaver, to obtain deinterleaved first physical RUS;

where a number of the punctured RUs is a first number, and a number of the deinterleaved first physical RUs is a second number.

In some embodiments, deinterleaving the to-be-deinterleaved first physical RUs by using the interleaver, includes:

deinterleaving the to-be-deinterleaved first physical RUs by using the interleaver, and recovering an index arrangement order of the to-be-deinterleaved first physical RUs.

In some embodiments, in a case where the interleaving granularity is 26 tones, the first physical RU includes 26 tones, and a relationship between the bandwidth and the second number includes at least one of:

the bandwidth being 80 MHz, and the second number being 36;

the bandwidth being 160 MHz, and the second number being 72; or the bandwidth being 320 MHz, and the second number being 144.

In some embodiments, deinterleaving, by the second device, the resource unit according to the first information, further includes:

combining the second number of first physical RUs and a fourth number of second physical RUs, to obtain recovered first physical RUs.

In some embodiments, in a case where the interleaving granularity is 52 tones, the first physical RU includes 52 tones, the second physical RU includes 26 tones, a relationship between the bandwidth and the second number, and the fourth number includes at least one of:

the bandwidth being 80 MHz, the second number being 16, and the fourth number being 4;

the bandwidth being 160 MHz, the second number being 32, and the fourth number being 8; or the bandwidth being 320 MHz, the second number being 64, and the fourth number being 16.

In some embodiments, an index of each physical RU has a corresponding physical tone index interval range, and an index of each virtual RU has a corresponding virtual tone index interval range.

In some embodiments, an interleaver is determined according to the interleaver type.

In some embodiments, the interleaver type includes at least one of: a block interleaver, a triangular interleaver, a spiral interleaver or a ladder interleaver.

In some embodiments, a parameter of an interleaver is determined according to the interleaver type and a number of the to-be-deinterleaved first physical RUs.

In some embodiments, the interleaver type is a block interleaver, and parameters of the block interleaver include a number of columns and a number of rows.

In some embodiments, the interleaver type is a triangular interleaver, and a parameter of the triangular interleaver includes a length of a right angle side.

In some embodiments, the interleaver type is a spiral interleaver, and parameters of the spiral interleaver include a number of spiral matrix columns, a group size for writing into each group, and a step length of a spiral matrix.

In some embodiments, the number of spiral matrix columns of the spiral interleaver is 3, the group size for writing into each group is 2, and the step length of the spiral matrix is 1.

In some embodiments, the interleaver type is a ladder interleaver, and parameters of the ladder interleaver include a number of ladder matrix columns and a number of ladder matrix rows.

In some embodiments, a number of columns of the ladder interleaver is 4.

In some embodiments, in a case of no punctured channel and the interleaving granularity being 26 tones, a relationship between the bandwidth and parameters of different types of interleavers includes at least one of:

- parameters of interleavers corresponding to the bandwidth of 80 MHz including at least one of: a number of columns of a block interleaver being 4 and a number of rows of the block interleaver being 9, or the number of columns being 6 and the number of rows being 6; a length of a right angle side of a triangular interleaver being 8; or a number of ladder matrix rows of a ladder interleaver being 11;
- parameters of interleavers corresponding to the bandwidth of 160 MHz including at least one of: a number of columns of a block interleaver being 6 and a number of rows of the block interleaver being 12, or the number of columns being 8 and the number of rows being 9; a length of a right angle side of a triangular interleaver being 12; or a number of ladder matrix rows of a ladder interleaver being 20; or
- parameters of interleavers corresponding to the bandwidth of 320 MHz including at least one of: a number of columns of a block interleaver being 8 and a number of rows of the block interleaver being 18, or the number of columns being 9 and the number of rows being 16, or the number of columns being 12 and the number of rows being 12; a length of a right angle side of a triangular interleaver being 17; or a number of ladder matrix rows of a ladder interleaver being 38.

In some embodiments, in a case of no punctured channel and the interleaving granularity being 52 tones, a relationship between the bandwidth and parameters of different types of interleavers includes at least one of:

- parameters of interleavers corresponding to the bandwidth of 80 MHz including at least one of: a number of columns of a block interleaver being 4 and a number of rows of the block interleaver being 4; a length of a right angle side of a triangular interleaver being 6; or a number of ladder matrix rows of a ladder interleaver being 6;
- parameters of interleavers corresponding to the bandwidth of 160 MHz including at least one of: a number of columns of a block interleaver being 4 and a number of rows of the block interleaver being 8; a length of a right angle side of a triangular interleaver being 8; or a number of ladder matrix rows of a ladder interleaver being 10; or
- parameters of interleavers corresponding to the bandwidth of 320 MHz including at least one of: a number of columns of a block interleaver being 8 and a number of rows of the block interleaver being 8; a length of a right angle side of a triangular interleaver being 11; or a number of ladder matrix rows of a ladder interleaver being 18.

In some embodiments, in a case of one 20 MHz channel being punctured and the interleaving granularity being 26 tones, a relationship between the bandwidth and parameters of different types of interleavers includes at least one of:

- parameters of interleavers corresponding to the bandwidth of 80 MHz including at least one of: a number of columns of a block interleaver being 3 and a number of rows of the block interleaver being 9; a length of a right angle side of a triangular interleaver being 7; or a number of ladder matrix rows of a ladder interleaver being 9;
- parameters of interleavers corresponding to the bandwidth of 160 MHz including at least one of: a number of columns of a block interleaver being 3 and a number of rows of the block interleaver being 9; a length of a right angle side of a triangular interleaver being 7; or a number of ladder matrix rows of a ladder interleaver being 9; or
- parameters of interleavers corresponding to the bandwidth of 320 MHz including at least one of: a number of columns of a block interleaver being 5 and a number of rows of the block interleaver being 27; a length of a right angle side of a triangular interleaver being 16; or a number of ladder matrix rows of a ladder interleaver being 36.

In some embodiments, in a case of one 20 MHz channel being punctured and the interleaving granularity being 52 tones, a relationship between the bandwidth and parameters of different types of interleavers includes at least one of:

- parameters of interleavers corresponding to the bandwidth of 80 MHz including at least one of: a number of columns of a block interleaver being 3 and a number of rows of the block interleaver being 4; a length of a right angle side of a triangular interleaver being 5; or a number of ladder matrix rows of a ladder interleaver being 5;
- parameters of interleavers corresponding to the bandwidth of 160 MHz including at least one of: a number of columns of a block interleaver being 4 and a number of rows of the block interleaver being 7; a length of a right angle side of a triangular interleaver being 7; or a number of ladder matrix rows of a ladder interleaver being 9; or
- parameters of interleavers corresponding to the bandwidth of 320 MHz including at least one of: a number of columns of a block interleaver being 6 and a number of rows of the block interleaver being 10; a length of a right angle side of a triangular interleaver being 11; or a number of ladder matrix rows of a ladder interleaver being 17.

In some embodiments, in a case of two 20 MHz channels being punctured and the interleaving granularity being 26 tones, a relationship between the bandwidth and parameters of different types of interleavers includes at least one of:

- parameters of interleavers corresponding to the bandwidth of 80 MHz including at least one of: a number of columns of a block interleaver being 3 and a number of rows of the block interleaver being 6; a length of a right angle side of a triangular interleaver being 6; or a number of ladder matrix rows of a ladder interleaver being 6;

parameters of interleavers corresponding to the bandwidth of 160 MHz including at least one of: a number of columns of a block interleaver being 6 and a number of rows of the block interleaver being 9; a length of a right angle side of a triangular interleaver being 10; or a number of ladder matrix rows of a ladder interleaver being 15; or parameters of interleavers corresponding to the bandwidth of 320 MHz including at least one of: a number of columns of a block interleaver being 9 and a number of rows of the block interleaver being 14; a length of a right angle side of a triangular interleaver being 16; or a number of ladder matrix rows of a ladder interleaver being 33.

In some embodiments, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of a block interleaver being 2 and a number of rows of the block interleaver being 4; a length of a right angle side of a triangular interleaver being 4; or a number of ladder matrix rows of a ladder interleaver being 4;

parameters of interleavers corresponding to the bandwidth of 160 MHz including at least one of: a number of columns of a block interleaver being 4 and a number of rows of the block interleaver being 6; a length of a right angle side of a triangular interleaver being 7; or a number of ladder matrix rows of a ladder interleaver being 8; or parameters of interleavers corresponding to the bandwidth of 320 MHz including at least one of: a number of columns of a block interleaver being 7 and a number of rows of the block interleaver being 8; a length of a right angle side of a triangular interleaver being 11; or a number of ladder matrix rows of a ladder interleaver being 16.

In some embodiments, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of a block interleaver being 5 and a number of rows of the block interleaver being 9; a length of a right angle side of a triangular interleaver being 9; or a number of ladder matrix rows of a ladder interleaver being 13; or parameters of interleavers corresponding to the bandwidth of 320 MHz including at least one of: a number of columns of a block interleaver being 9 and a number of rows of the block interleaver being 13; a length of a right angle side of a triangular interleaver being 15; or a number of ladder matrix rows of a ladder interleaver being 31.

In some embodiments, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 5; a length of a right angle side of a triangular interleaver being 6; or a number of ladder matrix rows of a ladder interleaver being 7; or parameters of interleavers corresponding to the bandwidth of 320 MHz including at least one of: a number of columns of a block interleaver being 4 and a number of rows of the block interleaver being 13; a length of a right angle side of a triangular interleaver being 10; or a number of ladder matrix rows of a ladder interleaver being 15.

In some embodiments, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 9; a length of a right angle side of a triangular interleaver being 8; or a number of ladder matrix rows of a ladder interleaver being 11; or parameters of interleavers corresponding to the bandwidth of 320 MHz including at least one of: a number of columns of a block interleaver being 9 and a number of rows of the block interleaver being 12; a length of a right angle side of a triangular interleaver being 15; or a number of ladder matrix rows of a ladder interleaver being 29.

In some embodiments, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of a block interleaver being 4 and a number of rows of the block interleaver being 4; a length of a right angle side of a triangular interleaver being 6; or a number of ladder matrix rows of a ladder interleaver being 6; or parameters of interleavers corresponding to the bandwidth of 320 MHz including at least one of: a number of columns of a block interleaver being 6 and a number of rows of the block interleaver being 8; a length of a right angle side of a triangular interleaver being 10; or a number of ladder matrix rows of a ladder interleaver being 14.

In some embodiments, the method further includes:

in a case where the interleaver includes multiple groups of parameters, adopting one group of parameters among the multiple groups of parameters.

In some embodiments, the bandwidth is a PPDU bandwidth.

In some embodiments, the punctured channel information includes at least one of tones of a punctured channel, a bandwidth of a punctured channel, or a number of punctured channels.

In the embodiments, a method for controlling an interleaver is further provided, which includes:

writing indices of to-be-interleaved elements into units of a triangular interleaver one by one per row, according to a first order, starting from a right angle side of the triangular interleaver;

reading out indices of elements in the units of the triangular interleaver one by one per column, starting from the right angle side.

In some embodiments, the method further includes:

in a case where a total number of the units of the triangular interleaver is greater than a number of the to-be-interleaved elements, after all the to-be-interleaved elements are written into the units of the triangular interleaver, writing null values into remaining units of the triangular interleaver per row.

In some embodiments, during the reading out, null values in units of the triangular interleaver are bypassed.

In some embodiments, the method further includes:

determining a length of the right angle side of the triangular interleaver according to a number of the to-be-interleaved elements;

where the length of the right angle side is used to determine a total number of the units of the triangular interleaver, and the total number of the units of the triangular interleaver is greater than or equal to the number of the to-be-interleaved elements.

In some embodiments, the first order includes an order from small to large, or an order from large to small.

In the embodiments, a method for controlling an interleaver is further provided, which includes:

writing indices of to-be-interleaved elements into units of a spiral interleaver one by one per column, according to a first order, according to at least one of a number of spiral matrix columns, a group size for writing into each group or a step length of a spiral matrix of the spiral interleaver;

reading out indices of elements in the units of the spiral interleaver one by one per row.

In some embodiments, writing the to-be-interleaved elements into the units of the spiral interleaver one by one, according to at least one of the number of spiral matrix columns, the group size for writing into each group or the step length of the spiral matrix of the spiral interleaver, includes:

according to the first order of the to-be-interleaved elements, starting from a k-th column, writing R elements into each column, a (k+1)-th column being lower than the k-th column by S rows;

where k is a column identifier, and a value range of k is from 1 to C, C is the number of the spiral matrix columns, R is the group size for writing into each group, and S is the step length of the spiral matrix.

In some embodiments, the first order includes an order from small to large, or an order from large to small.

In the embodiments, a method for controlling an interleaver is further provided, which includes:

writing indices of to-be-interleaved elements into units of a ladder interleaver one by one per column, according to a first order, according to at least one of a number of ladder matrix columns or a number of ladder matrix rows of the ladder interleaver; reading out indices of elements in the units of the ladder interleaver one by one per row.

In some embodiments, writing the to-be-interleaved elements into the units of the ladder interleaver one by one, according to at least one of the number of ladder matrix columns or the number of ladder matrix rows of the ladder interleaver, includes:

determining the number R of ladder matrix rows, according to the number C of ladder matrix columns and a number N of the to-be-interleaved elements;

padding null values in first (k−1) rows of a k-th column, where a value range of k is from 1 to C;

writing the indices of the to-be-interleaved elements into units of non-null values of the ladder interleaver per column, according to the first order of the to-be-interleaved elements.

In some embodiments, during the reading out, null values in the units of the ladder interleaver are bypassed.

In some embodiments, the first order includes an order from small to large, or an order from large to small.

In the embodiments, a communication method is provided, which includes:

transmitting, by a first device, second information, where the second information is used to indicate an allocation mode and/or an interleaving granularity of an RU.

In some embodiments, the second information is in a U-SIG field and/or an EHT-SIG field of downlink signaling.

In some embodiments, the U-SIG field and/or EHT-SIG field includes at least one of:

a first subfield for representing the allocation mode; or a second subfield for representing the interleaving granularity.

In some embodiments, the first subfield and/or the second subfield uses a reserved field.

In some embodiments, the reserved field used by the first subfield and/or the second subfield is a validate field.

In some embodiments, the reserved field used by the first subfield and/or the second subfield is a disregard field.

In some embodiments, the first subfield is bit B22 in the U-SIG field, and the second subfield is bit B23 in the U-SIG field.

In some embodiments, the first subfield is bit B13 in the EHT-SIG field, and the second subfield is bit B14 in the U-SIG field.

In some embodiments, a value of the first subfield being a first value represents an RU interleaving allocation mode; and a value of the second subfield being a second value represents other non-interleaving allocation modes.

In some embodiments, different values of the second subfield correspond to different RU interleaving granularities.

In some embodiments, the downlink signaling is an EHT TB PPDU and/or an EHT MU PPDU.

In some embodiments, the EHT TB PPDU and/or the EHT MU PPDU further includes at least one of a PPDU bandwidth, punctured channel information, or RU allocation information.

In some embodiments, the punctured channel information includes at least one of tones of a punctured channel, a bandwidth of a punctured channel, or a number of punctured channels.

In some embodiments, the method further includes:

receiving, by the first device, third information, where the third information is used to indicate an allocation mode and/or an interleaving granularity of an RU.

In some embodiments, the third information is in an EHT variant general information field of uplink signaling.

In some embodiments, the third information is in an EHT reserved field of the EHT variant general information field of the uplink signaling, the EHT reserved field includes at least one of:

a first subfield for representing the allocation mode; or a second subfield for representing the interleaving granularity.

In some embodiments, the uplink signaling is a trigger frame for requesting uplink EHT TB PPDU transmission.

In the embodiments, a communication method is provided, which includes:

receiving, by a second device, second information, where the second information is used to indicate an allocation mode and/or an interleaving granularity of an RU.

In some embodiments, the second information is in a U-SIG field and/or an EHT-SIG field of downlink signaling.

In some embodiments, the U-SIG field and/or EHT-SIG field includes at least one of:

a first subfield for representing the allocation mode; or a second subfield for representing the interleaving granularity.

In some embodiments, the first subfield and/or the second subfield uses a reserved field.

In some embodiments, the reserved field used by the first subfield and/or the second subfield is a validate field.

In some embodiments, the reserved field used by the first subfield and/or the second subfield is a disregard field.

In some embodiments, the first subfield is bit B22 in the U-SIG field, and the second subfield is bit B23 in the U-SIG field.

In some embodiments, the first subfield is bit B13 in the EHT-SIG field, and the second subfield is bit B14 in the U-SIG field.

In some embodiments, a value of the first subfield being a first value represents an RU interleaving allocation mode; and a value of the second subfield being a second value represents other non-interleaving allocation modes.

In some embodiments, different values of the second subfield correspond to different RU interleaving granularities.

In some embodiments, the downlink signaling is an EHT TB PPDU and/or an EHT MU PPDU.

In some embodiments, the EHT TB PPDU and/or the EHT MU PPDU further includes at least one of a PPDU bandwidth, punctured channel information, or RU allocation information.

In some embodiments, the punctured channel information includes at least one of tones of a punctured channel, a bandwidth of a punctured channel, or a number of punctured channels.

In some embodiments, the method further includes:

transmitting, by the second device, third information, where the third information is used to indicate an allocation mode and/or an interleaving granularity of an RU.

In some embodiments, the third information is in an EHT variant general information field of uplink signaling.

In some embodiments, the third information is in an EHT reserved field of the EHT variant general information field of the uplink signaling, the EHT reserved field includes at least one of:

a first subfield for representing the allocation mode; or a second subfield for representing the interleaving granularity.

In some embodiments, the uplink signaling is a trigger frame for requesting uplink EHT TB PPDU transmission.

In some embodiments, the method further includes:

determining, by the second device, a parameter of an interleaver according to a PPDU bandwidth, punctured channel information and RU allocation information.

The technical solutions in the embodiments of the present disclosure may be applied to various communication systems, such as: wireless local area networks (WLAN), wireless fidelity (WiFi) or other communication systems.

Exemplarily, a communication system 100 applied by the embodiments of the present disclosure is as shown in FIG. 1. The communication system 100 may include an access point (AP) 110 and a station (STA) 120 accessing a network via the access point 110.

In some scenarios, the AP is alternatively referred to as an AP STA, that is, in a sense, the AP is also an STA.

In some scenarios, the STA is alternatively referred to as a non-AP STA.

The communication in the communication system 100 may be communication between an AP and a non-AP STA, or may also be communication between a non-AP STA and a non-AP STA, or communication between an STA and a peer STA, where the peer STA may refer to a device that communicates with an STA end to end, for example, the peer STA may be an AP or may be also a non-AP STA.

An AP is equivalent to a bridge for connecting a wired network with a wireless network, and has a main function of connecting respective wireless network clients with each other and then makes the wireless network access to Ethernet. An AP device may be a terminal device (such as a mobile phone) or a network device (such as a router). The terminal device or the network device has a chip for implementing a communication function, such as a WLAN or WiFi chip.

It should be understood that, a role of the STA in the communication system is not absolute, for example, in some scenarios, when a mobile phone is connected to a router, the mobile phone is a non-AP STA, and in a case where the mobile phone serves as a hotspot for other mobile phones, the mobile phone plays a role of an AP.

The AP and the non-AP STA may be devices applied in the Internet of Vehicles; Internet of Things nodes and sensors in the Internet of Things (IoT); smart cameras, smart remote controls, smart water and electricity meters in smart homes; and sensors in smart cities, etc.

In some embodiments, the non-AP STA may support an 802.11be standard. The non-AP STA may also support various current and future 802.11 family of wireless local area networks (WLAN) standards, such as 802.11ax, 802.11ac, 802.11n, 802.11g, 802.11b and 802.11a, etc.

In some embodiments, the AP may be a device supporting the 802.11be standard. The AP may also be a device supporting various current and future 802.11 family of WLAN standards, such as 802.11ax, 802.11ac, 802.11n, 802.11g, 802.11b, and 802.11a, etc.

In the embodiments of the present disclosure, the STA may be a mobile phone, a pad, a computer, a virtual reality (VR) device, an augmented reality (AR) device, a wireless device in industrial control, a set-top box, a wireless device in self-driving, a vehicle-mounted communication device, a wireless device in remote medical, a wireless device in a smart grid, a wireless device in transportation safety, a wireless device in a smart city or a wireless device in a smart home, a wireless communication chip/application specific integrated circuit (ASIC)/system-on-chip (SOC)/etc., which support the WLAN/WiFi technology.

Frequency bands which may be supported by the WLAN technology, may include but not limited to: low frequency bands (for example, 2.4 GHZ, 5 GHZ, and 6 GHZ) and high frequency bands (for example, 60 GHz).

FIG. 1 exemplarily illustrates one AP STA and two non-AP STAs, and optionally, the communication system 100 may include a plurality of AP STAs and include other numbers of non-AP STAs, which is not limited in the embodiments of the present disclosure.

It should be understood that, the terms "system" and "network" herein are often used interchangeably herein. The term "and/or" herein is merely to describe an association relationship of associated objects, representing that there may be three relationships, such as A and/or B which may represent three relationships: A alone, A and B both, and B alone. In addition, a character "/" herein generally represents that associated objects before and after "/" are in a relationship of "or".

It should be understood that, the "indication" mentioned in the embodiments of the present disclosure may be a direct indication, an indirect indication, or an indication of an associated relationship. For example, A indicating B may represent that A directly indicates B, for example, B may be obtained through A; A indicating B may also represent that A indirectly indicates B, for example, A indicates C, B may be obtained through C; A indicating Bit may also represent that there is an association relationship between A and B.

In the description of the embodiments of the present disclosure, the term "corresponding" may represent a direct or indirect correspondence between two items, may represent an association relationship between the two items, or may represent a relationship of indicating and being indicated, configuring and being configured, etc.

To facilitate understanding of the technical solutions of the embodiments of the present disclosure, the related technologies of the embodiments of the present disclosure are described below, and the following related technologies as optional solutions may be randomly combined with the technical solutions of the embodiments of the present disclosure, which all belong to the protection scope of the embodiments of the present disclosure.

IEEE 802.11be includes 8 types of RUs, and includes an MRU composed of a plurality of RUs. One RU or one MRU may be allocated to one STA, especially as follows.

(1) RU:

an RU used for uplink and downlink OFDMA (Orthogonal Frequency Division Multiple Access) transmission in an EHT (Extremely High Throughput) PPDU (Physical Layer Protocol Data Unit) may include: 26-tone (tone or channel) RU, 52-tone RU, 106-tone RU, 242-tone RU, 484-tone RU, 996-tone RU, and 2×996-tone RU.

The RUs may be divided into large-size RUs and small-size RUs, with examples as follows:

the large-size RUs: the RU size being greater than or equal to 242-tone, including a 242-tone RU, a 484-tone RU, a 996-tone RU and a 2×996-tone RU;

the small-size RUs: the RU size being smaller than 242-tone, including a 26-tone RU, a 52-tone RU, and a 106-tone RU.

A small-size RU may be used in a 20 MHz, 40 MHz, 80 MHz, 160 MHz or 320 MHz OFDMA EHT PPDU. For example, the 242-tone RU may be used in the 40 MHz, 80 MHz, 160 MHz or 320 MHz OFDMA EHT PPDU; the 484-tone RU may be used in the 80 MHz, 160 MHz or 320 MHz OFDMA EHT PPDU; the 996-tone RU may be used in the 160 MHz or 320 MHz OFDMA EHT PPDU; and the 2×996-tone RU may be used in the 320 MHz OFDMA EHT PPDU.

(2) MRU:

generally, a small-size RU may only be combined with a small-size RU, to form a small-size MRU; and generally, a large-size RU may only be combined with a large-size RU, to form a large-size MRU.

(a) Small Size MRU:

a small-size MRU for the uplink and downlink OFDMA transmission in the EHT PPDU may include: 52+26-tone MRU (representing an MRU composed of a 52-tone RU and a 26-tone RU, and the following similar expressions have similar meanings) and 106+26-tone MRU. The 52-tone RU and the 26-tone RU in any one 52+26-tone MRU need to be from a same 20 MHz sub-channel. A 106-tone RU and a 26-tone RU in any one 106+26-tone MRU need to be from a same 20 MHz sub-channel.

(b) Large-Size MRU:

a large-size MRU for the uplink and downlink OFDMA transmission in the EHT PPDU may include: 484+242-tone MRU, 996+484-tone MRU, 2×996+484-tone MRU, 3×996-tone MRU, and 3×996+484-tone MRU.

The 484+242-tone MRU is allowed to be used in 80 MHz, 160 MHz and 320 MHz OFDMA EHT PPDUs, and the 484-tone RU and the 242-tone RU in any one 484+242-tone MRU need to be from a same 80 MHz sub-channel;

the 996+484-tone MRU is allowed to be used in 160 MHz and 320 MHz OFDMA EHT PPDUs; and the 996-tone RU and the 484-tone RU in any one 996+484-tone MRU need to be from a same 160 MHz sub-channel;

the 2×996+484-tone MRU, the 3×996-tone MRU, and the 3×996+484-tone MRU are allowed to be used in a 320 MHz OFDMA EHT PPDU. And, the 996-tone RUs and the 484-tone RU in any one 2×996+484-tone MRU need to be from three continuous 80 MHz sub-channels.

In a case of large-bandwidth OFDMA EHT PPDU transmission involving multiple STAs (for example, in a case of 320 MHz EHT PPDU transmission involving 16 STAs, where each STA is allocated one 242-tone RU), the RU or MRU allocated to 1 STA can only enjoy a limited frequency diversity gain and cannot enjoy benefits of the large bandwidth.

Figure 2:
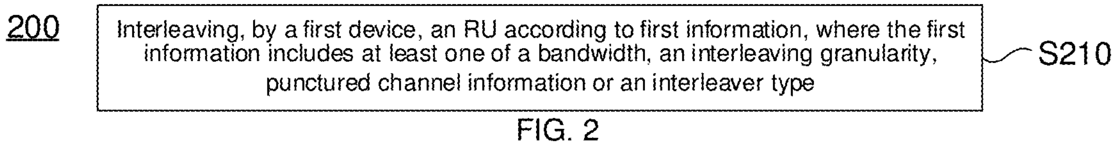
FIG. 2 is a schematic flowchart of an interleaving method 200 according to an embodiment of the present disclosure.

FIG. 2 is a schematic flowchart of an interleaving method 200 according to an embodiment of the present disclosure. The method may optionally be applied to the system shown in FIG. 1, but not limited thereto. The method includes at least some of the following content:

S210, interleaving, by a first device, a resource unit (RU) according to first information, where the first information includes at least one of a bandwidth, an interleaving granularity, punctured channel information or an interleaver type.

In the embodiments of the present disclosure, the first device may be an AP. The interleaving granularity may be referred to as an RU interleaving granularity. For example, the RU interleaving granularity may include 26-tone (which may also be expressed as 26 tones), 52-tone (which may also be expressed as 52 tones), 106-tone (which may also be expressed as 106 tones), etc. The first device, after interleaving the RU, may transmit interleaved RU to one or more second devices. For example, the second device may be an STA. The received RU may be deinterleaved on the second device.

In an implementation, the bandwidth is a PPDU bandwidth. The PPDU bandwidth may include a single RU or MRU. The RU, which needs to be interleaved, may include a single RU or MRU.

In an implementation, the punctured channel information includes at least one of tones of a punctured channel, a bandwidth of a punctured channel, or a number of punctured channels. For example, if a minimum punctured sub-channel is 20 MHz, the tones of the punctured channel correspond to a 242-tone (242 tones) RU. A number of punctured RUs that do not need to participate in the interleaving may be determined according to at least one of the tones of the punctured channel, the bandwidth of the punctured channel, or the number of punctured channels.

In an implementation, interleaving, by the first device, the RU according to the first information, includes:

obtaining punctured RUs according to the interleaving granularity and the punctured channel information;

dividing the bandwidth according to the interleaving granularity, to obtain a plurality of first physical RUs.

In an implementation, interleaving, by the first device, the RU according to the first information, further includes:

removing the punctured RUs from the plurality of first physical RUs, to obtain to-be-interleaved first physical RUs;

interleaving the to-be-interleaved first physical RUs by using an interleaver.

In an implementation, a number of the punctured RUs is a first number, a number of the first physical RUs obtained by dividing the bandwidth is a second number, and a number of first physical RUs with the punctured RUs removed is a third number.

For example, the first number of punctured RUs are obtained according to the interleaving granularity and the punctured channel information; the bandwidth is divided according to the interleaving granularity, so as to obtain the second number of first physical RUs; the first number of punctured RUs are removed from the second number of first physical RUs, so as to obtain the third number of first physical RUs; and the third number of first physical RUs are interleaved by using the interleaver.

In an implementation, interleaving, by the first device, the RU according to the first information, further includes:

using the plurality of first physical RUs obtained by dividing the bandwidth as to-be-interleaved first physical RUs, and interleaving the to-be-interleaved first physical RUs by using an interleaver;

removing the punctured RUs from interleaved first physical RUs.

For example, the first number of punctured RUs is obtained according to the interleaving granularity and the punctured channel information; the bandwidth is divided according to the interleaving granularity, so as to obtain the second number of first physical RUs; and the second number of first physical RUs are interleaved, and the first number of punctured RUs are removed from the second number of interleaved first physical RUs, so as to obtain the third number of interleaved first physical RUs.

In the embodiments of the present disclosure, the punctured RU may be referred to as a punctured reference RU, and the first physical RU may be referred to as a physical reference RU. The reference RU may represent a minimum interleaving unit in the embodiments of the present disclosure.

In an implementation, under different interleaving granularities, the first number of punctured RUs obtained according to the same punctured channel information may be different. For example, if the tones of the punctured channel is 242-tone RU, the interleaving granularity of 26-tone corresponds to the number of punctured RUs of 9; and the interleaving granularity of 52-tone corresponds to the number of punctured RUs of 4.

In an implementation, under different interleaving granularities, the second number of the first physical RUs obtained according to the same bandwidth is different. The second number minus the first number is equal to the third number. The third number of first physical RUs obtained by removing the first number of punctured RUs from the second number of first physical RUs, participate in the interleaving. If the number of tones of the punctured channels changes, the first number, the second number, and the third number may all change.

In an implementation, dividing the bandwidth according to the interleaving granularity, to obtain the plurality of first physical RUs, includes: in a case where the interleaving granularity is 26 tones, dividing the bandwidth according to the interleaving granularity, to obtain the second number of first physical RUs; where each first physical includes 26 tones.

In an implementation, in the case where the interleaving granularity is 26 tones, a relationship between the bandwidth and the second number includes at least one of:

the bandwidth being 80 MHz, and the second number being 36;

the bandwidth being 160 MHz, and the second number being 72; or the bandwidth being 320 MHz, and the second number being 144.

In an implementation, dividing the bandwidth according to the interleaving granularity, to obtain the second number of first physical RUs, includes:

in a case where the interleaving granularity is 52 tones, dividing the bandwidth according to the interleaving granularity, to obtain the second number of first physical RUs and a fourth number of second physical RUs; where each the first physical includes 52 tones, and each the second physical includes 26 tones.

In the embodiments of the present disclosure, if the interleaving granularity is 52 tones, dividing the bandwidth may obtain a portion of first physical RUs each including 52 tones and a portion of second physical RUs each including 26 tones. Herein, the first physical RU including 52 tones participates in the interleaving, and the first physical RU including 26 tones does not participate in the interleaving.

Similarly, if the interleaving granularity is 106 tones, dividing the bandwidth may obtain a portion of first physical RUs each including 106 tones and a portion of second physical RUs each including 26 tones. Herein, the first physical RU including 106 tones participates in the interleaving, and the first physical RU including 26 tones does not participate in the interleaving.

In an implementation, in the case where the interleaving granularity is 52 tones, a relationship between the bandwidth and the second number, and the fourth number includes at least one of:

the bandwidth being 80 MHz, the second number being 16, and the fourth number being 4;

the bandwidth being 160 MHz, the second number being 32, and the fourth number being 8; or the bandwidth being 320 MHz, the second number being 64, and the fourth number being 16.

In an implementation, interleaving the to-be-interleaved first physical RUs by using the interleaver, includes:

interleaving the to-be-interleaved first physical RUs by using the interleaver, and changing an index arrangement order of the to-be-interleaved first physical RUs, to obtain an index arrangement order of interleaved first physical RUs;

mapping the interleaved first physical RUs to at least one of a virtual RU, a virtual MRU, a logical RU or a logical MRU according to the index arrangement order of the interleaved first physical RUs.

For example, an order in which the interleaver writes is different an order in which the interleaver reads out. The index arrangement order (position) of the third number of first physical RUs may be changed, by writing indices of the third number of first physical RUs into units of the interleaver one by one according to a first order, and then reading out the indices of the third number of first physical RUs from the units of the interleaver one by one according to a second order. The indices of the first physical RUs are mapped to indices of virtual RUs in a one-to-one correspondence, according to a new index arrangement order of the interleaved first physical RUs. Optionally, the indices of the first physical RUs may also be mapped to indices of virtual MRUs, logical RUs, or logical MRUs.

In an implementation, an index of each physical RU has a corresponding physical tone index interval range, and an index of each virtual RU has a corresponding virtual tone index interval range. For example, physical tones corresponding to a 52-tone RU1 (an index of the physical RU) are an interval [−499, −448].

In an implementation, after interleaving, the index arrangement order of the physical RUs is changed, but the correspondence between the indices of the physical RUs and the interval ranges of the indices of the physical tones is not changed.

In an implementation, the interleaver is determined according to the interleaver type.

In an implementation, the interleaver type includes at least one of: a block interleaver, a triangular interleaver, a spiral interleaver, or a ladder interleaver. A new index arrangement order of the first physical RUs obtained after being interleaved by using different interleavers, may be different.

In an implementation, a parameter of the interleaver is determined according to the interleaver type and a number of to-be-interleaved first physical RUs. For example, in the method of removing the punctured RUs first and then performing the interleaving, the number of the to-be-interleaved first physical RUs is the third number. For another example, in the method of performing the interleaving first and then removing the punctured RUs, the number of the to-be-interleaved first physical RUs is the second number.

In an implementation, the interleaver type is a block interleaver, and parameters of the block interleaver include a number of columns and a number of rows.

Exemplarily, a process of the interleaving using the block interleaver may include: writing indices of to-be-interleaved elements (for example, the to-be-interleaved first physical RUs), into units of the block interleaver one by one per row, according to the first order; and then, reading out indices of elements in the units of the block interleaver one by one per column. In this way, the arrangement order of indices of the interleaved first physical RUs is changed to the second order.

In an implementation, the first order includes an order from small to large, or an order from large to small.

In an implementation, the interleaver type is a triangular interleaver, and a parameter of the triangular interleaver includes a length of a right angle side.

Exemplarily, a process of the interleaving using the triangular interleaver may include: writing indices of to-be-interleaved elements (for example, the to-be-interleaved first physical RUs), into units of the triangular interleaver one by one per row, according to the first order, starting from the right angle side of the triangular interleaver; and then, reading out indices of elements in the units of the triangular interleaver one by one per column, starting from the right angle side. In this way, the arrangement order of indices of the interleaved first physical RUs is changed to the third order.

Exemplarily, a process of the interleaving using the triangular interleaver may include: writing indices of to-be-interleaved elements (for example, the to-be-interleaved first physical RUs), into units of the triangular interleaver one by one per column, according to the first order, starting from the right angle side of the triangular interleaver; and then, reading out indices of elements in the units of the triangular interleaver one by one per row, starting from the right angle side. In this way, the arrangement order of indices of the interleaved first physical RUs is changed to the third order.

In an implementation, the method further includes: in a case where a total number of the units of the triangular interleaver is greater than a number of the to-be-interleaved elements, after all the to-be-interleaved elements are written into the units of the triangular interleaver, writing null values into remaining units of the triangular interleaver per row.

In an implementation, during the reading out, null values in units of the triangular interleaver are bypassed.

In an embodiment, the method further includes:

determining a length of the right angle side of the triangular interleaver according to a number of the to-be-interleaved elements;

where the length of the right angle side is used to determine a total number of the units of the triangular interleaver, and the total number of the units of the triangular interleaver is greater than or equal to the number of the to-be-interleaved elements.

In an implementation, the interleaver type is a spiral interleaver, and parameters of the spiral interleaver include a number of spiral matrix columns, a group size for writing into each group, and a step length of a spiral matrix.

Exemplarily, a process of the interleaving using the spiral interleaver may include: writing indices of to-be-interleaved elements (for example, the to-be-interleaved first physical RUs), into units of a spiral interleaver one by one, according to a first order, according to at least one of a number of spiral matrix columns, a group size for writing into each group or a step length of a spiral matrix of the spiral interleaver; and then, reading out indices of elements in the units of the spiral interleaver one by one per row. In this way, the arrangement order of indices of the interleaved first physical RUs is changed to the fourth order.

In an implementation, writing the to-be-interleaved elements into the units of the spiral interleaver one by one, according to at least one of the number of spiral matrix columns, the group size for writing into each group or the step length of the spiral matrix of the spiral interleaver, includes:

according to the first order of the to-be-interleaved elements, starting from a k-th column, writing R elements into each column, a (k+1)-th column being lower than the k-th column by S rows;

where k is a column identifier, and a value range of k is from 1 to C, C is the number of the spiral matrix columns, R is the group size for writing into each group, and S is the step length of the spiral matrix.

In an implementation, the number of the spiral matrix columns of the spiral interleaver is 3, the group size for writing into each group is 2, and the step length of the spiral matrix is 1. The values of the parameters of the spiral interleaver are only examples and not limitations, and the number of the spiral matrix columns, the group size for writing into each group, and the step length of the spiral matrix may also be other values, which may be flexibly selected according to needs of actual applications. For example, the number of the spiral matrix columns may be 4, 5 or 6, etc., the group size for writing into each group may be 3 or 4, etc., and the step length of the spiral matrix may be 2 or 3, etc.

In an implementation, the interleaver type is a ladder interleaver, and parameters of the ladder interleaver include a number of ladder matrix columns and a number of ladder matrix rows.

Exemplarily, a process of the interleaving using the ladder interleaver may include: writing indices of to-be-interleaved elements into units of a ladder interleaver one by one per column, according to a first order, according to at least one of a number of ladder matrix columns or a number of ladder matrix rows of the ladder interleaver; and then reading out indices of elements in the units of the ladder interleaver one by one per row. In this way, the arrangement order of indices of the interleaved first physical RUs is changed to the fifth order.

In an implementation, writing the to-be-interleaved elements into the units of the ladder interleaver one by one, according to at least one of the number of ladder matrix columns or the number of ladder matrix rows of the ladder interleaver, includes:

- determining the number R of ladder matrix rows, according to the number C of ladder matrix columns and a number N of the to-be-interleaved elements;
- padding null values in first (k−1) rows of a k-th column, where a value range of k is from 1 to C;
- writing the indices of the to-be-interleaved elements into units of non-null values of the ladder interleaver per column, according to the first order of the to-be-interleaved elements.

In an implementation, during the reading out, null values in the units of the ladder interleaver are bypassed.

In an implementation, the number of columns of the ladder interleaver is 4. The value of the number of columns of the ladder interleaver is only an example and not a limitation, and the number of columns of the ladder interleaver may also be other values, which may be flexibly selected according to the needs of actual applications. For example, the number of columns of the ladder interleaver is 5 or 6. If the number of columns of the ladder interleaver is changed, the number of rows of the ladder interleaver may also be changed accordingly.

In an implementation, in a case of no punctured channel and the interleaving granularity being 26 tones, a relationship between the bandwidth and parameters of different types of interleavers includes at least one of:

- parameters of interleavers corresponding to the bandwidth of 80 MHz including at least one of: a number of columns of the block interleaver being 4 and a number of rows of the block interleaver being 9, or the number of columns being 6 and the number of rows being 6; a length of a right angle side of the triangular interleaver being 8; or a number of ladder matrix rows of the ladder interleaver being 11;
- parameters of interleavers corresponding to the bandwidth of 160 MHz including at least one of: a number of columns of the block interleaver being 6 and a number of rows of the block interleaver being 12, or the number of columns being 8 and the number of rows being 9; a length of a right angle side of the triangular interleaver being 12; or a number of ladder matrix rows of the ladder interleaver being 20; or
- parameters of interleavers corresponding to the bandwidth of 320 MHz including at least one of: a number of columns of the block interleaver being 8 and a number of rows of the block interleaver being 18, or the number of columns being 9 and the number of rows being 16, or the number of columns being 12 and the number of rows being 12; a length of a right angle side of the triangular interleaver being 17; or a number of ladder matrix rows of the ladder interleaver being 38.

In an implementation, in a case of no punctured channel and the interleaving granularity being 52 tones, a relationship between the bandwidth and parameters of different types of interleavers includes at least one of:

- parameters of interleavers corresponding to the bandwidth of 80 MHz including at least one of: a number of columns of the block interleaver being 4 and a number of rows of the block interleaver being 4; a length of a right angle side of the triangular interleaver being 6; or a number of ladder matrix rows of the ladder interleaver being 6;
- parameters of interleavers corresponding to the bandwidth of 160 MHz including at least one of: a number of columns of the block interleaver being 4 and a number of rows of the block interleaver being 8; a length of a right angle side of the triangular interleaver being 8; or a number of ladder matrix rows of the ladder interleaver being 10; or
- parameters of interleavers corresponding to the bandwidth of 320 MHz including at least one of: a number of columns of the block interleaver being 8 and a number of rows of the block interleaver being 8; a length of a right angle side of the triangular interleaver being 11; or a number of ladder matrix rows of the ladder interleaver being 18.

In an implementation, in a case of one 20 MHz channel being punctured and the interleaving granularity being 26 tones, a relationship between the bandwidth and parameters of different types of interleavers includes at least one of:

- parameters of interleavers corresponding to the bandwidth of 80 MHz including at least one of: a number of columns of the block interleaver being 3 and a number of rows of the block interleaver being 9; a length of a right angle side of the triangular interleaver being 7; or a number of ladder matrix rows of the ladder interleaver being 9;
- parameters of interleavers corresponding to the bandwidth of 160 MHz including at least one of: a number of columns of the block interleaver being 3 and a number of rows of the block interleaver being 9; a length of a right angle side of the triangular interleaver being 7; or a number of ladder matrix rows of the ladder interleaver being 9; or
- parameters of interleavers corresponding to the bandwidth of 320 MHz including at least one of: a number of columns of the block interleaver being 5 and a number of rows of the block interleaver being 27; a length of a right angle side of the triangular interleaver being 16; or a number of ladder matrix rows of the ladder interleaver being 36.

In an implementation, in a case of one 20 MHz channel being punctured and the interleaving granularity being 52 tones, a relationship between the bandwidth and parameters of different types of interleavers includes at least one of:

- parameters of interleavers corresponding to the bandwidth of 80 MHz including at least one of: a number of columns of the block interleaver being 3 and a number of rows of the block interleaver being 4; a length of a right angle side of the triangular interleaver being 5; or a number of ladder matrix rows of the ladder interleaver being 5;
- parameters of interleavers corresponding to the bandwidth of 160 MHz including at least one of: a number of columns of the block interleaver being 4 and a number of rows of the block interleaver being 7; a length of a right angle side of the triangular interleaver being 7; or a number of ladder matrix rows of the ladder interleaver being 9; or parameters of interleavers corresponding to the bandwidth of 320 MHz including at least one of: a number of columns of the block interleaver being 6 and a number of rows of the block interleaver being 10; a length of a right angle side of the triangular interleaver being 11; or a number of ladder matrix rows of the ladder interleaver being 17.

In an implementation, in a case of two 20 MHz channels being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 6; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 6 and a number of rows of the block interleaver being 9; a length of a right angle side of the triangular interleaver being 10; or a number of ladder matrix rows of the ladder interleaver being 15; or parameters of interleavers corresponding to the bandwidth of 320 MHz including at least one of: a number of columns of the block interleaver being 9 and a number of rows of the block interleaver being 14; a length of a right angle side of the triangular interleaver being 16; or a number of ladder matrix rows of the ladder interleaver being 33.

In an implementation, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 2 and a number of rows of the block interleaver being 4; a length of a right angle side of the triangular interleaver being 4; or a number of ladder matrix rows of the ladder interleaver being 4;

parameters of interleavers corresponding to the bandwidth of 160 MHz including at least one of: a number of columns of the block interleaver being 4 and a number of rows of the block interleaver being 6; a length of a right angle side of the triangular interleaver being 7; or a number of ladder matrix rows of the ladder interleaver being 8; or parameters of interleavers corresponding to the bandwidth of 320 MHz including at least one of: a number of columns of the block interleaver being 7 and a number of rows of the block interleaver being 8; a length of a right angle side of the triangular interleaver being 11; or a number of ladder matrix rows of the ladder interleaver being 16.

In an implementation, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 5 and a number of rows of the block interleaver being 9; a length of a right angle side of the triangular interleaver being 9; or a number of ladder matrix rows of the ladder interleaver being 13; or parameters of interleavers corresponding to the bandwidth of 320 MHz including at least one of: a number of columns of the block interleaver being 9 and a number of rows of the block interleaver being 13; a length of a right angle side of the triangular interleaver being 15; or a number of ladder matrix rows of the ladder interleaver being 31.

In an implementation, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 5; a length of a right angle side of the triangular interleaver being 6; or a number of ladder matrix rows of the ladder interleaver being 7; or parameters of interleavers corresponding to the bandwidth of 320 MHz including at least one of: a number of columns of the block interleaver being 4 and a number of rows of the block interleaver being 13; a length of a right angle side of the triangular interleaver being 10; or a number of ladder matrix rows of the ladder interleaver being 15.

In an implementation, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 9; a length of a right angle side of the triangular interleaver being 8; or a number of ladder matrix rows of the ladder interleaver being 11; or parameters of interleavers corresponding to the bandwidth of 320 MHz including at least one of: a number of columns of the block interleaver being 9 and a number of rows of the block interleaver being 12; a length of a right angle side of the triangular interleaver being 15; or a number of ladder matrix rows of the ladder interleaver being 29.

In an implementation, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 4; a length of a right angle side of the triangular interleaver being 6; or a number of ladder matrix rows of the ladder interleaver being 6; or parameters of interleavers corresponding to the bandwidth of 320 MHz including at least one of: a number of columns of the block interleaver being 6 and a number of rows of the block interleaver being 8; a length of a right angle side of the triangular interleaver being 10; or a number of ladder matrix rows of the ladder interleaver being 14.

In the embodiments of the present disclosure, in the relationships between the punctured channel information, the interleaving granularity, the bandwidth and parameters of different types of interleavers, the values of the parameters of the interleavers are only examples and not limitations, and the parameters of the interleavers may also be other values, which may be flexibly selected according to needs of actual applications. For example, the relationships between the punctured channel information, the interleaving granularity, the bandwidth and the parameters of different types of interleavers may be stored by way of a table or the like. In the actual applications, the selection may be made by looking up the table according to needs.

In an implementation, the method further includes: in a case where the interleaver includes multiple groups of parameters, adopting one group of parameters among the multiple groups of parameters. For example, in the case where the block interleaver includes multiple groups of parameters, the number of rows and the number of columns of one group among the multiple groups of parameters are adopted. For another example, in the case where the triangular interleaver includes multiple groups of parameters, the length of the right angle side of one group of the multiple groups of parameters is adopted. For another example, in the case where the spiral interleaver includes multiple groups of parameters, the number of the spiral matrix columns, the group size for writing into each group, and the step length of the spiral matrix of one group of the multiple groups of parameters are adopted. For another example, in the case where the ladder interleaver includes multiple groups of parameters, the number of the ladder matrix columns and the number of the ladder matrix rows of one group of the multiple groups of parameters are adopted.

Figure 3:
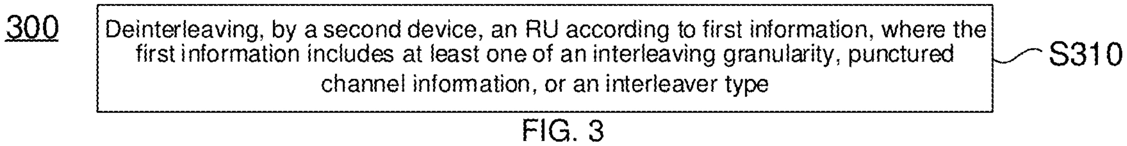
FIG. 3 is a schematic flowchart of a deinterleaving method 300 according to an embodiment of the present disclosure.

FIG. 3 is a schematic flowchart of a deinterleaving method 300 according to an embodiment of the present disclosure. The method may optionally be applied to the system shown in FIG. 1, but not limited thereto. The terms used in the deinterleaving method have the same meanings as those in the interleaving method described above, and are not repeated here. The deinterleaving method includes at least some of the following content:

S310, deinterleaving, by a second device, a resource unit (RU) according to first information, where the first information includes at least one of an interleaving granularity, punctured channel information, or an interleaver type.

In the embodiments of the present disclosure, the first device may be an AP. The interleaving granularity may be referred to as RU interleaving granularity. The first device, after interleaving the RU, may transmit interleaved RU to one or more second devices. For example, the second device may be an STA. The received RU may be deinterleaved on the second device.

In an implementation, deinterleaving, by the second device, the resource unit according to the first information, includes:

acquiring first physical RUs corresponding to at least one of a virtual RU, a virtual MRU, a logical RU, or a logical MRU.

In an implementation, deinterleaving, by the second device, the resource unit according to the first information, further includes:

using acquired first physical RUs as to-be-deinterleaved first physical RUs, and deinterleaving the to-be-deinterleaved first physical RUs by using an interleaver, to obtain deinterleaved first physical RUs;

combining the deinterleaved first physical RUs and punctured RUs.

For example, if the punctured RUs are removed first and then the interleaving is performed during the interleaving process, then the deinterleaving may be performed first and then the combination with the punctured RUs may be performed in the deinterleaving process. In this implementation, a number of the punctured RUs is a first number, each of a number of the to-be-deinterleaved first physical RUs and a number of the deinterleaved first physical RUs is a third number, and a number of the first physical RUs obtained by the combining is a second number. The second number of first physical RUs obtained by the combining may be used as recovered first physical RUs. For example, in a case where the interleaving granularity is 26 tones, the second number of first physical RUs obtained by the combining are used as the recovered first physical RUs.

In an implementation, deinterleaving, by the second device, the resource unit according to the first information, further includes:

combining acquired first physical RUs and punctured RUs to obtain to-be-deinterleaved first physical RUS;

deinterleaving the to-be-deinterleaved first physical RUs by using an interleaver, to obtain deinterleaved first physical RUs.

For example, if the interleaving is performed first and then the punctured RUs are removed in the interleaving process, then in the deinterleaving process, the combination with the punctured RUs may be performed first and then the deinterleaving is performed. In this implementation, a number of the punctured RUs is a first number, and each of a number of the to-be-deinterleaved first physical RUs and a number of the deinterleaved first physical RUs is a second number. The second number of the deinterleaved first physical RUs may be used as recovered first physical RUs. For example, in a case where the interleaving granularity is 26 tones, the second number of the deinterleaved first physical RUs are used as the recovered first physical RUs.

In an implementation, deinterleaving the to-be-deinterleaved first physical RUs by using the interleaver, includes: deinterleaving the to-be-deinterleaved first physical RUs by using the interleaver, and recovering an index arrangement order of the to-be-deinterleaved first physical RUs.

In an implementation, in a case where the interleaving granularity is 26 tones, the first physical RU includes 26 tones, and a relationship between the bandwidth and the second number includes at least one of:

the bandwidth being 80 MHz, and the second number being 36;

the bandwidth being 160 MHz, and the second number being 72; or the bandwidth being 320 MHz, and the second number being 144.

In an implementation, deinterleaving, by the second device, the resource unit according to the first information, further includes:

combining the second number of first physical RUs and a fourth number of second physical RUs, to obtain recovered first physical RUs.

For example, in a case where the interleaving granularity is 52 tones, the second number of first physical RUs and the fourth number of second physical RUs may be combined as the recovered first physical RUs.

In an implementation, in a case where the interleaving granularity is 52 tones, the first physical RU includes 52 tones, the second physical RU includes 26 tones, a relationship between the bandwidth and the second number, and the fourth number includes at least one of:

- the bandwidth being 80 MHz, the second number being 16, and the fourth number being 4;
- the bandwidth being 160 MHz, the second number being 32, and the fourth number being 8; or
- the bandwidth being 320 MHz, the second number being 64, and the fourth number being 16.

In an implementation, an index of each physical RU has a corresponding physical tone index interval range, and an index of each virtual RU has a corresponding virtual tone index interval range.

In an implementation, the interleaver is determined according to the interleaver type.

In an implementation, the interleaver type includes at least one of: a block interleaver, a triangular interleaver, a spiral interleaver, or a ladder interleaver.

In an implementation, a parameter of the interleaver is determined according to the interleaver type and a number of the to-be-deinterleaved first physical RUs.

In the embodiments of the present disclosure, the deinterleaving process may be a reverse order of the interleaving process, and the deinterleaving processes of different types of interleavers may be different.

In an implementation, the interleaver type is a block interleaver, and parameters of the block interleaver include a number of columns and a number of rows.

Exemplarily, if the interleaving process is for writing per row and reading out per column, the deinterleaving process using the block interleaver may be for writing per column and reading out per row. The process may include: writing indices of to-be-deinterleaved elements into units of the block interleaver one by one per column according to an index arrangement order of the to-be-deinterleaved elements; and then reading out indices of elements in the units of the block interleaver one by one per row. In this way, the index arrangement order of the deinterleaved first physical RUs is recovered to the first order. Herein, the second order of the indices of the to-be-deinterleaved elements may be the second order of the received to-be-deinterleaved first physical RUs.

In addition, if the interleaving process is for writing per column and reading out per row, the deinterleaving using the block interleaver may be for writing per row and reading out per column. The specific process will not be repeated.

In an implementation, the first order includes an order from small to large, or an order from large to small.

In an implementation, the interleaver type is a triangular interleaver, and a parameter of the triangular interleaver includes a length of a right angle side.

Exemplarily, if the interleaving process is for writing per row and reading out per column, the deinterleaving process by using the triangular interleaver may include: writing indices of to-be-deinterleaved elements into units of the triangular interleaver one by one per column, according to an index arrangement order of the to-be-deinterleaved elements, starting from the right angle side of the triangular interleaver; and then, reading out indices of elements in the units of the triangular interleaver one by one per row, starting from the right angle side. In this way, the arrangement order of indices of the deinterleaved first physical RUs is recovered to the first order.

In the deinterleaving process by using the triangular interleaver, the index arrangement order of the to-be-deinterleaved elements may be different from the third order of indices of first physical RUs received by the second device (some null values may not be read out during the interleaving). The indices that need to be rearranged and are calculated first in the interleaving process, may be used as the to-be-deinterleaved elements. For example, the index arrangement order of the received first physical RUs is an array A1 [1, 7, 12, 16, 2, 8, 13, 3, 9, 14, 4, 10, 15, 5, 11, 6]. According to the PPDU bandwidth, the punctured channel information, the RU allocation information, a maximum index number 16, etc., the length of the right angle side of the triangular interleaver may be obtained as 6. After calculating according to the interleaving order, the index arrangement order of the to-be-deinterleaved elements may be obtained as an array A2 [1, 7, 12, 16, null, null, 2, 8, 13, null, null, 3, 9, 14, null, 4, 10, 15, 5, 11, 6]. The array A2 is written per column and read out per row, starting from the right angle side of the triangular interleaver.

In addition, if the interleaving process is for writing per column and reading out per row, the deinterleaving by using the triangular interleaver may be for writing per row and reading out per column. The specific process will not be repeated.

In an implementation, the method further includes:

- determining a length of the right angle side of the triangular interleaver according to a number of the to-be-deinterleaved elements;
- where the length of the right angle side is used to determine a total number of the units of the triangular interleaver, and the total number of the units of the triangular interleaver is greater than or equal to the number of the to-be-deinterleaved elements.

In an implementation, the interleaver type is a spiral interleaver, and parameters of the spiral interleaver include a number of spiral matrix columns, a group size for writing into each group and a step length of a spiral matrix.

Exemplarily, the interleaving process by using the spiral interleaver may include: writing indices of the to-be-deinterleaved elements into units of the spiral interleaver one by one per row according to the index arrangement order of the to-be-deinterleaved elements and per column; and then, reading out indices of elements in the units of the spiral interleaver one by one per column, according to at least one of the number of spiral matrix columns, the group size for writing into each group or the step length of the spiral matrix of the spiral interleaver. In this way, the arrangement order of indices of the interleaved first physical RUs is recovered to the first order.

In an implementation, reading out indices of elements in the units of the spiral interleaver one by one per column, according to at least one of the number of spiral matrix columns, the group size for writing into each group or the step length of the spiral matrix of the spiral interleaver, includes:

- according to the first order of the to-be-deinterleaved elements, starting from a k-th column, reading out R elements from each column, a (k+1)-th column being lower than the k-th column by S rows;
- where k is a column identifier, and a value range of k is from 1 to C, C is the number of the spiral matrix columns, R is the group size for writing into each group, and S is the step length of the spiral matrix.

In an implementation, the number of the spiral matrix columns of the spiral interleaver is 3, the group size for writing into each group is 2, and the step length of the spiral matrix is 1.

In an implementation, the interleaver type is a ladder interleaver, and parameters of the ladder interleaver include a number of ladder matrix columns and a number of ladder matrix rows.

Exemplarily, if the ladder interleaver is for writing per column and reading out per row in the interleaving process, the deinterleaving process by using the ladder interleaver may include: writing indices of the to-be-deinterleaved elements into units of the ladder interleaver one by one per row according to the first order, according to at least one of the number of ladder matrix columns or the number of ladder matrix rows of the ladder interleaver; and then, reading out indices of elements in the units of the ladder interleaver one by one per column. In this way, the arrangement order of indices of the interleaved first physical RUs is changed to the fifth order.

In the deinterleaving process by using the ladder interleaver, the index arrangement order of the to-be-deinterleaved elements may be different from the fourth order of indices of first physical RUs received by the second device (some null values may not be read out during the interleaving). The indices that need to be rearranged by using the ladder interleaver and are calculated first in the interleaving process, may be used as the to-be-deinterleaved elements. For example, the index arrangement order of the received first physical RUs is an array B1 [18, 17, 12, 16, 11, 7, 15, 10, 6, 3, 14, 9, 5, 2, 13, 8, 4, 1]. According to the PPDU bandwidth, the punctured channel information, the RU allocation information, a maximum index number 18, etc., the number of columns and the number of rows of the ladder interleaver may be obtained as 4 and 6 respectively. After calculating according to the interleaving method in the above embodiments, the index arrangement order of the to-be-deinterleaved elements may be obtained as an array B2 [18, null, null, null, 17, 12, null, null, 16, 11, 7, null, 15, 10, 6, 3, 14, 9, 5, 2, 13, 8, 4, 1]. The array B2 is written per row and read out per column in the ladder interleaver.

In an implementation, the number of columns of the ladder interleaver is 4.

In an implementation, in a case of no punctured channel and the interleaving granularity being 26 tones, a relationship between the bandwidth and parameters of different types of interleavers includes at least one of:

- parameters of interleavers corresponding to the bandwidth of 80 MHz including at least one of: a number of columns of the block interleaver being 4 and a number of rows of the block interleaver being 9, or the number of columns being 6 and the number of rows being 6; a length of a right angle side of the triangular interleaver being 8; or a number of ladder matrix rows of the ladder interleaver being 11;
- parameters of interleavers corresponding to the bandwidth of 160 MHz including at least one of: a number of columns of the block interleaver being 6 and a number of rows of the block interleaver being 12, or the number of columns being 8 and the number of rows being 9; a length of a right angle side of the triangular interleaver being 12; or a number of ladder matrix rows of the ladder interleaver being 20; or
- parameters of interleavers corresponding to the bandwidth of 320 MHz including at least one of: a number of columns of the block interleaver being 8 and a number of rows of the block interleaver being 18, or the number of columns being 9 and the number of rows being 16, or the number of columns being 12 and the number of rows being 12; a length of a right angle side of the triangular interleaver being 17; or a number of ladder matrix rows of the ladder interleaver being 38.

In an implementation, in a case of no punctured channel and the interleaving granularity being 52 tones, a relationship between the bandwidth and parameters of different types of interleavers includes at least one of:

- parameters of interleavers corresponding to the bandwidth of 80 MHz including at least one of: a number of columns of the block interleaver being 4 and a number of rows of the block interleaver being 4; a length of a right angle side of the triangular interleaver being 6; or a number of ladder matrix rows of the ladder interleaver being 6;
- parameters of interleavers corresponding to the bandwidth of 160 MHz including at least one of: a number of columns of the block interleaver being 4 and a number of rows of the block interleaver being 8; a length of a right angle side of the triangular interleaver being 8; or a number of ladder matrix rows of the ladder interleaver being 10; or
- parameters of interleavers corresponding to the bandwidth of 320 MHz including at least one of: a number of columns of the block interleaver being 8 and a number of rows of the block interleaver being 8; a length of a right angle side of the triangular interleaver being 11; or a number of ladder matrix rows of the ladder interleaver being 18.

In an implementation, in a case of one 20 MHz channel being punctured and the interleaving granularity being 26 tones, a relationship between the bandwidth and parameters of different types of interleavers includes at least one of:

- parameters of interleavers corresponding to the bandwidth of 80 MHz including at least one of: a number of columns of the block interleaver being 3 and a number of rows of the block interleaver being 9; a length of a right angle side of the triangular interleaver being 7; or a number of ladder matrix rows of the ladder interleaver being 9;
- parameters of interleavers corresponding to the bandwidth of 160 MHz including at least one of: a number of columns of the block interleaver being 3 and a number of rows of the block interleaver being 9; a length of a right angle side of the triangular interleaver being 7; or a number of ladder matrix rows of the ladder interleaver being 9; or
- parameters of interleavers corresponding to the bandwidth of 320 MHz including at least one of: a number of columns of the block interleaver being 5 and a number of rows of the block interleaver being 27; a length of a right angle side of the triangular interleaver being 16; or a number of ladder matrix rows of the ladder interleaver being 36.

In an implementation, in a case of one 20 MHz channel being punctured and the interleaving granularity being 52 tones, a relationship between the bandwidth and parameters of different types of interleavers includes at least one of:

- parameters of interleavers corresponding to the bandwidth of 80 MHz including at least one of: a number of columns of the block interleaver being 3 and a number of rows of the block interleaver being 4; a length of a right angle side of the triangular interleaver being 5; or a number of ladder matrix rows of the ladder interleaver being 5;
- parameters of interleavers corresponding to the bandwidth of 160 MHz including at least one of: a number of columns of the block interleaver being 4 and a number of rows of the block interleaver being 7; a length of a right angle side of the triangular interleaver being 7; or a number of ladder matrix rows of the ladder interleaver being 9; or
- parameters of interleavers corresponding to the bandwidth of 320 MHz including at least one of: a number of columns of the block interleaver being 6 and a number of rows of the block interleaver being 10; a length of a right angle side of the triangular interleaver being 11; or a number of ladder matrix rows of the ladder interleaver being 17.

In an implementation, in a case of two 20 MHz channels being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 6; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 6 and a number of rows of the block interleaver being 9; a length of a right angle side of the triangular interleaver being 10; or a number of ladder matrix rows of the ladder interleaver being 15; or parameters of interleavers corresponding to the bandwidth of 320 MHz including at least one of: a number of columns of the block interleaver being 9 and a number of rows of the block interleaver being 14; a length of a right angle side of the triangular interleaver being 16; or a number of ladder matrix rows of the ladder interleaver being 33.

In an implementation, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 2 and a number of rows of the block interleaver being 4; a length of a right angle side of the triangular interleaver being 4; or a number of ladder matrix rows of the ladder interleaver being 4;

parameters of interleavers corresponding to the bandwidth of 160 MHz including at least one of: a number of columns of the block interleaver being 4 and a number of rows of the block interleaver being 6; a length of a right angle side of the triangular interleaver being 7; or a number of ladder matrix rows of the ladder interleaver being 8; or parameters of interleavers corresponding to the bandwidth of 320 MHz including at least one of: a number of columns of the block interleaver being 7 and a number of rows of the block interleaver being 8; a length of a right angle side of the triangular interleaver being 11; or a number of ladder matrix rows of the ladder interleaver being 16.

In an implementation, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 5 and a number of rows of the block interleaver being 9; a length of a right angle side of the triangular interleaver being 9; or a number of ladder matrix rows of the ladder interleaver being 13; or parameters of interleavers corresponding to the bandwidth of 320 MHz including at least one of: a number of columns of the block interleaver being 9 and a number of rows of the block interleaver being 13; a length of a right angle side of the triangular interleaver being 15; or a number of ladder matrix rows of the ladder interleaver being 31.

In an implementation, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 5; a length of a right angle side of the triangular interleaver being 6; or a number of ladder matrix rows of the ladder interleaver being 7; or parameters of interleavers corresponding to the bandwidth of 320 MHz including at least one of: a number of columns of the block interleaver being 4 and a number of rows of the block interleaver being 13; a length of a right angle side of the triangular interleaver being 10; or a number of ladder matrix rows of the ladder interleaver being 15.

In an implementation, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 9; a length of a right angle side of the triangular interleaver being 8; or a number of ladder matrix rows of the ladder interleaver being 11; or parameters of interleavers corresponding to the bandwidth of 320 MHz including at least one of: a number of columns of the block interleaver being 9 and a number of rows of the block interleaver being 12; a length of a right angle side of the triangular interleaver being 15; or a number of ladder matrix rows of the ladder interleaver being 29.

In an implementation, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 4; a length of a right angle side of the triangular interleaver being 6; or a number of ladder matrix rows of the ladder interleaver being 6; or parameters of interleavers corresponding to the bandwidth of 320 MHz including at least one of: a number of columns of the block interleaver being 6 and a number of rows of the block interleaver being 8; a length of a right angle side of the triangular interleaver being 10; or a number of ladder matrix rows of the ladder interleaver being 14.

In an implementation, the method further includes: in a case where the interleaver includes multiple groups of parameters, adopting one group of parameters among the multiple groups of parameters.

In an implementation, the bandwidth is a PPDU bandwidth.

In an implementation, the punctured channel information includes at least one of tones of a punctured channel, a bandwidth of a punctured channel, or a number of punctured channels.

In the embodiments of the present disclosure, in the relationships between the punctured channel information, the interleaving granularity, the bandwidth and parameters of different types of interleavers, the values of the parameters of the interleavers are only examples and not limitations, and the parameters of the interleavers may also be other values, which may be flexibly selected according to needs of actual applications. For example, the relationships between the punctured channel information, the interleaving granularity, the bandwidth and the parameters of different types of interleavers may be stored by way of a table or the like. In the actual applications, the selection may be made by looking up the table according to needs.

Figure 4:
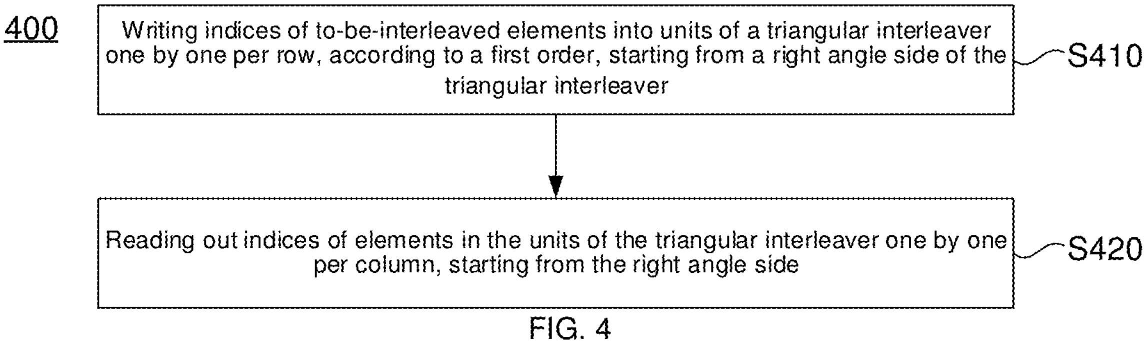
FIG. 4 is a schematic flowchart of a method 400 for controlling an interleaver according to an embodiment of the present disclosure.

FIG. 4 is a schematic flowchart of a method 400 for controlling an interleaver according to an embodiment of the present disclosure. The method may optionally be applied to the system shown in FIG. 1, but not limited thereto. The method includes at least some of the following content:

- S410, writing indices of to-be-interleaved elements into units of a triangular interleaver one by one per row, according to a first order, starting from a right angle side of the triangular interleaver;
- S420, reading out indices of elements in the units of the triangular interleaver one by one per column, starting from the right angle side.

In an implementation, the method further includes: in a case where a total number of the units of the triangular interleaver is greater than a number of the to-be-interleaved elements, after all the to-be-interleaved elements are written into the units of the triangular interleaver, writing null values into remaining units of the triangular interleaver per row.

In an implementation, during the reading out, null values in units of the triangular interleaver are bypassed.

In an implementation, the method further includes: determining a length of the right angle side of the triangular interleaver according to a number of the to-be-interleaved elements;

where the length of the right angle side is used to determine a total number of the units of the triangular interleaver, and the total number of the units of the triangular interleaver is greater than or equal to the number of the to-be-interleaved elements.

In an implementation, the first order includes an order from small to large, or an order from large to small.

In an implementation, an example of the value of the length of the right angle side of the triangular interleaver may refer to the relevant description in the above interleaving method or deinterleaving method embodiments, which will not be repeated here. The interleaving and/or deinterleaving process by using the triangular interleaver may refer to the relevant description in the above interleaving method or deinterleaving method embodiments, which will not be repeated here.

Figure 5:
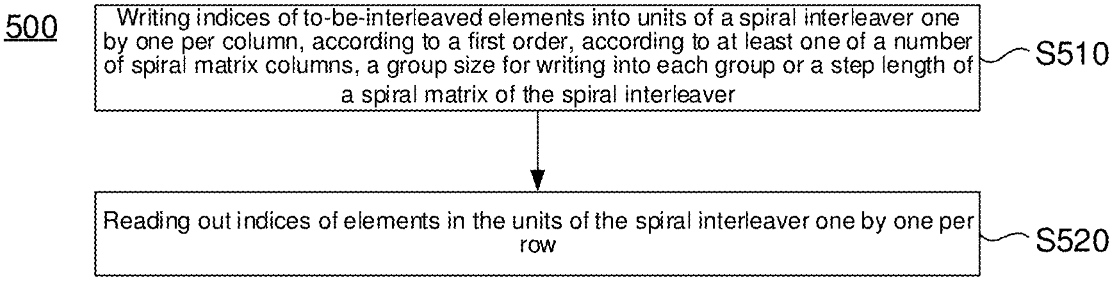
FIG. 5 is a schematic flowchart of a method 500 for controlling an interleaver according to an embodiment of the present disclosure.

FIG. 5 is a schematic flowchart of a method 500 for controlling an interleaver according to an embodiment of the present disclosure. The method may optionally be applied to the system shown in FIG. 1, but not limited thereto. The method includes at least some of the following content:

- S510, writing indices of to-be-interleaved elements into units of a spiral interleaver one by one per column, according to a first order, according to at least one of a number of spiral matrix columns, a group size for writing into each group or a step length of a spiral matrix of the spiral interleaver;
- S520, reading out indices of elements in the units of the spiral interleaver one by one per row.

In an implementation, writing the to-be-interleaved elements into the units of the spiral interleaver one by one, according to at least one of the number of spiral matrix columns, the group size for writing into each group or the step length of the spiral matrix of the spiral interleaver, includes:

according to the first order of the to-be-interleaved elements, starting from a k-th column, writing R elements into each column, a (k+1)-th column being lower than the k-th column by S rows;

where k is a column identifier, and a value range of k is from 1 to C, C is the number of the spiral matrix columns, R is the group size for writing into each group, and S is the step length of the spiral matrix.

In an implementation, C, R, and S are positive integers greater than 1.

In an implementation, the first order includes an order from small to large, or an order from large to small.

In an implementation, an example of a value of at least one of the number of spiral matrix columns, the group size for writing into each group or the step length of the spiral matrix of the spiral interleaver may refer to the relevant description in the above interleaving method or deinterleaving method embodiments, which will not be repeated here. The interleaving and/or deinterleaving process by using the spiral interleaver may refer to the relevant description in the above interleaving method or deinterleaving method embodiments, which will not be repeated here.

Figure 6:
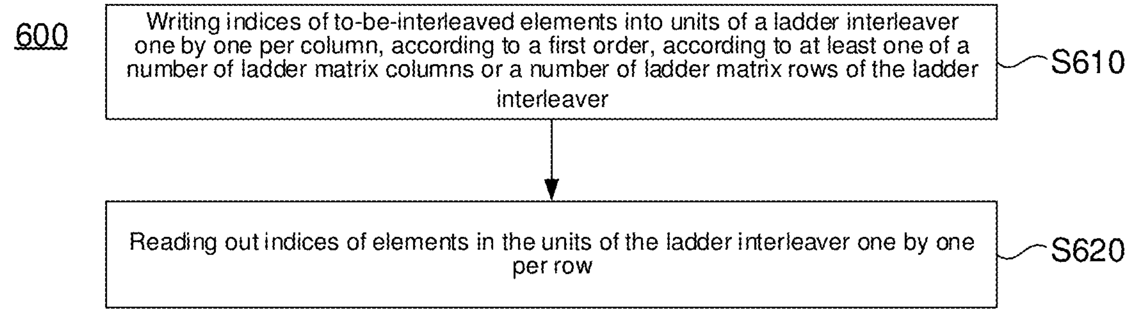
FIG. 6 is a schematic flowchart of a method 600 for controlling an interleaver according to an embodiment of the present disclosure.

FIG. 6 is a schematic flowchart of a method 500 for controlling an interleaver according to an embodiment of the present disclosure. The method may optionally be applied to the system shown in FIG. 1, but not limited thereto. The method includes at least some of the following content:

- S610, writing indices of to-be-interleaved elements into units of a ladder interleaver one by one per column, according to a first order, according to at least one of a number of ladder matrix columns or a number of ladder matrix rows of the ladder interleaver;
- S620, reading out indices of elements in the units of the ladder interleaver one by one per row.

In an implementation, writing the to-be-interleaved elements into the units of the ladder interleaver one by one, according to at least one of the number of ladder matrix columns or the number of ladder matrix rows of the ladder interleaver, includes:

determining the number R of ladder matrix rows, according to the number C of ladder matrix columns and a number N of the to-be-interleaved elements;

padding null values in first (k−1) rows of a k-th column, where a value range of k is from 1 to C;

writing the indices of the to-be-interleaved elements into units of non-null values of the ladder interleaver per column, according to the first order of the to-be-interleaved elements.

Herein, C, N, R, and K are positive integers.

In an implementation, during the reading out, null values in the units of the ladder interleaver are bypassed.

In an implementation, the first order includes an order from small to large, or an order from large to small.

In an implementation, an example of a value of at least one of a number of ladder matrix columns or a number of ladder matrix rows of the ladder interleaver may refer to the relevant description in the above interleaving method or deinterleaving method embodiments, which will not be repeated here. The interleaving and/or deinterleaving process by using the ladder interleaver may refer to the relevant description in the above interleaving method or deinterleaving method embodiments, which will not be repeated here.

In the embodiments of the present disclosure, various types of interleavers may be combined with the above interleaving method or deinterleaving method. In the above interleaving method or deinterleaving method, the interleaver in any method embodiment for controlling an interleaver may be used to perform the interleaving or deinterleaving. For example, the to-be-interleaved elements may include the physical RUs obtained by dividing the RU or MRU in the above interleaving method, or the remained physical RUs after the punctured RUs are removed. The deinterleaving process may have a reverse order of reading and writing of the interleaver compared with that used in the interleaving process.

Figure 7:
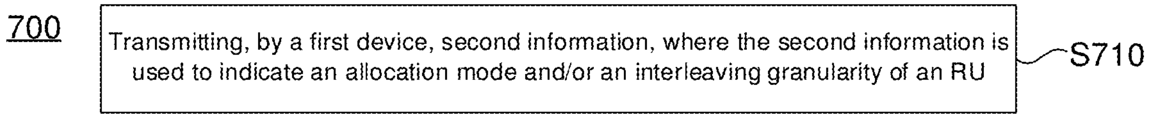
FIG. 7 is a schematic flowchart of a communication method 700 according to an embodiment of the present disclosure.

FIG. 7 is a schematic flowchart of a communication method 700 according to an embodiment of the present disclosure. The method may optionally be applied to the system shown in FIG. 1, but not limited thereto. The method includes at least some of the following content:

- S710, transmitting, by a first device, second information, where the second information is used to indicate an allocation mode and/or an interleaving granularity of an RU.

For example, the first device may be an AP, and a second device may be an STA. The first device may transmit the second information to the second device. The second information may carry a first indication bit, and the first indication bit is used to indicate an RU allocation mode. The second information may carry a second indicator bit, and the second indicator bit is used to indicate the allocation mode of the RU. Herein, the RU may include a single RU and/or MRU. The allocation mode of the RU may also include the allocation mode of a single RU and/or the allocation mode of a single MRU. The interleaving granularity of the RU may include the interleaving granularity of a single RU and/or the interleaving granularity of a single MRU.

In an implementation, the RU and/or the MRU are interleaved on the first device and the RU and/or the MRU are deinterleaved on the second device. In some embodiments, please refer to the relevant description of the above interleaving method and deinterleaving method.

In an implementation, the second information is in a U-SIG field and/or an EHT-SIG field of downlink signaling. For example, a PPDU transmitted by the AP to the STA includes a U-SIG field and/or an EHT-SIG field, and the U-SIG field and/or the EHT-SIG field may carry the second information.

In an implementation, the U-SIG field and/or EHT-SIG field includes at least one of:

- a first subfield for representing the allocation mode; or
- a second subfield for representing the interleaving granularity.

In an implementation, the first subfield and/or the second subfield use a reserved field.

In an implementation, the reserved field used by the first subfield and/or the second subfield is a validate field.

In an implementation, the reserved field used by the first subfield and/or the second subfield is a disregard field.

In an implementation, the first subfield is bit B22 in the U-SIG field, and the second subfield is bit B23 in the U-SIG field.

In an implementation, the first subfield is bit B13 in the EHT-SIG field, and the second subfield is bit B14 in the U-SIG field.

In an implementation, a value of the first subfield being a first value represents an RU interleaving allocation mode; and a value of the second subfield being a second value represents other non-interleaving allocation modes.

For example, a value of the first subfield of 1 indicates the RU interleaving allocation mode; a value of the second subfield of 0 indicates other non-interleaving allocation modes. For another example, a value of the first subfield of 0 indicates the RU interleaving allocation mode; a value of the second subfield of 1 indicates other non-interleaving allocation modes.

In an implementation, different values of the second subfield correspond to different RU interleaving granularities. For example, a value of the second subfield of 0 indicates that the RU interleaving granularity is 26-tone. For another example, a value of the second subfield of 0 indicates that the RU interleaving granularity is 52-tone. For another example, a value of the second subfield of 2 indicates that the RU interleaving granularity is 106-tone. These specific values are only examples and not limitations, and may be flexibly set according to actual needs.

In an implementation, the downlink signaling is an EHT TB PPDU and/or an EHT MU PPDU.

In an implementation, the EHT TB PPDU and/or the EHT MU PPDU further includes at least one of a PPDU bandwidth, punctured channel information, or RU allocation information.

In an implementation, the punctured channel information includes at least one of tones of a punctured channel, a bandwidth of a punctured channel, or a number of punctured channels.

In an implementation, the method further includes:

- receiving, by the first device, third information, where the third information is used to indicate an allocation mode and/or an interleaving granularity of an RU.

In an implementation, the third information is in an EHT variant general information field of uplink signaling.

In an implementation, the third information is in an EHT reserved field of the EHT variant general information field of the uplink signaling.

In an implementation, the EHT reserved field includes at least one of:

- a first subfield for representing the allocation mode; or
- a second subfield for representing the interleaving granularity.

In an implementation, the uplink signaling is a trigger frame for requesting uplink EHT TB PPDU transmission.

Figure 8:
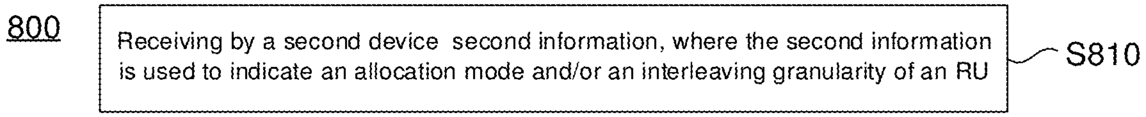
FIG. 8 is a schematic flowchart of a communication method 800 according to an embodiment of the present disclosure.

FIG. 8 is a schematic flowchart of a communication method 800 according to an embodiment of the present disclosure. The method may optionally be applied to the system shown in FIG. 1, but not limited thereto. The same terms in this communication method as those in the above communication method 700 have the same meanings, which are not repeated here. The communication method includes at least some of the following content:

- S810, receiving, by a second device, second information, where the second information is used to indicate an allocation mode and/or an interleaving granularity of an RU.

For example, a first device may be an AP, and the second device may be an STA. The second device may receive the second information from the first device. The second information may carry a first indication bit, and the first indication bit is used to indicate an RU allocation mode. The second information may carry a second indicator bit, and the second indicator bit is used to indicate the allocation mode of the RU. Herein, the RU may include a single RU and/or MRU. The allocation mode of the RU may also include the allocation mode of a single RU and/or the allocation mode of a single MRU. The interleaving granularity of the RU may include the interleaving granularity of a single RU and/or the interleaving granularity of a single MRU.

In an implementation, the RU and/or the MRU are interleaved on the first device and the RU and/or the MRU are deinterleaved on the second device. In some embodiments, please refer to the relevant description of the above interleaving method and deinterleaving method.

In an implementation, the second information is in a U-SIG field and/or an EHT-SIG field of downlink signaling.

In an implementation, the U-SIG field and/or the EHT-SIG field includes at least one of:

- a first subfield for representing the allocation mode; or
- a second subfield for representing the interleaving granularity.

In an implementation, the first subfield and/or the second subfield use a reserved field.

In an implementation, the reserved field used by the first subfield and/or the second subfield is a validate field.

In an implementation, the reserved field used by the first subfield and/or the second subfield is a disregard field.

In an implementation, the first subfield is bit B22 in the U-SIG field, and the second subfield is bit B23 in the U-SIG field.

In an implementation, the first subfield is bit B13 in the EHT-SIG field, and the second subfield is bit B14 in the U-SIG field.

In an implementation, a value of the first subfield being a first value represents an RU interleaving allocation mode; and a value of the second subfield being a second value represents other non-interleaving allocation modes.

In an implementation, different values of the second subfield correspond to different RU interleaving granularities.

In an implementation, the downlink signaling is an EHT TB PPDU and/or an EHT MU PPDU.

In an implementation, the EHT TB PPDU and/or the EHT MU PPDU further includes at least one of a PPDU bandwidth, punctured channel information, or RU allocation information.

In an implementation, the punctured channel information includes at least one of tones of a punctured channel, a bandwidth of a punctured channel, or a number of punctured channels.

In an implementation, the method further includes:

- transmitting, by the second device, third information, where the third information is used to indicate an allocation mode and/or an interleaving granularity of an RU.

In an implementation, the third information is in an EHT variant general information field of uplink signaling.

In an implementation, the third information is in an EHT reserved field of the EHT variant general information field of the uplink signaling.

In an implementation, the EHT reserved field includes at least one of:

- a first subfield for representing the allocation mode; or
- a second subfield for representing the interleaving granularity.

In an implementation, the uplink signaling is a trigger frame for requesting uplink EHT TB PPDU transmission.

In an implementation, the method further includes: determining, by the second device, a parameter of an interleaver according to a PPDU bandwidth, punctured channel information and RU allocation information. For example, the downlink signaling received by the second device may also include at least one of the PPDU bandwidth, the punctured channel information or the RU allocation information, and the parameter of the interleaver may be determined according to the information. Furthermore, if the allocation mode indicates the RU interleaving allocation mode, the interleaver may be constructed on the second device according to the parameter of the interleaver, and the received RU and/or MRU is deinterleaved by using the interleaver.

Figure 9:
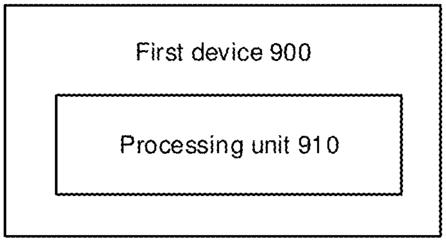
FIG. 9 is a schematic block diagram of a first device 900 according to an embodiment of the present disclosure.

FIG. 9 is a schematic block diagram of a first device 900 according to an embodiment of the present disclosure. The first device 900 may include:

- a processing unit 910, configured to interleave a resource unit (RU) according to first information, where the first information includes at least one of a bandwidth, an interleaving granularity, punctured channel information or an interleaver type.

In an implementation, the processing unit is configured to:

- obtain punctured RUs according to the interleaving granularity and the punctured channel information;
- divide the bandwidth according to the interleaving granularity, to obtain a plurality of first physical RUs.

In an implementation, the processing unit is further configured to:

- remove the punctured RUs from the plurality of first physical RUs, to obtain to-be-interleaved first physical RUs;
- interleave the to-be-interleaved first physical RUs by using an interleaver.

In an implementation, the processing unit is further configured to:

- use the plurality of first physical RUs obtained by dividing the bandwidth as to-be-interleaved first physical RUs, and interleave the to-be-interleaved first physical RUs by using an interleaver;
- remove the punctured RUs from interleaved first physical RUs.

In an implementation, a number of the punctured RUs is a first number, a number of the first physical RUs obtained by dividing the bandwidth is a second number, and a number of first physical RUs with the punctured RUs removed is a third number.

In an implementation, the processing unit being configured to divide the bandwidth according to the interleaving granularity, to obtain the plurality of first physical RUs, includes: in a case where the interleaving granularity is 26 tones, dividing the bandwidth according to the interleaving granularity, to obtain the second number of first physical RUs; where each of the first physical includes 26 tones.

In an implementation, in the case where the interleaving granularity is 26 tones, a relationship between the bandwidth and the second number includes at least one of:

- the bandwidth being 80 MHz, and the second number being 36;
- the bandwidth being 160 MHz, and the second number being 72; or
- the bandwidth being 320 MHz, and the second number being 144.

In an implementation, the processing unit being configured to divide the bandwidth according to the interleaving granularity, to obtain the plurality of first physical RUs, includes: in a case where the interleaving granularity is 52 tones, dividing the bandwidth according to the interleaving granularity, to obtain the second number of first physical RUs and a fourth number of second physical RUs; where each the first physical includes 52 tones, and each the second physical includes 26 tones.

In an implementation, in the case where the interleaving granularity is 52 tones, a relationship between the bandwidth and the second number, and the fourth number includes at least one of:

the bandwidth being 80 MHz, the second number being 16, and the fourth number being 4;

the bandwidth being 160 MHz, the second number being 32, and the fourth number being 8; or the bandwidth being 320 MHz, the second number being 64, and the fourth number being 16.

In an implementation, interleaving the to-be-interleaved first physical RUs by using the interleaver, includes:

interleaving the third number of first physical RUs by using the interleaver, and changing an index arrangement order of the third number of first physical RUs, to obtain an index arrangement order of interleaved first physical RUs;

mapping the interleaved first physical RUs to at least one of a virtual RU, a virtual MRU, a logical RU or a logical MRU according to the index arrangement order of the interleaved first physical RUs.

In an implementation, an index of each physical RU has a corresponding physical tone index interval range, and an index of each virtual RU has a corresponding virtual tone index interval range.

In an implementation, the interleaver is determined according to the interleaver type.

In an implementation, the interleaver type includes at least one of: a block interleaver, a triangular interleaver, a spiral interleaver, or a ladder interleaver.

In an implementation, a parameter of the interleaver is determined according to the interleaver type and a number of to-be-interleaved first physical RUs.

In an implementation, the interleaver type is a block interleaver, and parameters of the block interleaver include a number of columns and a number of rows.

In an implementation, the interleaver type is a triangular interleaver, and a parameter of the triangular interleaver includes a length of a right angle side.

In an implementation, the interleaver type is a spiral interleaver, and parameters of the spiral interleaver include a number of spiral matrix columns, a group size for writing into each group, and a step length of a spiral matrix.

In an implementation, the number of spiral matrix columns of the spiral interleaver is 3, the group size for writing into each group is 2, and the step length of the spiral matrix is 1.

In an implementation, the interleaver type is a ladder interleaver, and parameters of the ladder interleaver include a number of ladder matrix columns and a number of ladder matrix rows.

In an implementation, a number of columns of the ladder interleaver is 4.

In an implementation, in a case of no punctured channel and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 4 and a number of rows of the block interleaver being 9, or the number of columns being 6 and the number of rows being 6; a length of a right angle side of the triangular interleaver being 8; or a number of ladder matrix rows of the ladder interleaver being 11;

parameters of interleavers corresponding to the bandwidth of 160 MHz including at least one of: a number of columns of the block interleaver being 6 and a number of rows of the block interleaver being 12, or the number of columns being 8 and the number of rows being 9; a length of a right angle side of the triangular interleaver being 12; or a number of ladder matrix rows of the ladder interleaver being 20; or parameters of interleavers corresponding to the bandwidth of 320 MHz including at least one of: a number of columns of the block interleaver being 8 and a number of rows of the block interleaver being 18, or the number of columns being 9 and the number of rows being 16, or the number of columns being 12 and the number of rows being 12; a length of a right angle side of the triangular interleaver being 17; or a number of ladder matrix rows of the ladder interleaver being 38.

In an implementation, in a case of no punctured channel and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 4 and a number of rows of the block interleaver being 4; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 4 and a number of rows of the block interleaver being 8; a length of a right angle side of the triangular interleaver being 8; or a number of ladder matrix rows of the ladder interleaver being 10; or parameters of interleavers corresponding to the bandwidth of 320 MHz including at least one of: a number of columns of the block interleaver being 8 and a number of rows of the block interleaver being 8; a length of a right angle side of the triangular interleaver being 11; or a number of ladder matrix rows of the ladder interleaver being 18.

In an implementation, in a case of one 20 MHz channel being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 9; a length of a right angle side of the triangular interleaver being 7; or a number of ladder matrix rows of the ladder interleaver being 9;

parameters of interleavers corresponding to the bandwidth of 160 MHz including at least one of: a number of columns of the block interleaver being 3 and a number of rows of the block interleaver being 9; a length of a right angle side of the triangular interleaver being 7; or a number of ladder matrix rows of the ladder interleaver being 9; or parameters of interleavers corresponding to the bandwidth of 320 MHz including at least one of: a number of columns of the block interleaver being 5 and a number of rows of the block interleaver being 27; a length of a right angle side of the triangular interleaver being 16; or a number of ladder matrix rows of the ladder interleaver being 36.

In an implementation, in a case of one 20 MHz channel being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 4; a length of a right angle side of the triangular interleaver being 5; or a number of ladder matrix rows of the ladder interleaver being 5;

parameters of interleavers corresponding to the bandwidth of 160 MHz including at least one of: a number of columns of the block interleaver being 4 and a number of rows of the block interleaver being 7; a length of a right angle side of the triangular interleaver being 7; or a number of ladder matrix rows of the ladder interleaver being 9; or parameters of interleavers corresponding to the bandwidth of 320 MHz including at least one of: a number of columns of the block interleaver being 6 and a number of rows of the block interleaver being 10; a length of a right angle side of the triangular interleaver being 11; or a number of ladder matrix rows of the ladder interleaver being 17.

In an implementation, in a case of two 20 MHz channels being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 6; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 6 and a number of rows of the block interleaver being 9; a length of a right angle side of the triangular interleaver being 10; or a number of ladder matrix rows of the ladder interleaver being 15; or parameters of interleavers corresponding to the bandwidth of 320 MHz including at least one of: a number of columns of the block interleaver being 9 and a number of rows of the block interleaver being 14; a length of a right angle side of the triangular interleaver being 16; or a number of ladder matrix rows of the ladder interleaver being 33.

In an implementation, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 2 and a number of rows of the block interleaver being 4; a length of a right angle side of the triangular interleaver being 4; or a number of ladder matrix rows of the ladder interleaver being 4;

parameters of interleavers corresponding to the bandwidth of 160 MHz including at least one of: a number of columns of the block interleaver being 4 and a number of rows of the block interleaver being 6; a length of a right angle side of the triangular interleaver being 7; or a number of ladder matrix rows of the ladder interleaver being 8; or parameters of interleavers corresponding to the bandwidth of 320 MHz including at least one of: a number of columns of the block interleaver being 7 and a number of rows of the block interleaver being 8; a length of a right angle side of the triangular interleaver being 11; or a number of ladder matrix rows of the ladder interleaver being 16.

In an implementation, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 5 and a number of rows of the block interleaver being 9; a length of a right angle side of the triangular interleaver being 9; or a number of ladder matrix rows of the ladder interleaver being 13; or parameters of interleavers corresponding to the bandwidth of 320 MHz including at least one of: a number of columns of the block interleaver being 9 and a number of rows of the block interleaver being 13; a length of a right angle side of the triangular interleaver being 15; or a number of ladder matrix rows of the ladder interleaver being 31.

In an implementation, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 5; a length of a right angle side of the triangular interleaver being 6; or a number of ladder matrix rows of the ladder interleaver being 7; or parameters of interleavers corresponding to the bandwidth of 320 MHz including at least one of: a number of columns of the block interleaver being 4 and a number of rows of the block interleaver being 13; a length of a right angle side of the triangular interleaver being 10; or a number of ladder matrix rows of the ladder interleaver being 15.

In an implementation, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 9; a length of a right angle side of the triangular interleaver being 8; or a number of ladder matrix rows of the ladder interleaver being 11; or parameters of interleavers corresponding to the bandwidth of 320 MHz including at least one of: a number of columns of the block interleaver being 9 and a number of rows of the block interleaver being 12; a length of a right angle side of the triangular interleaver being 15; or a number of ladder matrix rows of the ladder interleaver being 29.

In an implementation, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 4; a length of a right angle side of the triangular interleaver being 6; or a number of ladder matrix rows of the ladder interleaver being 6; or parameters of interleavers corresponding to the bandwidth of 320 MHz including at least one of: a number of columns of the block interleaver being 6 and a number of rows of the block interleaver being 8; a length of a right angle side of the triangular interleaver being 10; or a number of ladder matrix rows of the ladder interleaver being 14.

In an implementation, the processing unit is further configured to: in a case where the interleaver includes multiple groups of parameters, adopting one group of parameters among the multiple groups of parameters.

In an implementation, the bandwidth is a PPDU bandwidth.

In an implementation, the punctured channel information includes at least one of tones of a punctured channel, a bandwidth of a punctured channel, or a number of punctured channels.

The first device 900 of the embodiments of the present disclosure can implement the corresponding functions of the first device in the embodiments of the method 200 mentioned above. The processes, functions, implementations and beneficial effects corresponding to respective modules (sub-modules, units or components, etc.) in the first device 900 may refer to the corresponding description in the above method embodiments, which will not be repeated here. It needs to be noted that the functions described regarding the respective modules (sub-modules, units or components, etc.) in the first device 900 of the embodiments of the present disclosure may be implemented by different modules (sub-modules, units or components, etc.) or by a same module (sub-module, unit or component, etc.).

Figure 10:
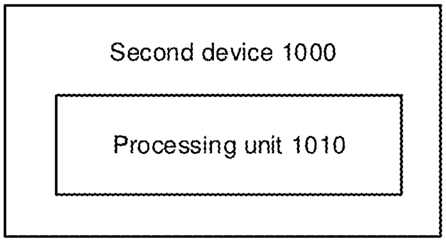
FIG. 10 is a schematic block diagram of a second device 1000 according to an embodiment of the present disclosure.

FIG. 10 is a schematic block diagram of a second device 1000 according to an embodiment of the present disclosure. The second device 1000 may include:

a processing unit 1010, configured to deinterleave a resource unit (RU) according to first information, where the first information includes at least one of an interleaving granularity, punctured channel information, or an interleaver type.

In an implementation, the processing unit 1010 is further configured to:

use acquired first physical RUs as to-be-deinterleaved first physical RUs, and deinterleave the to-be-deinterleaved first physical RUs by using an interleaver, to obtain deinterleaved first physical RUs;

combine the deinterleaved first physical RUs and punctured RUs.

In this implementation, a number of the punctured RUs is a first number, a number of the deinterleaved first physical RUs is a third number, and a number of first physical RUs obtained by the combining is a second number.

In an implementation, the processing unit 1010 is further configured to:

combine acquired first physical RUs and punctured RUs to obtain to-be-deinterleaved first physical RUs;

deinterleave the to-be-deinterleaved first physical RUs by using an interleaver, to obtain deinterleaved first physical RUS.

In this implementation, a number of the punctured RUs is a first number, and a number of the deinterleaved first physical RUs is a second number.

In an implementation, the processing unit 1010 being configured to deinterleave the to-be-deinterleaved first physical RUs by using the interleaver, includes: deinterleaving the to-be-deinterleaved first physical RUs by using the interleaver, and recovering an index arrangement order of the to-be-deinterleaved first physical RUs.

In an implementation, in a case where the interleaving granularity is 26 tones, the first physical RU includes 26 tones, and a relationship between the bandwidth and the second number includes at least one of:

the bandwidth being 80 MHz, and the second number being 36;

the bandwidth being 160 MHz, and the second number being 72; or the bandwidth being 320 MHz, and the second number being 144.

In an implementation, the processing unit 1010 is further configured to combine the second number of first physical RUs and a fourth number of second physical RUs, to obtain recovered first physical RUs.

In an implementation, in a case where the interleaving granularity is 52 tones, the first physical RU includes 52 tones, the second physical RU includes 26 tones, a relationship between the bandwidth and the second number, and the fourth number includes at least one of:

the bandwidth being 80 MHz, the second number being 16, and the fourth number being 4;

the bandwidth being 160 MHz, the second number being 32, and the fourth number being 8; or the bandwidth being 320 MHz, the second number being 64, and the fourth number being 16.

In an implementation, an index of each physical RU has a corresponding physical tone index interval range, and an index of each virtual RU has a corresponding virtual tone index interval range.

In an implementation, the interleaver is determined according to the interleaver type.

In an implementation, the interleaver type includes at least one of: a block interleaver, a triangular interleaver, a spiral interleaver, or a ladder interleaver.

In an implementation, a parameter of the interleaver is determined according to the interleaver type and a number of the to-be-deinterleaved first physical RUs.

In an implementation, the interleaver type is a block interleaver, and parameters of the block interleaver include a number of columns and a number of rows.

In an implementation, the interleaver type is a triangular interleaver, and a parameter of the triangular interleaver includes a length of a right angle side.

In an implementation, the interleaver type is a spiral interleaver, and parameters of the spiral interleaver include a number of spiral matrix columns, a group size for writing into each group, and a step length of a spiral matrix.

In an implementation, the number of spiral matrix columns of the spiral interleaver is 3, the group size for writing into each group is 2, and the step length of the spiral matrix is 1.

In an implementation, the interleaver type is a ladder interleaver, and parameters of the ladder interleaver include a number of ladder matrix columns and a number of ladder matrix rows.

In an implementation, a number of columns of the ladder interleaver is 4.

In an implementation, in a case of no punctured channel and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 4 and a number of rows of the block interleaver being 9, or the number of columns being 6 and the number of rows being 6; a length of a right angle side of the triangular interleaver being 8; or a number of ladder matrix rows of the ladder interleaver being 11;

parameters of interleavers corresponding to the bandwidth of 160 MHz including at least one of: a number of columns of the block interleaver being 6 and a number of rows of the block interleaver being 12, or the number of columns being 8 and the number of rows being 9; a length of a right angle side of the triangular interleaver being 12; or a number of ladder matrix rows of the ladder interleaver being 20; or parameters of interleavers corresponding to the bandwidth of 320 MHz including at least one of: a number of columns of the block interleaver being 8 and a number of rows of the block interleaver being 18, or the number of columns being 9 and the number of rows being 16, or the number of columns being 12 and the number of rows being 12; a length of a right angle side of the triangular interleaver being 17; or a number of ladder matrix rows of the ladder interleaver being 38.

In an implementation, in a case of no punctured channel and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 4 and a number of rows of the block interleaver being 4; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 4 and a number of rows of the block interleaver being 8; a length of a right angle side of the triangular interleaver being 8; or a number of ladder matrix rows of the ladder interleaver being 10; or parameters of interleavers corresponding to the bandwidth of 320 MHz including at least one of: a number of columns of the block interleaver being 8 and a number of rows of the block interleaver being 8; a length of a right angle side of the triangular interleaver being 11; or a number of ladder matrix rows of the ladder interleaver being 18.

In an implementation, in a case of one 20 MHz channel being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 9; a length of a right angle side of the triangular interleaver being 7; or a number of ladder matrix rows of the ladder interleaver being 9;

parameters of interleavers corresponding to the bandwidth of 160 MHz including at least one of: a number of columns of the block interleaver being 3 and a number of rows of the block interleaver being 9; a length of a right angle side of the triangular interleaver being 7; or a number of ladder matrix rows of the ladder interleaver being 9; or parameters of interleavers corresponding to the bandwidth of 320 MHz including at least one of: a number of columns of the block interleaver being 5 and a number of rows of the block interleaver being 27; a length of a right angle side of the triangular interleaver being 16; or a number of ladder matrix rows of the ladder interleaver being 36.

In an implementation, in a case of one 20 MHz channel being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 4; a length of a right angle side of the triangular interleaver being 5; or a number of ladder matrix rows of the ladder interleaver being 5;

parameters of interleavers corresponding to the bandwidth of 160 MHz including at least one of: a number of columns of the block interleaver being 4 and a number of rows of the block interleaver being 7; a length of a right angle side of the triangular interleaver being 7; or a number of ladder matrix rows of the ladder interleaver being 9; or parameters of interleavers corresponding to the bandwidth of 320 MHz including at least one of: a number of columns of the block interleaver being 6 and a number of rows of the block interleaver being 10; a length of a right angle side of the triangular interleaver being 11; or a number of ladder matrix rows of the ladder interleaver being 17.

In an implementation, in a case of two 20 MHz channels being punctured and the interleaving granularity being 26 tones, a relationship between the bandwidth and parameters of different types of interleavers includes at least one of:

parameters of interleavers corresponding to the bandwidth of 80 MHz including at least one of: a number of columns of the block interleaver being 3 and a number of rows of the block interleaver being 6; a length of a right angle side of the triangular interleaver being 6; or a number of ladder matrix rows of the ladder interleaver being 6;

parameters of interleavers corresponding to the bandwidth of 160 MHz including at least one of: a number of columns of the block interleaver being 6 and a number of rows of the block interleaver being 9; a length of a right angle side of the triangular interleaver being 10; or a number of ladder matrix rows of the ladder interleaver being 15; or parameters of interleavers corresponding to the bandwidth of 320 MHz including at least one of: a number of columns of the block interleaver being 9 and a number of rows of the block interleaver being 14; a length of a right angle side of the triangular interleaver being 16; or a number of ladder matrix rows of the ladder interleaver being 33.

In an implementation, in a case of two 20 MHz channels being punctured and the interleaving granularity being 52 tones, a relationship between the bandwidth and parameters of different types of interleavers includes at least one of:

parameters of interleavers corresponding to the bandwidth of 80 MHz including at least one of: a number of columns of the block interleaver being 2 and a number of rows of the block interleaver being 4; a length of a right angle side of the triangular interleaver being 4; or a number of ladder matrix rows of the ladder interleaver being 4;

parameters of interleavers corresponding to the bandwidth of 160 MHz including at least one of: a number of columns of the block interleaver being 4 and a number of rows of the block interleaver being 6; a length of a right angle side of the triangular interleaver being 7; or a number of ladder matrix rows of the ladder interleaver being 8; or parameters of interleavers corresponding to the bandwidth of 320 MHz including at least one of: a number of columns of the block interleaver being 7 and a number of rows of the block interleaver being 8; a length of a right angle side of the triangular interleaver being 11; or a number of ladder matrix rows of the ladder interleaver being 16.

In an implementation, in a case of three 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 5 and a number of rows of the block interleaver being 9; a length of a right angle side of the triangular interleaver being 9; or a number of ladder matrix rows of the ladder interleaver being 13; or parameters of interleavers corresponding to the bandwidth of 320 MHz including at least one of: a number of columns of the block interleaver being 9 and a number of rows of the block interleaver being 13; a length of a right angle side of the triangular interleaver being 15; or a number of ladder matrix rows of the ladder interleaver being 31.

In an implementation, in a case of three 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 5; a length of a right angle side of the triangular interleaver being 6; or a number of ladder matrix rows of the ladder interleaver being 7; or parameters of interleavers corresponding to the bandwidth of 320 MHz including at least one of: a number of columns of the block interleaver being 4 and a number of rows of the block interleaver being 13; a length of a right angle side of the triangular interleaver being 10; or a number of ladder matrix rows of the ladder interleaver being 15.

In an implementation, in a case of four 20 MHz channels being punctured and the interleaving granularity being 26 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 9; a length of a right angle side of the triangular interleaver being 8; or a number of ladder matrix rows of the ladder interleaver being 11; or parameters of interleavers corresponding to the bandwidth of 320 MHz including at least one of: a number of columns of the block interleaver being 9 and a number of rows of the block interleaver being 12; a length of a right angle side of the triangular interleaver being 15; or a number of ladder matrix rows of the ladder interleaver being 29.

In an implementation, in a case of four 20 MHz channels being punctured and the interleaving granularity being 52 tones, a relationship between the bandwidth and parameters of different types of interleavers includes at least one of:

parameters of interleavers corresponding to the bandwidth of 160 MHz including at least one of: a number of columns of the block interleaver being 4 and a number of rows of the block interleaver being 4; a length of a right angle side of the triangular interleaver being 6; or a number of ladder matrix rows of the ladder interleaver being 6; or parameters of interleavers corresponding to the bandwidth of 320 MHz including at least one of: a number of columns of the block interleaver being 6 and a number of rows of the block interleaver being 8; a length of a right angle side of the triangular interleaver being 10; or a number of ladder matrix rows of the ladder interleaver being 14.

In an implementation, the processing unit is further configured to: in a case where the interleaver includes multiple groups of parameters, adopting one group of parameters among the multiple groups of parameters.

In an implementation, the bandwidth is a PPDU bandwidth.

In an implementation, the punctured channel information includes at least one of tones of a punctured channel, a bandwidth of a punctured channel, or a number of punctured channels.

The second device 1000 of the embodiments of the present disclosure can implement the corresponding functions of the second device in the embodiments of the method 300 mentioned above. The processes, functions, implementations and beneficial effects corresponding to respective modules (sub-modules, units or components, etc.) in the second device 1000 may refer to the corresponding description in the above method embodiments, which will not be repeated here. It needs to be noted that the functions described regarding the respective modules (sub-modules, units or components, etc.) in the second device 1000 of the embodiments of the present disclosure may be implemented by different modules (sub-modules, units or components, etc.) or by a same module (sub-module, unit or component, etc.).

Figure 11:
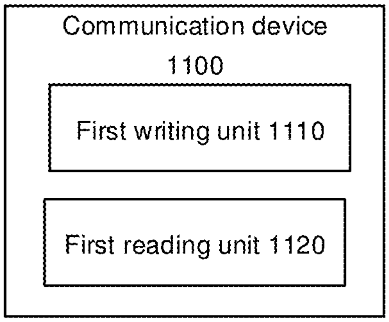
FIG. 11 is a schematic block diagram of a communication device 1100 according to an embodiment of the present disclosure.

FIG. 11 is a schematic block diagram of a communication device 1100 according to an embodiment of the present disclosure. The communication device 1100 may include:

a first writing unit 1110, configured to write indices of to-be-interleaved elements into units of a triangular interleaver one by one per row, according to a first order, starting from a right angle side of the triangular interleaver;

a first reading unit 1120, configured to read out indices of elements in the units of the triangular interleaver one by one per column, starting from the right angle side.

In an implementation, the first writing unit 1110 is further configured to: in a case where a total number of the units of the triangular interleaver is greater than a number of the to-be-interleaved elements, after all the to-be-interleaved elements are written into the units of the triangular interleaver, write null values into remaining units of the triangular interleaver per row.

In an implementation, the first readout unit 1120 is further configured to during the reading out, bypass null values in units of the triangular interleaver.

In an implementation, the device further includes:

a processing unit, configured to determine a length of the right angle side of the triangular interleaver according to a number of the to-be-interleaved elements;

where the length of the right angle side is used to determine a total number of the units of the triangular interleaver, and the total number of the units of the triangular interleaver is greater than or equal to the number of the to-be-interleaved elements.

In an implementation, the first order includes an order from small to large, or an order from large to small.

The communication device 1100 of the embodiments of the present disclosure can implement the corresponding functions of the communication device in the embodiments of the method 400 mentioned above. The processes, functions, implementations and beneficial effects corresponding to respective modules (sub-modules, units or components, etc.) in the communication device 1100 may refer to the corresponding description in the above method embodiments, which will not be repeated here. It needs to be noted that the functions described regarding the respective modules (sub-modules, units or components, etc.) in the communication device 1100 of the embodiments of the present disclosure may be implemented by different modules (sub-modules, units or components, etc.), or may also be implemented by a same module (sub-module, unit or component, etc.).

Figure 12:
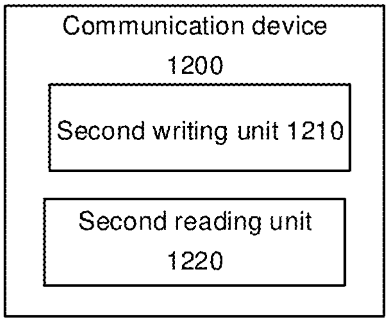
FIG. 12 is a schematic block diagram of a communication device 1200 according to an embodiment of the present disclosure.

FIG. 12 is a schematic block diagram of a communication device 1200 according to an embodiment of the present disclosure. The communication device 1200 may include:

a second writing unit 1210, configured to write indices of to-be-interleaved elements into units of a spiral interleaver one by one per column, according to a first order, according to at least one of a number of spiral matrix columns, a group size for writing into each group or a step length of a spiral matrix of the spiral interleaver;

a second reading unit 1220, configured to read out indices of elements in the units of the spiral interleaver one by one per row.

In an implementation, the second writing unit 1210 being configured to write the to-be-interleaved elements into the units of the spiral interleaver one by one, according to at least one of the number of spiral matrix columns, the group size for writing into each group or the step length of the spiral matrix of the spiral interleaver, includes:

according to the first order of the to-be-interleaved elements, starting from a k-th column, writing R elements into each column, a (k+1)-th column being lower than the k-th column by S rows;

where k is a column identifier, and a value range of k is from 1 to C, C is the number of the spiral matrix columns, R is the group size for writing into each group, and S is the step length of the spiral matrix.

In an implementation, C, R, and S are positive integers greater than 1.

In an implementation, the first order includes an order from small to large, or an order from large to small.

The communication device 1200 of the embodiments of the present disclosure can implement the corresponding functions of the communication device in the embodiments of the method 500 mentioned above. The processes, functions, implementations and beneficial effects corresponding to respective modules (sub-modules, units or components, etc.) in the communication device 1200 may refer to the corresponding description in the above method embodiments, which will not be repeated here. It needs to be noted that the functions described regarding the respective modules (sub-modules, units or components, etc.) in the communication device 1200 of the embodiments of the present disclosure may be implemented by different modules (sub-modules, units or components, etc.), or may also be implemented by a same module (sub-module, unit or component, etc.).

Figure 13:
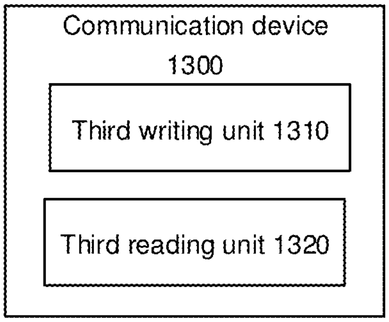
FIG. 13 is a schematic block diagram of a communication device 1300 according to an embodiment of the present disclosure.

FIG. 13 is a schematic block diagram of a communication device 1300 according to an embodiment of the present disclosure. The communication device 1300 may include:

a third writing unit 1310, configured to write indices of to-be-interleaved elements into units of a ladder interleaver one by one per column, according to a first order, according to at least one of a number of ladder matrix columns or a number of ladder matrix rows of the ladder interleaver;

a third reading unit 1320, configured to read out indices of elements in the units of the ladder interleaver one by one per row.

In an implementation, the third writing unit 1310 being configured to write the to-be-interleaved elements into the units of the ladder interleaver one by one, according to at least one of the number of ladder matrix columns or the number of ladder matrix rows of the ladder interleaver, includes:

determining the number R of ladder matrix rows, according to the number C of ladder matrix columns and a number N of the to-be-interleaved elements;

padding null values in first (k−1) rows of a k-th column, where a value range of k is from 1 to C;

writing the indices of the to-be-interleaved elements into units of non-null values of the ladder interleaver per column, according to the first order of the to-be-interleaved elements.

In an implementation, the third readout unit 1320 is further configured to during the reading out, bypass null values in the units of the ladder interleaver.

In an implementation, the first order includes an order from small to large, or an order from large to small.

The communication device 1300 of the embodiments of the present disclosure can implement the corresponding functions of the communication device in the embodiments of the method 600 mentioned above. The processes, functions, implementations and beneficial effects corresponding to respective modules (sub-modules, units or components, etc.) in the communication device 1300 may refer to the corresponding description in the above method embodiments, which will not be repeated here. It needs to be noted that the functions described regarding the respective modules (sub-modules, units or components, etc.) in the communication device 1300 of the embodiments of the present disclosure may be implemented by different modules (sub-modules, units or components, etc.), or may also be implemented by a same module (sub-module, unit or component, etc.).

In the embodiments of the present disclosure, the first device 900 and/or the second device 1000 may also include the writing unit and/or the reading unit in any communication device, for performing the interleaving and/or deinterleaving. For the implementation of the interleaving and/or deinterleaving method, please refer to the relevant description in the above method embodiments.

Figure 14:
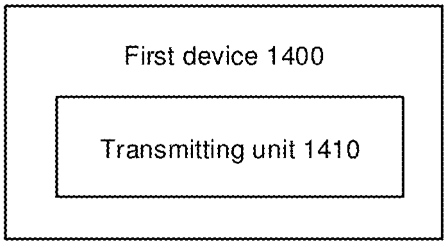
FIG. 14 is a schematic block diagram of a first device 1400 according to an embodiment of the present disclosure.

FIG. 14 is a schematic block diagram of a first device 1400 according to an embodiment of the present disclosure. The first device 1400 may include:

a transmitting unit 1410, configured to transmit second information, where the second information is used to indicate an allocation mode and/or an interleaving granularity of an RU.

In an implementation, the second information is in a U-SIG field and/or an EHT-SIG field of downlink signaling.

In an implementation, the U-SIG field and/or EHT-SIG field includes at least one of:

a first subfield for representing the allocation mode; or a second subfield for representing the interleaving granularity.

In an implementation, the first subfield and/or the second subfield use a reserved field.

In an implementation, the reserved field used by the first subfield and/or the second subfield is a validate field.

In an implementation, the reserved field used by the first subfield and/or the second subfield is a disregard field.

In an implementation, the first subfield is bit B22 in the U-SIG field, and the second subfield is bit B23 in the U-SIG field.

In an implementation, the first subfield is bit B13 in the EHT-SIG field, and the second subfield is bit B14 in the U-SIG field.

In an implementation, a value of the first subfield being a first value represents an RU interleaving allocation mode; and a value of the second subfield being a second value represents other non-interleaving allocation modes.

In an implementation, different values of the second subfield correspond to different RU interleaving granularities.

In an implementation, the downlink signaling is an EHT TB PPDU and/or an EHT MU PPDU.

In an implementation, the EHT TB PPDU and/or the EHT MU PPDU further includes at least one of a PPDU bandwidth, punctured channel information, or RU allocation information.

In an implementation, the punctured channel information includes at least one of tones of a punctured channel, a bandwidth of a punctured channel, or a number of punctured channels.

In an implementation, the device further includes:

a receiving unit, configured to receive third information, where the third information is used to indicate an allocation mode and/or an interleaving granularity of an RU.

In an implementation, the third information is in an EHT variant general information field of uplink signaling.

In an implementation, the third information is in an EHT reserved field of the EHT variant general information field of the uplink signaling.

In an implementation, the EHT reserved field includes at least one of:

a first subfield for representing the allocation mode; or a second subfield for representing the interleaving granularity.

In an implementation, the uplink signaling is a trigger frame for requesting uplink EHT TB PPDU transmission.

The first device 1400 of the embodiments of the present disclosure can implement the corresponding functions of the first device in the embodiments of the method 700 mentioned above. The processes, functions, implementations and beneficial effects corresponding to respective modules (sub-modules, units or components, etc.) in the first device 1400 may refer to the corresponding description in the above method embodiments, which will not be repeated here. It needs to be noted that the functions described regarding the respective modules (sub-modules, units or components, etc.) in the first device 1400 of the embodiments of the present disclosure may be implemented by different modules (sub-modules, units or components, etc.), or may also be implemented by a same module (sub-module, unit or component, etc.).

Figure 15:
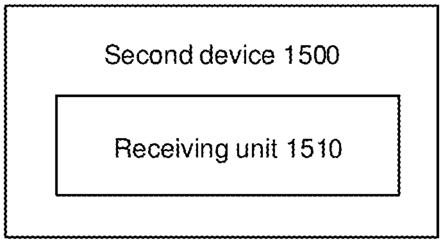
FIG. 15 is a schematic block diagram of a second device 1500 according to an embodiment of the present disclosure.

FIG. 15 is a schematic block diagram of a second device 1500 according to an embodiment of the present disclosure. The second device 1500 may include:

a receiving unit 1510, configured to receive second information, where the second information is used to indicate an allocation mode and/or an interleaving granularity of an RU.

In an implementation, the second information is in a U-SIG field and/or an EHT-SIG field of downlink signaling.

In an implementation, the U-SIG field and/or the EHT-SIG field includes at least one of:

a first subfield for representing the allocation mode; or a second subfield for representing the interleaving granularity.

In an implementation, the first subfield and/or the second subfield use a reserved field.

In an implementation, the reserved field used by the first subfield and/or the second subfield is a validate field.

In an implementation, the reserved field used by the first subfield and/or the second subfield is a disregard field.

In an implementation, the first subfield is bit B22 in the U-SIG field, and the second subfield is bit B23 in the U-SIG field.

In an implementation, the first subfield is bit B13 in the EHT-SIG field, and the second subfield is bit B14 in the U-SIG field.

In an implementation, a value of the first subfield being a first value represents an RU interleaving allocation mode; and a value of the second subfield being a second value represents other non-interleaving allocation modes.

In an implementation, different values of the second subfield correspond to different RU interleaving granularities.

In an implementation, the downlink signaling is an EHT TB PPDU and/or an EHT MU PPDU.

In an implementation, the EHT TB PPDU and/or the EHT MU PPDU further includes at least one of a PPDU bandwidth, punctured channel information, or RU allocation information.

In an implementation, the punctured channel information includes at least one of tones of a punctured channel, a bandwidth of a punctured channel, or a number of punctured channels.

In an implementation, the device further includes:

a transmitting unit, configured to transmit third information, where the third information is used to indicate an allocation mode and/or an interleaving granularity of an RU.

In an implementation, the third information is in an EHT variant general information field of uplink signaling.

In an implementation, the third information is in an EHT reserved field of the EHT variant general information field of the uplink signaling.

In an implementation, the EHT reserved field includes at least one of:

a first subfield for representing the allocation mode; or a second subfield for representing the interleaving granularity.

In an implementation, the uplink signaling is a trigger frame for requesting uplink EHT TB PPDU transmission.

In an implementation, the device further includes:

a processing unit, configured to determine a parameter of an interleaver according to a PPDU bandwidth, punctured channel information and RU allocation information.

The second device 1500 of the embodiments of the present disclosure can implement the corresponding functions of the second device in the embodiments of the method 800 mentioned above. The processes, functions, implementations and beneficial effects corresponding to respective modules (sub-modules, units or components, etc.) in the second device 1500 may refer to the corresponding description in the above method embodiments, which will not be repeated here. It needs to be noted that the functions described regarding the respective modules (sub-modules, units or components, etc.) in the second device 1500 of the embodiments of the present disclosure may be implemented by different modules (sub-modules, units or components, etc.), or may also be implemented by a same module (sub-module, unit or component, etc.).

In the embodiments of the present disclosure, the first device 1400 and/or the second device 1500 may also include the writing unit and/or the reading unit in any communication device, for performing the interleaving and/or deinterleaving. For the implementation of the interleaving and/or deinterleaving method, please refer to the relevant description in the above method embodiments. One or more features of the first device 1400 and the first device 900 may be combined. One or more features of the second device 1500 and the second device 1000 may be combined. There may be other combinations between different embodiments, which are not limited to the embodiments of the present disclosure.

The embodiments of the present disclosure propose an RU interleaving scheme used by an OFDMA EHT PPDU in a scenario of large-bandwidth OFDMA EHT PPDU transmission involving multiple STAs. Compared with the RU allocation mode of IEEE 802.11, after the RU or MRU allocated to the STA are interleaved and mapped, a higher frequency diversity gain may be obtained.

The embodiments of the present disclosure provide a process of the RU interleaving in a scenario of a punctured channel, add the RU interleaving and mapping, as a module, into a transmitter, and propose a detailed process of the RU interleaving in a scenario of a punctured channel.

To increase the RU interleaving performance, based on the block interleaver, the embodiments of the present disclosure provide several interleavers suitable for the RU interleaving: a triangular interleaver, a spiral interleaver, and a ladder interleaver.

The embodiments of the present disclosure provide signaling indication of the RU interleaving mode. The signaling may include two subfields: an RU/MRU allocation mode subfield and an RU/MRU interleaving granularity subfield. When performing OFDMA EHT MU PPDU transmission, the RU/MRU allocation mode subfield and the RU/MRU interleaving granularity subfield are indicated in the U-SIG field or the EHT-SIG field; when performing OFDMA EHT TB PPDU transmission, the RU/MRU allocation mode subfield and the RU/MRU interleaving granularity subfield are indicated in a trigger frame for requesting uplink EHT TB PPDU transmission.

First, two forms of EHT PPDU are introduced: EHT MU PPDU and EHT TB PPDU.

Figure 16A:
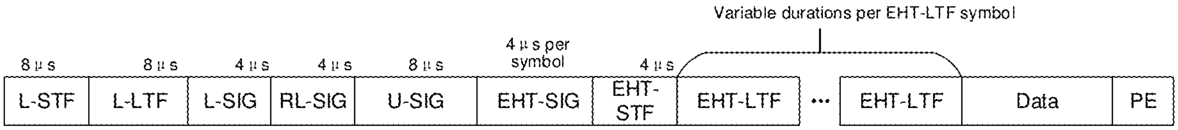
FIG. 16A is a schematic diagram of an EHT MU PPDU format.

(1) EHT MU PPDU:

a format of the EHT MU PPDU is shown in FIG. 16A and is used to be transmitted to one or more users. In the EHT MU PPDU, L-STF, L-LTF, L-SIG, U-SIG, and EHT-SIG are referred to as pre-EHT (pre-EHT or forward EHT) modulation fields; and EHT-STF, EHT-LTF, Data, and PE are referred to as EHT modulation fields.

Figure 16B:
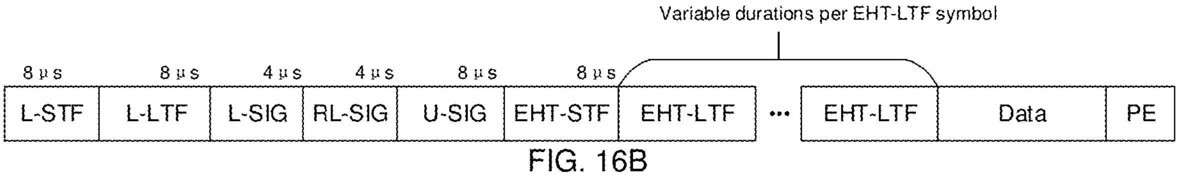
FIG. 16B is a schematic diagram of an EHT TB PPDU format.

(2) EHT TB PPDU:

a format of the EHT TB PPDU is shown in FIG. 16B, and is used to transmit a response trigger frame from an AP. In the EHT TB PPDU, L-STF, L-LTF, L-SIG and U-SIG are referred to as pre-EHT modulation fields; and EHT-STF, EHT-LTF, Data and PE are referred to as EHT modulation fields. The duration of the EHT-STF field in the EHT TB PPDU is twice the duration of the EHT-STF field in the EHT MU PPDU.

When OFDMA EHT PPDU transmission is performed, the RU interleaving is performed at a transmitting end and the deinterleaving is performed at a receiving end. The RU allocation mode and the RU interleaving granularity need to be indicated by signaling, downlink transmission signaling is indicated in the U-SIG field or the EHT-SIG field, and uplink transmission signaling is indicated in the EHT variant general information field in the trigger frame for requesting uplink EHT TB PPDU transmission. For the interleaver parameter, it does not need signaling for indicating. For example, after the transmitting end completes the setting of the RU allocation mode and the RU interleaving granularity, the receiving end may determine the interleaver parameter according to the PPDU bandwidth, the punctured channel information and the RU allocation information contained in the U-SIG and EHT-SIG.

1 an RU Interleaving Process in a Scenario of a Punctured Channel

When generating the OFDMA EHT PPDU, the RU interleaving occurs in a stage of spatial and frequency domain mapping. The spatial mapping is for mapping a spatial stream to a corresponding RF link. The frequency domain mapping is for mapping a modulation symbol to a corresponding physical tone, for each RF link. In some embodiments, for each RF link, the frequency domain mapping includes two steps: first, mapping a modulation symbol to a virtual tone, and then mapping the virtual tone to a physical tone. Taking data domain transmission of LDPC coding as an example, positions of the RU interleaving in the transmission process are shown in the spatial and frequency mapping parts in FIG. 17.

Figure 17:
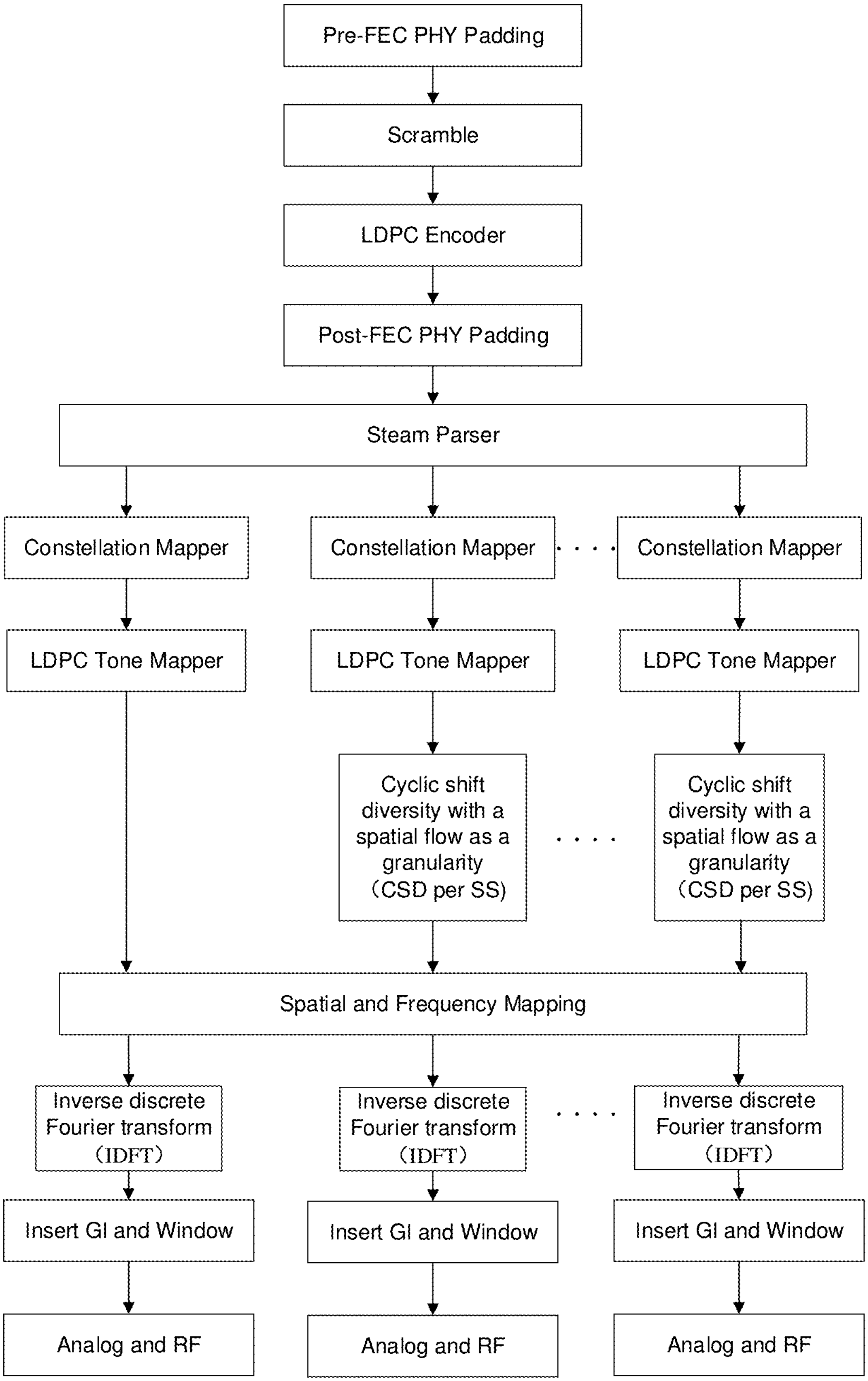
FIG. 17 is a flowchart of UL or DL non-MU-MIMO transmission of data domain using LDPC coding when an RU or an MRU is less than or equal to 996-tone.

FIG. 17 represents a flowchart of UL or DL non-MU-MIMO transmission of data domain using LDPC coding when the RU or MRU is less than or equal to 996-tone. As shown in FIG. 17, when the RU or MRU is less than or equal to 996-tone, and the UL or DL non-MU-MIMO transmission of data domain using LDPC coding is performed, the RU interleaving is in the spatial and frequency mapping parts of the transmission process.

The embodiments of the present disclosure propose the RU interleaving process in a scenario of a punctured channel, and the RU interleaving granularity is 26-tone (also expressed as 26 tones) or 52-tone (also expressed as 52 tones). For example, the minimum punctured sub-channel is 20 MHz, corresponding to a 242-tone RU. In the embodiments of the present disclosure, a minimum interleaving unit may be referred to as a "reference RU".

1.1 the RU Interleaving Granularity, g, being Equal to 26 Tones (a) A number of puncturing reference RUS $N_p$ is calculated according to the interleaving granularity and the tones of the punctured channel (for example, the interleaving granularity is 26 tones, and the punctured channel corresponds to a 242-tone RU, then $N_p$=9).

(b) The bandwidth BW is divided into $N_g$ physical reference RUs according to the interleaving granularity g, and respective physical reference RUs are marked as 1, 2, . . . , $N_g$ ($N_g$ may be determined according to table 1).

(c) $N_g$-$N_p$ physical reference RUs with $N_p$ puncturing reference RUs removed are interleaved by using a pre-specified interleaver. The pre-specified interleaver may be a block interleaver, a triangular interleaver, a spiral interleaver, or a ladder interleaver. The parameter of the interleaver depends on the interleaver type, the interleaving granularity, the PPDU bandwidth and the punctured channel condition. Exemplary parameter of the interleaver is shown in tables 2 to 7, including the parameter of the interleaver in a scenario of a punctured channel and a non-punctured channel.

(d) $N_g$-$N_p$ interleaved physical reference RUs are mapped to virtual reference RUs in sequence. The virtual reference RU may also be referred to as a logical reference RU.

1.2 RU Interleaving Granularity g being Equal to 52 Tones (a) A number of puncturing reference RUs, $N_p$, is calculated according to the interleaving granularity and the tones of the punctured channel (for example, the interleaving granularity is 52 tones, and the punctured channel corresponds to a 242-tone RU, then $N_p$=4).

(b) The bandwidth BW is divided into $N_g$ physical reference RUs and $N_{26\text{-}tone}$ 26-tone RUs according to the interleaving granularity g, and respective physical reference RUs are marked as 1, 2, . . . , $N_g$ ($N_g$ and $N_{26\text{-}tone}$ may be determined according to table 1).

(c) $N_g$-$N_p$ physical reference RUs with $N_p$ puncturing reference RUs removed are interleaved by using a pre-specified interleaver. The pre-specified interleaver may be a block interleaver, a triangular interleaver, a spiral interleaver, or a ladder interleaver. The parameter of the interleaver depends on the interleaver type, the interleaving granularity and the PPDU bandwidth. Exemplary parameter of the interleaver is shown in tables 2 to 7, including the parameter of the interleaver in a scenario of a punctured channel and a non-punctured channel.

(d) $N_g$-$N_p$ interleaved physical reference RUs are mapped to virtual reference RUs in sequence.

TABLE 1

Number of RUs corresponding to different RU interleaving granularities under different bandwidths

| RU interleaving granularity | Number of RUs corresponding to different RU interleaving granularities: Bandwidth = 80 MHz | Bandwidth = 160 MHz | Bandwidth = 320 MHz |
|---|---|---|---|
| 26-tone | $N_g$ = 36 | $N_g$ = 72 | $N_g$ = 144 |
| 52-tone | $N_g$ = 16 and $N_{26\text{-}tone}$ = 4 | $N_g$ = 32 and $N_{26\text{-}tone}$ = 8 | $N_g$ = 64 and $N_{26\text{-}tone}$ = 16 |

TABLE 2

Various interleaver parameters corresponding to different RU interleaving granularities under different bandwidths

| | | RU interleaving granularity is 26-tones | | | RU interleaving granularity is 52-tones | | |
|---|---|---|---|---|---|---|---|
| Interleaver Type | Parameter | Bandwidth = 80 MHz $N_g$ = 36 | Bandwidth = 160 MHz $N_g$ = 72 | Bandwidth = 320 MHz $N_g$ = 144 | Bandwidth = 80 MHz $N_g$ = 16 | Bandwidth = 160 MHz $N_g$ = 32 | Bandwidth = 320 MHz $N_g$ = 64 |
| Block | $N_{col}$ | 4 6 | 6 8 | 8 9 12 | 4 | 4 | 8 |
| Interleaver | $N_{row}$ | 9 6 | 12 9 | 18 16 12 | 4 | 8 | 8 |
| Triangle interleaver | s | 8 | 12 | 17 | 6 | 8 | 11 |
| Spiral interleaver | | C = 3, R = 2, S = 1 | | | | | |
| Ladder | | C = 4 | | | | | |
| interleaver | R | 11 | 20 | 38 | 6 | 10 | 18 |

Note:

(1) for the parameter of the block interleaver, when the interleaving granularity is 26 tones, for the same PPDU bandwidth, table 2 lists a plurality of possible values. When the pre-specified interleaver is the block interleaver, when the interleaving granularity is 26 tones, the block interleaver uses only one of pre-specified parameter configurations for a specific PPDU bandwidth.

(2) When receiving one EHT MU PPDU, the receiving end may determine whether the EHT modulation field of the EHT MU PPDU has adopted the RU interleaving mode, according to the RU allocation mode indicated in the U-SIG or EHT-SIG field. If the EHT modulation field of the EHT MU PPDU has adopted the RU interleaving mode, the receiving end may determine the physical tones corresponding to the allocated virtual RU/MRUs of the receiving end, according to the PPDU bandwidth, the punctured channel information, the RU interleaving granularity and the RU allocation information of the receiving end, indicated in the U-SIG and/or EHT-SIG fields.

For the punctured channel, IEEE802.11be D1.3 specifies that maximum of two 20 MHz sub-channels are punctured per 80 MHz bandwidth, then maximum of four 20 MHz sub-channels are punctured for a 160 MHz bandwidth, and maximum of eight 20 MHz sub-channels are punctured for a 320 MHz bandwidth. Tables 3 to 7 list various interleaver parameters corresponding to different RU interleaving granularities under different bandwidths, in different scenarios of the punctured channels.

TABLE 3

Various interleaver parameters corresponding to different RU interleaving granularities under different bandwidths, when one 20 MHz channel is punctured

| | | RU interleaving granularity is 26-tones | | | RU interleaving granularity is 52-tones | | |
|---|---|---|---|---|---|---|---|
| Interleaver Type | parameter | Bandwidth = 80 MHz $N_g = 27$ | Bandwidth = 160 MHz $N_g = 63$ | Bandwidth = 320 MHz $N_g = 135$ | Bandwidth = 80 MHz $N_g = 12$ | Bandwidth = 160 MHz $N_g = 28$ | Bandwidth = 320 MHz $N_g = 60$ |
| Block Interleaver | $N_{col}$ | 3 | 7 | 5 | 3 | 4 | 6 |
| | $N_{row}$ | 9 | 9 | 27 | 4 | 7 | 10 |
| Triangle interleaver | s | 7 | 11 | 16 | 5 | 7 | 11 |
| Spiral interleaver | | C = 3, R = 2, S = 1 | | | | | |
| Ladder interleaver | | C = 4 | | | | | |
| | R | 9 | 18 | 36 | 5 | 9 | 17 |

TABLE 4

Various interleaver parameters corresponding to different RU interleaving granularities under different bandwidths, when two 20 MHz channels are punctured

| | | RU interleaving granularity is 26-tones | | | interleaving granularity is 52-tones | | |
|---|---|---|---|---|---|---|---|
| Interleaver Type | parameter | Bandwidth = 80 MHz $N_g = 18$ | Bandwidth = 160 MHz $N_g = 54$ | Bandwidth = 320 MHz $N_g = 126$ | Bandwidth = 80 MHz $N_g = 8$ | Bandwidth = 160 MHz $N_g = 24$ | Bandwidth = 320 MHz $N_g = 56$ |
| Block Interleaver | $N_{col}$ | 3 | 6 | 9 | 2 | 4 | 7 |
| | $N_{row}$ | 6 | 9 | 14 | 4 | 6 | 8 |
| Triangle interleaver | s | 6 | 10 | 16 | 4 | 7 | 11 |
| Spiral interleaver | | C = 3, R = 2, S = 1 | | | | | |
| Ladder interleaver | | C = 4 | | | | | |
| | R | 6 | 15 | 33 | 4 | 8 | 16 |

TABLE 5

Various interleaver parameters corresponding to different RU interleaving granularities under different bandwidths, when three 20 MHz channels are punctured

| | | RU interleaving granularity is 26-tones | | RU interleaving granularity is 52-tones | |
|---|---|---|---|---|---|
| Interleaver Type | parameter | Bandwidth = 160 MHz $N_g = 45$ | Bandwidth = 320 MHz $N_g = 117$ | Bandwidth = 160 MHz $N_g = 20$ | Bandwidth = 320 MHz $N_g = 52$ |
| Block Interleaver | $N_{col}$ | 5 | 9 | 4 | 4 |
| | $N_{row}$ | 9 | 13 | 5 | 13 |
| Triangle interleaver | s | 9 | 15 | 6 | 10 |
| Spiral interleaver | | C = 3, R = 2, S = 1 | | | |
| Ladder interleaver | | C = 4 | | | |
| | R | 13 | 31 | 7 | 15 |

TABLE 6

Various interleaver parameters corresponding to different RU interleaving granularities under different bandwidths, when four 20 MHz channels are punctured

| Interleaver Type | parameter | RU interleaving granularity is 26-tones: Bandwidth = 160 MHz $N_g = 36$ | RU interleaving granularity is 26-tones: Bandwidth = 320 MHz $N_g = 108$ | RU interleaving granularity is 52-tones: Bandwidth = 160 MHz $N_g = 16$ | RU interleaving granularity is 52-tones: Bandwidth = 320 MHz $N_g = 48$ |
|---|---|---|---|---|---|
| Block Interleaver | $N_{col}$ | 4 | 9 | 4 | 6 |
| | $N_{row}$ | 9 | 12 | 4 | 8 |
| Triangle interleaver | s | 8 | 15 | 6 | 10 |
| Spiral interleaver | | C = 3, R = 2, S = 1 | | | |
| Ladder interleaver | | C = 4 | | | |
| | R | 11 | 29 | 6 | 14 |

TABLE 7

Various interleaver parameters corresponding to different RU interleaving granularities under 320 MHz, when five to eight 20 MHz channels are punctured

| Interleaver Type | parameter | RU interleaving granularity is 26-tones, Bandwidth = 320 MHz, Number of 20 MHz punctured channels: 5 $N_g = 99$ | 6 $N_g = 90$ | 7 $N_g = 81$ | 8 $N_g = 72$ | RU interleaving granularity is 52-tones, Bandwidth = 320 MHz, Number of 20 MHz punctured channels: 5 $N_g = 44$ | 6 $N_g = 40$ | 7 $N_g = 36$ | 8 $N_g = 32$ |
|---|---|---|---|---|---|---|---|---|---|
| Block Interleaver | $N_{col}$ | 3 | 9 | 9 | 8 | 4 | 5 | 6 | 4 |
| | $N_{row}$ | 33 | 10 | 9 | 9 | 11 | 8 | 6 | 8 |
| Triangle interleaver | s | 14 | 13 | 13 | 12 | 9 | 9 | 8 | 8 |
| Spiral interleaver | | C = 3, R = 2, S = 1 | | | | | | | |
| Ladder interleaver | | C = 4 | | | | | | | |
| | R | 27 | 24 | 22 | 20 | 13 | 12 | 11 | 10 |

TABLE 8

Description of interleaver parameters

| Interleaver type | Parameter | Meaning |
|---|---|---|
| Block interleaver | $N_{col}$ | Number of block interleaver columns |
| | $N_{row}$ | Number of block interleaver rows |
| Triangle interleaver | s | Length of a right angle side of the triangle interleaver |
| Spiral interleave | C | Number of spiral matrix columns |
| | R | Group size for writing into each group |
| | S | Step length of the spiral matrix |
| Ladder interleaver | C | Number of ladder matrix columns |
| | R | Number of ladder matrix rows |

In the above tables of the embodiments of the present disclosure, various types of parameters of interleavers are only examples and not limitations. In practical applications, adjustments may be made according to actual needs, as long as the total number of units included in the interleaver is greater than or equal to the number of elements that need to be written.

Example 1

Figure 18:
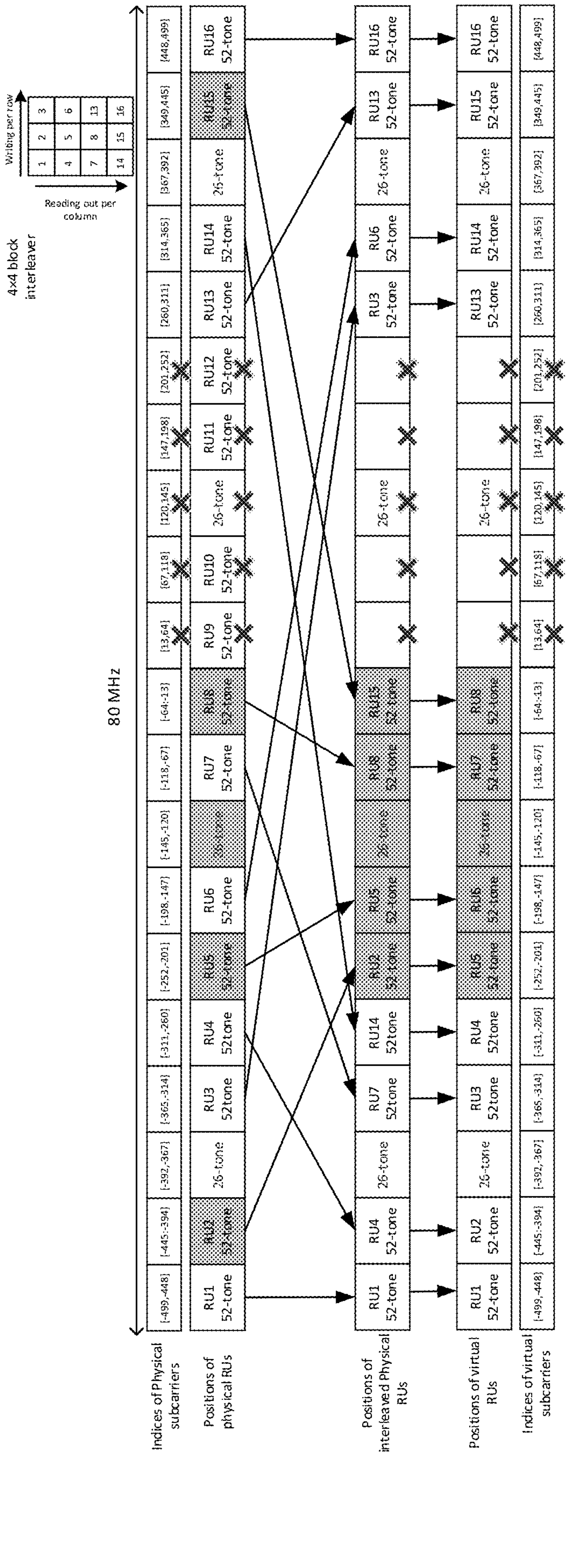
FIG. 18 is a schematic diagram of an example of RU interleaving with an interleaving granularity of 52-tone in a case of a punctured channel.

Indices of tones of the punctured sub-channel are [13, 252] (corresponding to crosses in FIG. 18), BW=80 MHz, g=52-tone, $N_p$=4, $N_g$=16, $N_{26\text{-}tone}$=3, interleaver: 4×3 block interleaver, as shown in FIG. 18.

After the punctured channels are removed from the 80 MHz bandwidth, the 80 MHz bandwidth is divided into 12 physical 52-tone RUs according to the interleaving granularity of 52-tone. According to the rule of the 4×3 block interleaver, 12 physical 52-tone RUs are interleaved, and the interleaved physical RU positions are mapped to virtual RU positions.

Assuming that one virtual 242-tone RU (green parts of the virtual RU positions in FIG. 18, including the virtual 52-tone RU5-RU8 and one 26-tone RU) is allocated to one STA, after being interleaved, the virtual 52-tone RU5 (virtual tone positions [−252, −201]) corresponds to the physical 52-tone RU2 (physical tone positions [−445, −394]), the virtual 52-tone RU6 (virtual tone positions [−198, −147]) corresponds to the physical 52-tone RU5 (physical tone positions [−252, −201]), the virtual 26-tone RU is not interleaved, the virtual 52-tone RU7 (virtual tone positions [−118, −67]) corresponds to the physical 52-tone RU8 (physical tone positions [−64, −13]), and the virtual 52-tone RU8 (virtual tone positions [−64, −13]) corresponds to the physical 52-tone RU15 (physical tone positions [394,445]).

2 RU Interleaver

The performance of the interleaver may affect the frequency diversity gain after the RU interleaving. Based on the block interleaver, the embodiments of the present disclosure propose three interleavers applicable for the RU interleaving, which are a triangular interleaver, a spiral interleaver, and a ladder interleaver, respectively. When the RU interleaving is performed, after the setting of the RU allocation mode and the RU interleaving granularity is completed at the transmitting end, the receiving end may, according to the PPDU bandwidth, the punctured channel information and the RU allocation information contained in the U-SIG and the EHT-SIG, pre-specify one of the following interleavers with the parameter of the interleaver uniquely determined, for the interleaving.

2.1 Triangular Interleaver

A shape of the interleaver is an isosceles right triangle.

A length of a right angle side of the triangular interleaver, s, is calculated according to the number N of the to-be-interleaved elements, and the formula for calculating is as follows:

$$N \leq \frac{s(s+1)}{2} = Q \tag{1}$$

where Q is a total number of elements that can be written into the triangular interleaver. If Q>N, null is padded after N RUs.

The triangular interleaver includes two steps: writing and reading.

(1) Writing: the indices of the elements are written into the triangle interleaver from large to small or small to large one by one per row, starting from the right angle side, and if Q>N, nulls are continued to be written per row.

(2) Reading: the indices of the elements are read out one by one per column, starting from the right angle side, and nulls are bypassed if encountered.

Figure 19:
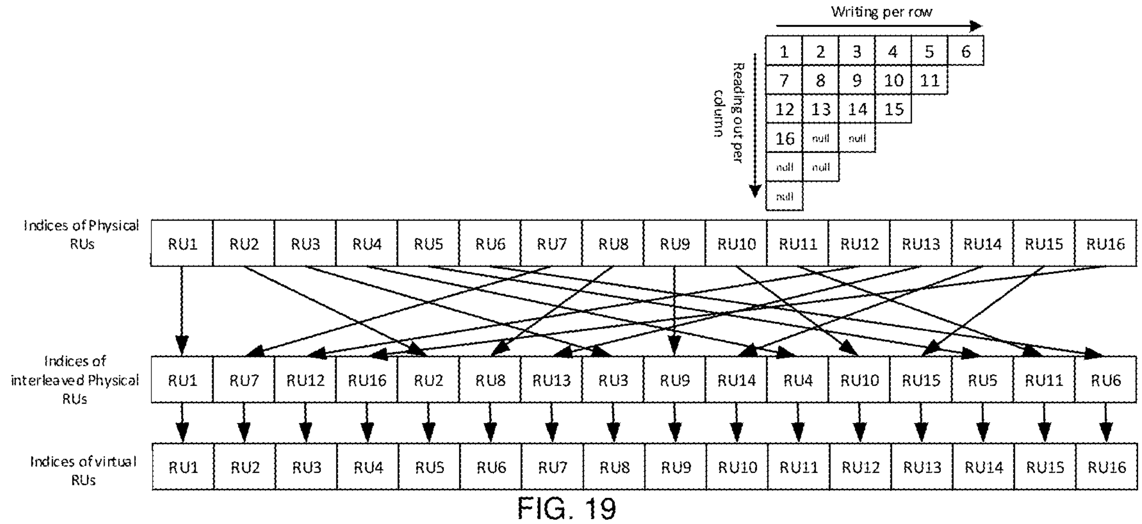
FIG. 19 is a schematic diagram of an interleaving mapping process of RUs in a triangular interleaver.

Example 2: An Implementation Process of the Triangular Interleaver for the RU Interleaving Assuming that the number of to-be-interleaved physical RUs N=16, according to formula (1), the side length of the triangle s=6, then Q=21>N, and 5 nulls need to be padded. As shown in FIG. 19, (1) writing: the indices of the RUs are written in the order from small to large per row, and 5 nulls are padded after the index 16; (2) reading: reading out is performed per column and nulls are skipped if encountered.

After the interleaving and the mapping, the virtual RU1 corresponds to the physical RU1, the virtual RU2 corresponds to the physical RU7, the virtual RU3 corresponds to the physical RU12, the virtual RU4 corresponds to the physical RU16, the virtual RUS corresponds to the physical RU2, the virtual RU6 corresponds to the physical RU8, the virtual RU7 corresponds to the physical RU13, the virtual RU8 corresponds to the physical RU3, the virtual RU9 corresponds to the physical RU9, the virtual RU10 corresponds to the physical RU14, the virtual RU11 corresponds to the physical RU4, the virtual RU12 corresponds to the physical RU10, the virtual RU13 corresponds to the physical RU15, the virtual RU14 corresponds to the physical RU5, the virtual RU15 corresponds to the physical RU11, and the virtual RU16 corresponds to the physical RU6.

2.2 Spiral Interleaver

A shape of the interleaver is a spiral.

The main parameters include:

(1) the number of spiral matrix columns, C, for example, C=3;

(2) the size of a group, R, for example, R=2, then the number of elements that are input each time being C×R; and (3) the step length of the spiral matrix, S, representing the number of rows separated between consecutive input columns, in respective columns of the spiral matrix, for example, S=1.

The spiral interleaver includes two steps: writing and reading.

(1) Writing: R elements are written into each column, starting from a k-th column, a (k+1)-th column being lower than the k-th column by S rows, where k=1, . . . , C, the indices of the elements may be written from small to large or from large to small.

(2) Reading: the reading out is performed one by one per row.

Example 3: An Implementation Process of the Spiral Interleaver

Figure 20:
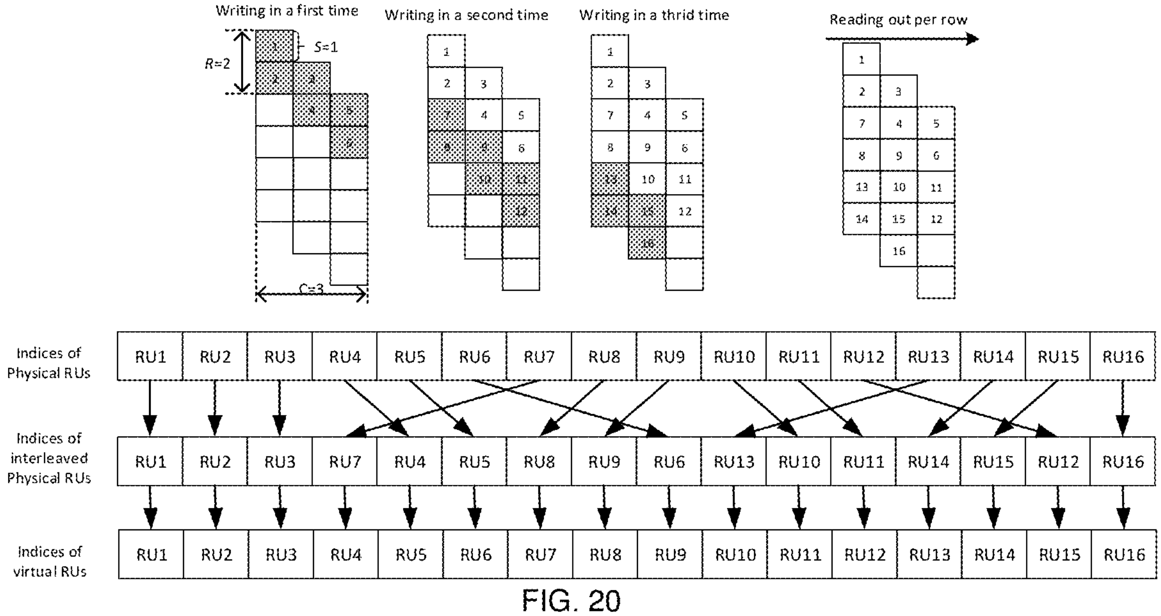
FIG. 20 is a schematic diagram of an interleaving mapping process of RUs in a spiral interleaver.

Assuming that the number of to-be-interleaved physical RUs N=16, and the parameters of the spiral interleaver are ('=3, R=2, and S=1. As shown in FIG. 20, (1) writing: starting from a first column, two RU indices are written into each column in an order of RU indices from large to small, a second column being lower than the first column by one row, and a third column being lower than the second column by one row; (2) reading: the RU indices are read out one by one per row.

After the interleaving and the mapping, the virtual RU1 corresponds to the physical RU1, the virtual RU2 corresponds to the physical RU2, the virtual RU3 corresponds to physical the RU3, the virtual RU4 corresponds to the physical RU7, the virtual RUS corresponds to the physical RU4, the virtual RU6 corresponds to the physical RU5, the virtual RU7 corresponds to the physical RU8, the virtual RU8 corresponds to the physical RU9, the virtual RU9 corresponds to the physical RU6, the virtual RU10 corresponds to the physical RU13, the virtual RU11 corresponds to the physical RU10, the virtual RU12 corresponds to the physical RU11, the virtual RU13 corresponds to the physical RU14, the virtual RU14 corresponds to the physical RU15, the virtual RU15 corresponds to the physical RU12, and the virtual RU16 corresponds to the physical RU16.

2.3 Ladder Interleaver

A shape of the interleaver is a ladder.

The main parameters include:

(1) the number of ladder matrix columns, C, for example, C=4;

(2) if the number of to-be-interleaved elements is N, the number of ladder matrix rows $$R = \left\lceil \frac{N + \frac{C(C-1)}{2}}{C} \right\rceil;$$

(3) padding nulls in the first (k−1) rows of a k-th column, where k=1, 2, . . . , C.

The ladder interleaver includes two steps: writing and reading.

(1) Writing: the indices of the element are written in an order from large to small or from small to large per column, and nulls are skipped if encountered.

(2) Reading: the reading out is performed per row, and nulls are skipped if encountered.

In addition, the writing may be performed per row, and the reading out may be performed per column.

Example 4: An Implementation Process of the Ladder Interleaver

Figure 21:
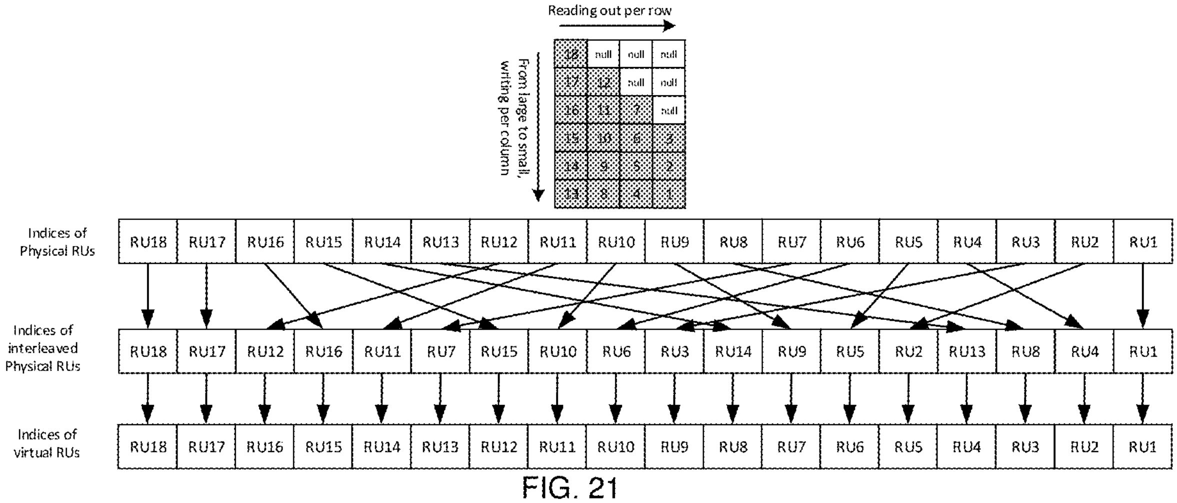
FIG. 21 is a schematic diagram of an interleaving mapping process of RUs in a ladder interleaver.

Assuming that the number of to-be-interleaved physical RUs is N=18 and the parameter of the ladder interleaver is C=4, R=6 is obtained by calculating. As shown in FIG. 21, 0 null is padded in a first column, 1 null is padded in the first row of a second column, 2 nulls are padded in the first 2 rows of a third column, and 3 nulls are padded in the first 3 rows of a fourth column. (1) Writing: the indices of the RUs are written in an order from large to small per column, and nulls are bypassed if encountered; (2) reading: the reading out is performed per row, and nulls are bypassed if encountered.

After the interleaving and the mapping, the virtual RU18 corresponds to the physical RU18, the virtual RU17 corresponds to the physical RU17, the virtual RU16 corresponds to the physical RU12, the virtual RU15 corresponds to the physical RU16, the virtual RU14 corresponds to the physical RU11, the virtual RU13 corresponds to the physical RU7, the virtual RU12 corresponds to the physical RU15, the virtual RU11 corresponds to the physical RU10, the virtual RU10 corresponds to the physical RU6, the virtual RU9 corresponds to the physical RU3, the virtual RU8 corresponds to the physical RU14, the virtual RU7 corresponds to the physical RU9, the virtual RU6 corresponds to the physical RU5, the virtual RUS corresponds to the physical RU2, the virtual RU4 corresponds to the physical RU13, the virtual RU3 corresponds to the physical RU8, the virtual RU2 corresponds to the physical RU4, and the virtual RU1 corresponds to the physical RU1.

3 RU Interleaving Signaling Indication

Regarding the description of the RU interleaving, the downlink signaling will perform indicating in a Common field of the U-SIG field or the EHT-SIG field, which includes two subfields: (1) an RU/MRU allocation mode and (2) an RU interleaving granularity. The uplink signaling will perform indicating in an EHT variant general information field in a trigger frame for requesting uplink EHT TB PPDU transmission, which includes two subfields: (1) an RU/MRU allocation mode and (2) an RU interleaving granularity.

3.1 U-SIG Field

For example, as shown in table 9, in an exemplary U-SIG field, 1 bit B22 is adopted to represent the RU/MRU allocation mode subfield, for example, 0 represents the RU/MRU allocation mode specified in 11be, and 1 represents the RU/MRU interleaving allocation mode. 1 bit B23 is adopted to represent the RU interleaving granularity subfield, for example, 0 represents that the RU interleaving granularity is 26-tone, and 1 represents that the RU interleaving granularity is 52-tone. Herein, B22 may come from disregard (a disregard field) or may also come from validate (a validate field), and the validate is optional.

TABLE 9

Indication of the RU interleaving granularity in the U-SIG field

| Two parts of U-SIG | Bit | Field | Number of bits | Description |
|---|---|---|---|---|
| U-SIG-1 | B0-B2 | PHY Version Identifier | 3 | Differentiate between different PHY (Physical Layer) clauses. |
| | B3-B5 | BW | 3 | Indicate PPDU bandwidth. |
| | B6 | UL/DL | 1 | Indicate whether the PPDU is sent UL or DL. |
| | B7-B12 | BSS Color | 6 | An identifier of the BSS. |
| | B13-B19 | TXOP | 7 | Indicate duration information for NAV (navigation) setting and protection of the TXOP. |
| | B20-B22 | Disregard | 3 | Disregard and set to all 1s. |
| | B23 | RU/MRU allocation mode (Validate is optional) | 1 | |
| | B24 | RU interleaving granularity | 1 | |
| | B25 | Validate | 3 | Validate and set to 1. |
| U-SIG-2 | B0-B1 | PPDU Type And Compression Mode | 2 | |
| | B2 | Validate | 1 | |
| | B3-B7 | Punctured Channel Information | 5 | |
| | B8 | Validate | 1 | |
| | B9-B10 | EHT-SIG MCS | 2 | Indicate the MCS used for modulating the EHT-SIG. |
| | B11-B15 | Number Of EHT-SIG Symbols | 5 | Indicate the number of EHT-SIG symbols. |
| | B16-B19 | CRC | 4 | |
| | B20-B25 | Tail | 6 | |

3.2 EHT-SIG Field

Similarly, the RU interleaving granularity may also be indicated in the EHT-SIG. For example, as shown in table 10, in an exemplary EHT-SIG field, 1 bit B13 is adopted to represent the RU/MRU allocation mode subfield, for example, 0 represents the RU/MRU allocation mode specified in 11be, and 1 represents the RU/MRU interleaving allocation mode. 1 bit B14 is adopted to represent the RU interleaving granularity subfield, for example, 0 represents that the RU interleaving granularity is 26-tone, and 1 represents that the RU interleaving granularity is 52-tone.

TABLE 10

Indication of the RU interleaving granularity in the EHT-SIG field

| Bit | Subfield | Number of subfields | Number of bits per subfield | Description |
|---|---|---|---|---|
| B0-B3 | Spatial Reuse | 1 | 4 | Indicate spatial reuse parameters during the transmission of this PPDU. |
| B4-B5 | GI + LTF Size | 1 | 2 | Indicate the GI duration and EHT-LTF size. |
| B6-B8 | Number Of EHT-LTF Symbols | 1 | 3 | Indicate the number of EHT-LTF symbols. |
| B9 | LDPC Extra Symbol Segment | 1 | 1 | Indicate the presence of the LDPC extra symbol segment. |
| B10-B11 | Pre-FEC Padding Factor | 1 | 2 | Indicate the pre-FEC padding factor. |
| B12 | PE Disambiguity | 1 | 1 | Indicates PE disambiguity. |
| B13 | RU/MRU allocation mode | 1 | 1 | |
| B14 | RU interleaving granularity | 1 | 1 | |
| B15-B16 | Disregard | 1 | 1 | Disregard and set to 1. |
| B17-B16 + 9N | RU Allocation-1 | N | 9 | The value of N is BW dependent. |
| B17 + 9N − B20 + 9N | CRC-1 | 1 | 4 | |
| B21 + 9N − B26 + 9N | Tail-1 | 1 | 6 | |
| B27 + 9N − B26 + 9N + 9M | RU Allocation-2 | M | 9 | The value of M is BW dependent. |
| B27 + 9N + 9M − B30 + 9N + 9M | CRC-2 | 0 or 1 | 4 | present for BW = 160 MHz, 320 MHz-1 or 320 MHz-2 and not present otherwise. |
| B31 + 9N + 9M − B36 + 9N + 9M | Tail-2 | 0 or 1 | 6 | present for BW = 160 MHz, 320 MHz-1 or 320 MHz-2 and not present otherwise. |

3.3 Trigger Frame for Requesting Uplink EHT TB PPDU Transmission

Figure 22:
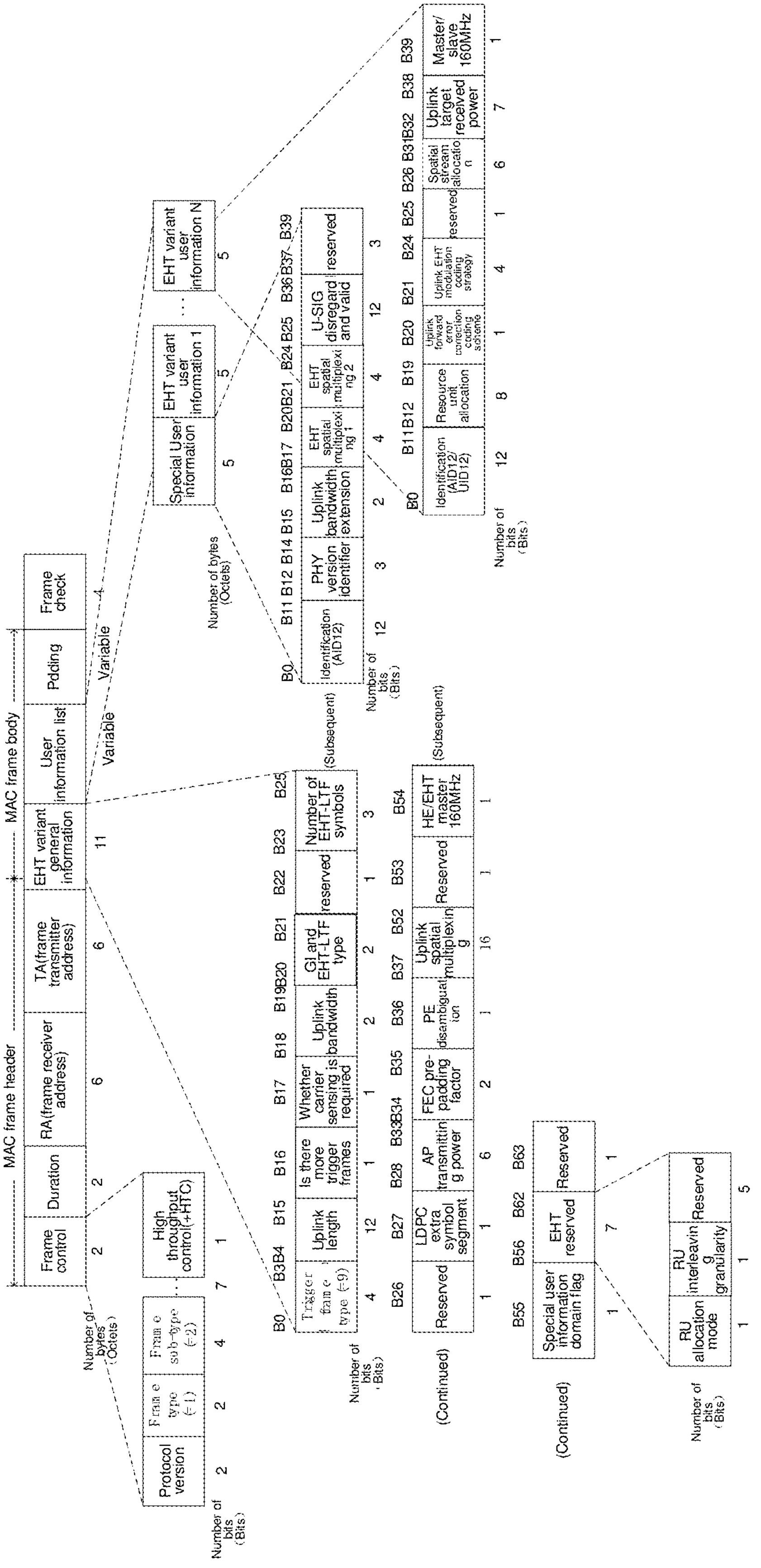
FIG. 22 is a schematic diagram of an RU interleaving mode indication field in a trigger frame for requesting uplink EHT TB PPDU transmission.

FIG. 22 represents a format of a trigger frame for requesting uplink EHT TB PPDU transmission. The trigger frame may include an EHT variant general information field, a user information list field, and a padding field. The user information list field consists of one or more user information fields. Formats of the EHT variant general information field and the user information list field depend on a type of the trigger frame.

In the embodiments of the present disclosure, 1 bit in an EHT reserved field in the EHT variant general information field is set to indicate the RU/MRU allocation mode subfield, for example, 0 represents that the EHT TB PPDU adopts the RU/MRU allocation mode specified in 11be, and 1 represents that the EHT TB PPDU adopts the RU/MRU interleaving allocation mode; 1 bit is set to represent the interleaving granularity subfield, for example, 0 represents that the RU interleaving granularity adopted by the EHT TB PPDU is 26-tone, and 1 represents that the RU interleaving granularity adopted by the EHT TB PPDU is 52-tone. As shown in FIG. 22, the trigger frame for requesting uplink EHT TB PPDU transmission includes an RU interleaving mode indication field.

The embodiments of the present disclosure propose an RU interleaving scheme, where the OFDMA EHT PPDU transmission is performed in a scenario of the large bandwidth and multiple STAs, RUs allocated to the STA are interleaved, and then the STA is enabled to obtain a better frequency diversity gain, thereby enabling the STA to enjoy benefits of the large bandwidth.

The embodiments of the present disclosure also include one or more of the following advantages that:

(1) the embodiments of the present disclosure propose the RU interleaving process in a scenario of the punctured channel, which improves usage scenarios of the RU interleaving;

(2) the embodiments of the present disclosure propose three RU interleavers, which may have better performance than the traditional block interleaver in some scenarios;

(3) the embodiments of the present disclosure propose signaling indication of the uplink and downlink RU interleaving mode, and in addition to the U-SIG and EHT-SIG fields and the trigger frame for requesting uplink EHT TB PPDU transmission in the existing IEEE 802.11 be standard draft, an RU interleaving mode indication subfield is added.

In the RU interleaving process, in the scenario of the punctured channel of 1.2, the scheme of the above example is for removing the punctured tones first and then performing the interleaving. It is also possible to perform the interleaving first and then to remove the punctured tones (that is, the punctured tones also participate in the RU interleaving). The method of removing the punctured tones first and then performing the interleaving, may form a segment of virtual RUs that can be allocated to the STA continuously, with low implementation complexity.

Figure 23:
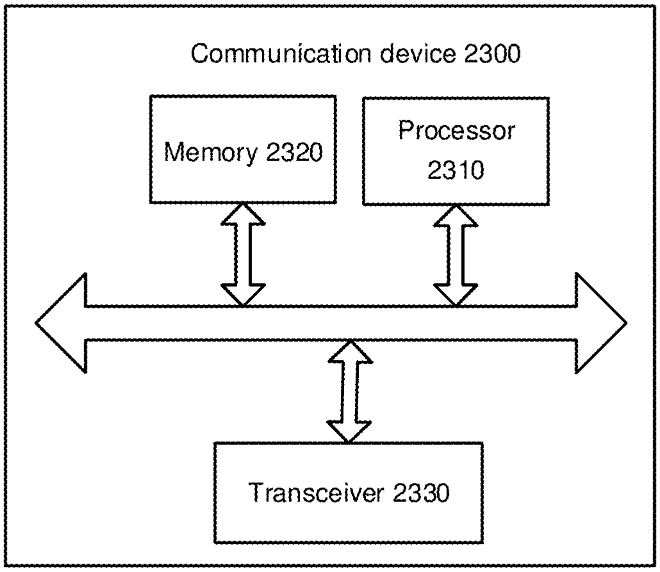
FIG. 23 is a schematic block diagram of a communication device according to the embodiments of the present disclosure.

FIG. 23 is a schematic structural diagram of a communication device 2300 according to the embodiments of the present disclosure. The communication device 2300 includes a processor 2310, which may invoke and execute a computer program from a memory, to cause the communication device 2300 to implement the method in the embodiments of the present disclosure.

In some embodiments, the communication device 2300 further includes a memory 2320. Herein, the processor 2310 may invoke and execute a computer program from the memory 2320, to cause the communication device 2300 to implement the method in the embodiments of the present disclosure.

Herein, the memory 2320 may be a separate device independent from the processor 2310, or may also be integrated into the processor 2310.

In an implementation, the communication device 2300 may further include a transceiver 2330, the processor 2310 may control the transceiver 2330 to communicate with other devices, and to be capable of transmitting information or data to other devices, or receive information or data transmitted by other devices.

Herein, the transceiver 2330 may include a transmitter and a receiver. The transceiver 2330 may further include an antenna, and a number of antennas may be one or more.

In an implementation, the communication device 2300 may be the second device in the embodiments of the present disclosure, and the communication device 2300 may implement the corresponding processes implemented by the second device in respective methods of the embodiments of the present disclosure, which will not be repeated here for the sake of brevity.

In an implementation, the communication device 2300 may be the first device in the embodiments of the present disclosure, and the communication device 2300 may implement the corresponding processes implemented by the first device in respective methods of the embodiments of the present disclosure, which will not be repeated here for the sake of brevity.

Figure 24:
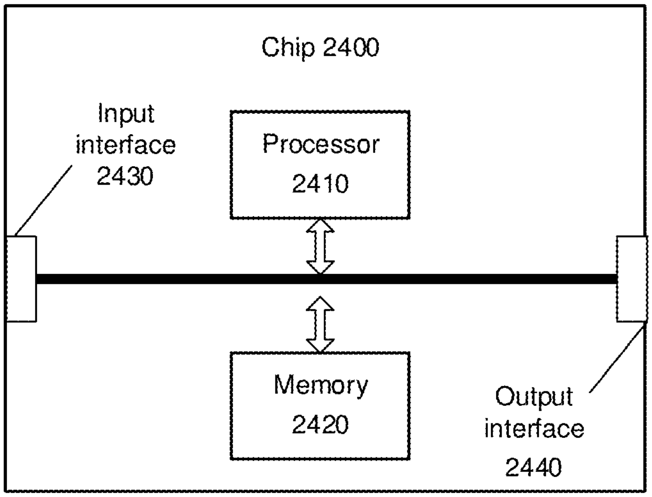
FIG. 24 is a schematic block diagram of a chip according to the embodiments of the present disclosure.

FIG. 24 is a schematic structural diagram of a chip 2400 according to the embodiments of the present disclosure. The chip 2400 includes a processor 2410, and the processor 2410 may invoke and execute a computer program from a memory to implement the method in the embodiments of the present disclosure.

In an implementation, the chip 2400 may further include a memory 2420. Herein, the processor 2410 may invoke and execute the computer program from the memory 2420 to implement the method performed by the first device or the second device in the embodiments of the present disclosure.

Herein, the memory 2420 may be a separate device independent from the processor 2410, or may also be integrated into the processor 2410.

In an implementation, the chip 2400 may further include an input interface 2430. Herein, the processor 2410 may control the input interface 2430 to communicate with other devices or chips, and to be capable of acquiring information or data transmitted by other devices or chips.

In an implementation, the chip 2400 may further include an output interface 2440. Herein, the processor 2410 may control the output interface 2440 to communicate with other devices or chips, and to be capable of outputting information or data to other devices or chips.

In an implementation, the chip may be applied to the second device in the embodiments of the present disclosure, and the chip may implement the corresponding processes implemented by the second device in respective methods of the embodiments of the present disclosure, which will not be repeated here for the sake of brevity.

In an implementation, the chip may be applied to the first device in the embodiments of the present disclosure, and the chip may implement the corresponding processes implemented by the first device in respective methods of the embodiments of the present disclosure, which will not be repeated here for the sake of brevity.

The chips applied to the second device and the first device may be the same chip or different chips.

It should be understood that, the chip mentioned in the embodiments of the present disclosure may also be referred to as a system on chip, a system chip, a chip system or a system-on-chip chip, etc.

The processor mentioned above may be a general-purpose processor, a digital signal processor (DSP), a field programmable gate array (FPGA), an application specific integrated circuit (ASIC) or other programmable logic devices, a transistor logic device, a discrete hardware component, etc. Herein, the general-purpose processor mentioned above may be a microprocessor or may also be any conventional processor.

The memory mentioned above may be a volatile memory or a non-volatile memory, or may include both volatile and non-volatile memories. Herein, the non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (RAM).

It should be understood that, the above memory is exemplary but not limiting illustration, e.g., the memory in embodiments of the present disclosure may also be a static Random Access Memory (static RAM, SRAM), a Dynamic Random Access Memory (dynamic RAM, DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM), etc. That is, the memory in the embodiments of the present disclosure is intended to include, but not limited to, these and any other suitable types of memories.

Figure 25:
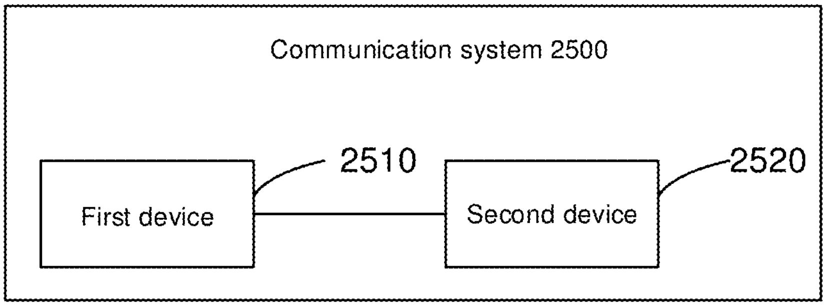
FIG. 25 is a schematic block diagram of a communication system according to the embodiments of the present disclosure.

FIG. 25 is a schematic block diagram of a communication system 2500 according to the embodiments of the present disclosure. The communication system 2500 includes a first device 2510 and a second device 2520.

In an implementation, the first device 2510 is configured to interleave a resource unit (RU) according to first information. The second device 2520 is configured to deinterleave a resource unit according to first information. The first information includes at least one of an interleaving granularity, punctured channel information, or an interleaver type.

Herein, the first device 2510 may be configured to implement the corresponding functions implemented by the first device in the above method 200, and the second device 2520 may be configured to implement the corresponding functions implemented by the second device in the above method 300. They will not be repeated here, for the sake of brevity.

In an implementation, the first device 2510 is configured to transmit second information. The second device 2520 is configured to receive second information. The second information is used to indicate an allocation mode and/or an interleaving granularity of an RU. Herein, the first device 2510 may be configured to implement the corresponding functions implemented by the first device in the above method 600, and the second device 2520 may be configured to implement the corresponding functions implemented by the second device in the above method 700. They will not be repeated here, for the sake of brevity.

In an implementation, the first device 2510 may use any type of the method of controlling the interleaver in methods 400, 500, or 600, in the interleaving process.

In an implementation, the second device 2520 may use any type of the method of controlling the interleaver in methods 400, 500, or 600, in the deinterleaving process.

The above embodiments may be implemented in whole or in part by software, hardware, firmware, or any combination thereof. When the above embodiments are implemented by using software, they may be implemented in a form of a computer program product in whole or in part. The computer program product includes one or more computer instructions. When computer program instructions are loaded and executed on a computer, processes or functions according to the embodiments of the present disclosure are generated in whole or in part. The computer may be a general-purpose computer, a dedicated computer, a computer network, or any other programmable apparatus. The computer instructions may be stored in a non-transitory computer-readable storage medium or transmitted from one non-transitory computer-readable storage medium to another non-transitory computer-readable storage medium, for example, the computer instructions may be transmitted from a website site, computer, server, or data center to another website site, computer, server, or data center via wired (such as coaxial cable, fiber optic, digital subscriber line (DSL)) or wireless (such as infrared, radio, microwave, etc.) means. The non-transitory computer-readable storage medium may be any available medium that can be accessed by the computer, or a data storage device, such as including a server or a data center that integrates one or more available mediums. The available medium may be a magnetic medium (e.g., a floppy disk, a hard disk or a magnetic tape), an optical medium (e.g., a digital video disk (DVD)) or a semiconductor medium (e.g., a solid state disk (SSD)), etc.

It should be understood that, in the various embodiments of the present disclosure, a size of serial numbers of the above processes does not imply an order of execution, and the execution order of the respective processes should be determined by their function and internal logic, but should not constitute any limitation on the implementation processes of the embodiments of the present disclosure.

Those skilled in the art may clearly understand that, for the convenience and brevity of the description, the working processes of the systems, apparatus and units described above may refer to the corresponding processes in the above method embodiments, which will not be repeated here.

The above description is only the implementations of the present disclosure, but the protection scope of the present disclosure is not limited thereto, and any skilled familiar with this technical field may easily think of changes or substitutions within the technical scope disclosed in the present disclosure, which should be all covered within the protection scope of the present disclosure. Therefore, the protection scope of the present disclosure should be subject to the protection scope of claims.

What is claimed is:

1. A deinterleaving method, comprising:

deinterleaving, by a second device, a resource unit according to first information, wherein the first information comprises an interleaving granularity and a bandwidth;

wherein in a case where the interleaving granularity is 26 tones, a first physical RU comprises 26 tones, wherein a relationship between the bandwidth and a number of first physical RUs comprises at least one of:

the bandwidth being 80 MHz, and the number of the first physical RUs being 36;

the bandwidth being 160 MHz, and the number of the first physical RUs being 72; or the bandwidth being 320 MHz, and the number of the first physical RUs being 144;

or, in a case where the interleaving granularity is 52 tones, a first physical RU comprises 52 tones and a second physical RU comprises 26 tones, wherein a relationship among the bandwidth, a number of first physical RUs, and a number of second physical RUs comprises at least one of:

the bandwidth being 80 MHz, the number of the first physical RUs being 16, and the number of the second physical RUs being 4;

the bandwidth being 160 MHz, the number of the first physical RUs being 32, and the number of the second physical RUs being 8; or the bandwidth being 320 MHz, the number of the first physical RUs being 64, and the number of the second physical RUs being 16.

2. The deinterleaving method according to claim 1, wherein the first information further comprises punctured channel information or an interleaver type.

3. A communication device, wherein the communication device is a station (STA), and the STA comprises: a processor and a memory, wherein the memory is configured to store a computer program, the processor is configured to invoke and execute the computer program stored in the memory, to cause the STA to perform:

deinterleaving a resource unit according to first information, wherein the first information comprises an interleaving granularity and a bandwidth;

wherein in a case where the interleaving granularity is 26 tones, a first physical RU comprises 26 tones, wherein a relationship between the bandwidth and a number of first physical RUs comprises at least one of:

the bandwidth being 80 MHz, and the number of the first physical RUs being 36;

the bandwidth being 160 MHz, and the number of the first physical RUs being 72; or the bandwidth being 320 MHz, and the number of the first physical RUs being 144;

or, in a case where the interleaving granularity is 52 tones, a first physical RU comprises 52 tones and a second physical RU comprises 26 tones, wherein a relationship among the bandwidth, a number of first physical RUs, and a number of second physical RUs comprises at least one of:

the bandwidth being 80 MHz, the number of the first physical RUs being 16, and the number of the second physical RUs being 4;

the bandwidth being 160 MHz, the number of the first physical RUs being 32, and the number of the second physical RUs being 8; or the bandwidth being 320 MHz, the number of the first physical RUs being 64, and the number of the second physical RUs being 16.

4. The communication device according to claim 3, wherein deinterleaving the resource unit according to the first information, comprises:

acquiring first physical RUs corresponding to at least one of a virtual RU, a virtual MRU, a logical RU, or a logical MRU.

5. The communication device according to claim 4, wherein deinterleaving the resource unit according to the first information, further comprises:

using acquired first physical RUs as to-be-deinterleaved first physical RUs, and deinterleaving the to-be-deinterleaved first physical RUs by using an interleaver, to obtain deinterleaved first physical RUs;

combining the deinterleaved first physical RUs and punctured RUs;

wherein a number of the punctured RUs is a first number, a number of the deinterleaved first physical RUs is a third number, and a number of first physical RUs obtained by the combining is a second number.

6. The communication device according to claim 5, wherein deinterleaving the to-be-deinterleaved first physical RUs by using the interleaver, comprises:

deinterleaving the to-be-deinterleaved first physical RUs by using the interleaver, and recovering an index arrangement order of the to-be-deinterleaved first physical RUs.

7. The communication device according to claim 5, wherein deinterleaving the resource unit according to the first information, further comprises:

combining the second number of first physical RUs and a fourth number of second physical RUs, to obtain recovered first physical RUs.

8. The communication device according to claim 5, wherein an interleaver is determined according to an interleaver type.

9. The communication device according to claim 5, wherein an interleaver type comprises at least one of: a block interleaver, a triangular interleaver, a spiral interleaver or a ladder interleaver.

10. The communication device according to claim 5, wherein a parameter of an interleaver is determined according to an interleaver type and a number of the to-be-deinterleaved first physical RUs.

11. The communication device according to claim 10, wherein the interleaver type is a block interleaver, and parameters of the block interleaver comprise a number of columns and a number of rows.

12. The communication device according to claim 10, wherein the interleaver type is a triangular interleaver, and a parameter of the triangular interleaver comprises a length of a right angle side.

13. The communication device according to claim 10, wherein the interleaver type is a spiral interleaver, and parameters of the spiral interleaver comprise a number of spiral matrix columns, a group size for writing into each group, and a step length of a spiral matrix.

14. The communication device according to claim 13, wherein the number of spiral matrix columns of the spiral interleaver is 3, the group size for writing into each group is 2, and the step length of the spiral matrix is 1.

15. The communication device according to claim 10, wherein the interleaver type is a ladder interleaver, and parameters of the ladder interleaver comprise a number of ladder matrix columns and a number of ladder matrix rows.

16. The communication device according to claim 15, wherein a number of columns of the ladder interleaver is 4.

17. The communication device according to claim 4, wherein deinterleaving the resource unit according to the first information, further comprises:

combining acquired first physical RUs and punctured RUs to obtain to-be-deinterleaved first physical RUs;

deinterleaving the to-be-deinterleaved first physical RUs by using an interleaver, to obtain deinterleaved first physical RUs;

wherein a number of the punctured RUs is a first number, and a number of the deinterleaved first physical RUs is a second number.

18. The communication device according to claim 4, wherein an index of each physical RU has a corresponding physical tone index interval range, and an index of each virtual RU has a corresponding virtual tone index interval range.

19. The communication device according to claim 3, wherein the first information further comprises punctured channel information or an interleaver type.

20. A communication device, wherein the communication device is an access point (AP), and the AP comprises: a processor and a memory, wherein the memory is configured to store a computer program, the processor is configured to invoke and execute the computer program stored in the memory, to cause the AP to perform:

interleaving a resource unit (RU) according to first information, wherein the first information comprises a bandwidth, and an interleaving granularity;

wherein in a case where the interleaving granularity is 26 tones, a first physical RU comprises 26 tones, wherein a relationship between the bandwidth and a number of first physical RUs comprises at least one of:

the bandwidth being 80 MHz, and the number of the first physical RUs being 36;

the bandwidth being 160 MHz, and the number of the first physical RUs being 72; or the bandwidth being 320 MHz, and the number of the first physical RUs being 144;

or, in a case where the interleaving granularity is 52 tones, a first physical RU comprises 52 tones and a second physical RU comprises 26 tones, wherein a relationship among the bandwidth, a number of first physical RUs, and a number of second physical RUs comprises at least one of:

the bandwidth being 80 MHz, the number of the first physical RUs being 16, and the number of the second physical RUs being 4;

the bandwidth being 160 MHz, the number of the first physical RUs being 32, and the number of the second physical RUs being 8; or the bandwidth being 320 MHz, the number of the first physical RUs being 64, and the number of the second physical RUs being 16.

* * * * *